(12) United States Patent
Kim et al.

(10) Patent No.: US 11,917,637 B2
(45) Date of Patent: Feb. 27, 2024

(54) TECHNIQUES FOR ENHANCED CONFIGURED GRANT CONFIGURATION

(71) Applicant: QUALCOMM Incorporated, San Diego, CA (US)

(72) Inventors: Yuchul Kim, San Diego, CA (US); Peter Pui Lok Ang, San Diego, CA (US); Linhai He, San Diego, CA (US); Hwan Joon Kwon, San Diego, CA (US); Krishna Kiran Mukkavilli, San Diego, CA (US); Yeliz Tokgoz, San Diego, CA (US); Jay Kumar Sundararajan, San Diego, CA (US); Huilin Xu, Temecula, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 17/475,076

(22) Filed: Sep. 14, 2021

(65) Prior Publication Data
US 2022/0095360 A1 Mar. 24, 2022

Related U.S. Application Data

(60) Provisional application No. 63/080,407, filed on Sep. 18, 2020.

(51) Int. Cl.
*H04W 72/14* (2009.01)
*H04W 72/04* (2023.01)
*H04W 76/28* (2018.01)
*H04W 72/23* (2023.01)
*H04W 72/0446* (2023.01)

(52) U.S. Cl.
CPC ....... *H04W 72/23* (2023.01); *H04W 72/0446* (2013.01); *H04W 76/28* (2018.02)

(58) Field of Classification Search
CPC .. H04W 72/23; H04W 72/0446; H04W 76/28
See application file for complete search history.

(56) References Cited

U.S. PATENT DOCUMENTS

| 2014/0064160 A1 | 3/2014 | Verger et al. |
| 2017/0208619 A1 | 7/2017 | Yang et al. |
| (Continued) | | |

OTHER PUBLICATIONS

International Search Report and Written Opinion—PCT/US2021/050385—ISA/EPO—dated Jan. 21, 2022.

*Primary Examiner* — Melvin C Marcelo
(74) *Attorney, Agent, or Firm* — Arun Swain

(57) ABSTRACT

Methods, systems, and devices for wireless communications are described. A user equipment (UE) may determine a downlink configuration including a set of resources for receiving downlink transmissions. The UE may determine a grant for performing uplink transmissions based on a radio resource control (RRC) message. The UE may determine, based on the downlink configuration, the grant, or both, an uplink configuration including a set of resources for transmitting the uplink transmissions at a set of uplink transmission occasions. In some aspects, the set of uplink transmission occasions may be arranged according to a non-uniform spacing pattern in a time domain. The UE may transmit, to a base station, one or more uplink transmissions based on the uplink configuration.

30 Claims, 23 Drawing Sheets

(56) References Cited

U.S. PATENT DOCUMENTS

| | | |
|---|---|---|
| 2018/0279360 A1 | 9/2018 | Park et al. |
| 2020/0178293 A1 | 6/2020 | Jeons et al. |
| 2021/0068135 A1* | 3/2021 | Shah ................ H04W 74/0808 |
| 2022/0095355 A1* | 3/2022 | Kim ...................... H04W 76/28 |
| 2023/0145687 A1* | 5/2023 | Turtinen ............... H04W 48/18 |
| | | 370/329 |

* cited by examiner

TECHNIQUES FOR ENHANCED CONFIGURED GRANT CONFIGURATION

CROSS REFERENCE

The present Application for Patent claims the benefit of U.S. Provisional Patent Application No. 63/080,407 by KIM et al., entitled "TECHNIQUES FOR ENHANCED CONFIGURED GRANT CONFIGURATION," filed Sep. 18, 2020, assigned to the assignee hereof, and expressly incorporated by reference herein.

FIELD OF TECHNOLOGY

The following relates to wireless communications, including techniques for enhanced configured grant configuration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some communication devices (e.g., UEs) may receive downlink transmissions according to a downlink configuration at periodic (e.g., uniform, evenly-distributed) downlink reception occasions, such as every 8.33 milliseconds (ms). These communication devices may be configured to transmit uplink data via uplink transmissions according to an uplink configuration, which arranges uplink transmission occasions at periodic intervals, such as every 8 ms. In some cases, the difference between downlink reception occasions (e.g., a downlink reception occasion every 8.33 ms) and the uplink transmission occasions (e.g., an uplink transmission occasion every 8 ms) may result in a mismatch (e.g., an offset) between downlink reception occasions and uplink transmission occasions. Such mismatches between downlink reception occasions and uplink transmission occasions may significantly increase a power consumption and reduce battery performance at the communication devices.

SUMMARY

The described techniques relate to improved methods, systems, devices, and apparatuses that support techniques for enhanced configured grant configuration. Generally, the described techniques provide for uplink configurations, which include uplink transmission occasions arranged according to a non-uniform spacing pattern in a time domain, which may enable improved coordination between downlink reception occasions and the uplink transmission occasions. For example, a communication device may determine a downlink configuration including downlink reception/transmission occasions arranged according to a uniform spacing pattern in the time domain (e.g., downlink reception occasions every 8.33 ms). The communication device may additionally determine a grant (e.g., a configured grant) for performing uplink transmissions. The grant may be configured via radio resource control (RRC) signaling. The communication device may determine an uplink configuration with uplink transmission occasions arranged according to a non-uniform spacing pattern in the time domain based on the downlink configuration, the grant (e.g., configured grant), or both. The non-uniform spacing pattern of the uplink configuration may be configured/determined such that uplink transmission occasions of the uplink configuration overlap with, correspond to, or are otherwise proximate to downlink reception occasions of the downlink configuration.

Additionally or alternatively, the non-uniform spacing pattern of the uplink configuration may be based on a repeating periodicity format with multiple periodicities, a repeating offset format with multiple offsets, or both. The communication device may define durations of time (e.g., uplink transmission durations, activity durations, masking durations), within which uplink transmission occasions may be valid. By enabling for uplink transmission occasions to be arranged according to a non-uniform spacing pattern in the time domain, techniques described herein may enable improved coordination of downlink reception occasions and uplink transmission occasions. The improved coordination of downlink reception occasions and uplink transmission occasions may reduce interruptions of discontinuous reception (DRX) sleep cycles, thereby reducing power consumption at the communication device, improving communication device battery performance, and improving user experience.

A method of wireless communication at a UE is described. The method may include determining a downlink configuration including a set of resources for receiving downlink transmissions, determining a grant for performing uplink transmissions based at least in part on an RRC message, determining, based on the downlink configuration, the grant, or both, an uplink configuration including a set of resources for transmitting the uplink transmissions at a set of uplink transmission occasions, where the set of uplink transmission occasions are arranged according to a non-uniform spacing pattern in a time domain, and transmitting, to a base station, one or more uplink transmission based on the uplink configuration.

An apparatus for wireless communication is described. The apparatus may include a processor, memory coupled with the processor, and instructions stored in the memory. The instructions may be executable by the processor to cause the apparatus to determine a downlink configuration including a set of resources for receiving downlink transmissions, determine a grant for performing uplink transmissions based at least in part on an RRC message, determine, based on the downlink configuration, the grant, or both, an uplink configuration including a set of resources for transmitting the uplink transmissions at a set of uplink transmission occasions, where the set of uplink transmission occasions are arranged according to a non-uniform spacing pattern in a time domain, and transmit, to a base station, one or more uplink transmission based on the uplink configuration.

Another apparatus for wireless communication is described. The apparatus may include means for determining a downlink configuration including a set of resources for receiving downlink transmissions, determining a grant for performing uplink transmissions based at least in part on an RRC message, determining, based on the downlink configuration, the grant, or both, an uplink configuration including a set of resources for transmitting the uplink transmissions at a set of uplink transmission occasions, where the set of uplink transmission occasions are arranged according to a non-uniform spacing pattern in a time domain, and transmitting, to a base station, one or more uplink transmission based on the uplink configuration.

A non-transitory computer-readable medium storing code for wireless communication at a UE is described. The code may include instructions executable by a processor to determine a downlink configuration including a set of resources for receiving downlink transmissions, determine a grant for performing uplink transmissions based at least in part on an RRC message, determine, based on the downlink configuration, the grant, or both, an uplink configuration including a set of resources for transmitting uplink transmissions at a set of uplink transmission occasions, where the set of uplink transmission occasions are arranged according to a non-uniform spacing pattern in the time domain, and transmit, to a base station, one or more uplink transmission based on the uplink configuration.

Some examples of the method, apparatuses, and non-transitory computer-readable medium described herein may further include operations, features, means, or instructions for receiving, from the base station, the RRC message including an indication of the grant for performing the uplink transmissions, where determining the uplink configuration may be based on receiving the RRC message.

In some examples of the method, apparatuses, and non-transitory computer-readable medium described herein, the non-uniform spacing pattern includes a repeating periodicity format defining periodicities between adjacent uplink transmission occasions of the set of uplink transmission occasions.

In some examples of the method, apparatuses, and non-transitory computer-readable medium described herein, the repeating periodicity format includes a first periodicity and a second periodicity different from the first periodicity, the first periodicity and the second periodicity separating adjacent uplink transmission occasions of the set of uplink transmission occasions in the time domain.

In some examples of the method, apparatuses, and non-transitory computer-readable medium described herein, each iteration of the repeating periodicity format defines the first periodicity between a first uplink transmission occasion and a second uplink transmission occasion, the first periodicity between the second uplink transmission occasion and a third uplink transmission occasion, and the second periodicity between the third uplink transmission occasion and a fourth uplink transmission occasion.

In some examples of the method, apparatuses, and non-transitory computer-readable medium described herein, the non-uniform spacing pattern includes a repeating offset format defining time offsets between a reference time and a set of adjacent uplink transmission occasions of the set of uplink transmission occasions.

In some examples of the method, apparatuses, and non-transitory computer-readable medium described herein, each iteration of the repeating offset format defines a first offset between the reference time and a first uplink transmission occasion, a second offset between the reference time and a second uplink transmission occasion, and a third offset between the reference time and a third uplink transmission occasion.

Some examples of the method, apparatuses, and non-transitory computer-readable medium described herein may further include operations, features, means, or instructions for determining a set of uplink transmission durations based on the repeating offset format, each uplink transmission duration including one or more symbols in the time domain, and determining a set of uplink symbols within the set of uplink transmission durations, where the set of uplink transmission occasions include the set of uplink symbols, and where the one or more uplink transmissions may be transmitted within one or more uplink symbols of the set of uplink symbols.

Some examples of the method, apparatuses, and non-transitory computer-readable medium described herein may further include operations, features, means, or instructions for determining an activity cycle of the UE, the activity cycle including a set of active durations of operation at the UE and a set of inactive durations of operation at the UE, and determining a set of uplink symbols within the set of active durations of operation at the UE, where the set of uplink transmission occasions include the set of uplink symbols, and where the one or more uplink transmissions may be transmitted within one or more uplink symbols of the set of uplink symbols.

In some examples of the method, apparatuses, and non-transitory computer-readable medium described herein, the activity cycle includes a masking cycle of the UE.

In some examples of the method, apparatuses, and non-transitory computer-readable medium described herein, the activity cycle includes a DRX cycle of the UE.

Some examples of the method, apparatuses, and non-transitory computer-readable medium described herein may further include operations, features, means, or instructions for determining a DRX cycle of the UE, the DRX cycle including a set of active periods of operation at the UE and a set of inactive periods of operation at the UE, determining a set of uplink transmission windows based on the DRX cycle, and determining a set of uplink symbols within the set of uplink transmission windows, where the set of uplink transmission occasions include the set of uplink symbols, and where the one or more uplink transmissions may be transmitted within one or more uplink symbols of the set of uplink symbols.

In some examples of the method, apparatuses, and non-transitory computer-readable medium described herein, an ending time of each uplink transmission window coincides with a start time of an active period of the set of active periods of the DRX cycle.

In some examples of the method, apparatuses, and non-transitory computer-readable medium described herein, determining the set of uplink transmission windows based on the DRX cycle may include operations, features, means, or instructions for determining at least one of an offset or a duration associated with each uplink transmission window of the set of uplink transmission windows relative to a start time of each active period of the DRX cycle.

In some examples of the method, apparatuses, and non-transitory computer-readable medium described herein, the set of resources for receiving downlink transmissions includes a set of downlink reception occasions arranged according to a uniform spacing pattern in the time domain.

Some examples of the method, apparatuses, and non-transitory computer-readable medium described herein may further include operations, features, means, or instructions for determining the set of uplink transmission occasions according to an equation Floor(mod(k−Offset, P))=0 where $k=n_f*N_{\{slot\}}^{\{frame,\mu\}}+n_{\{s,f\}}^{\{\mu\}}$, where k defines a symbol of an uplink transmission occasion of the set of uplink transmission occasions, P defines a periodicity between adjacent uplink transmission occasions, mod includes a modular operation, Floor defines a flooring operation, Offset defines an offset between a reference time and the uplink transmission occasion of the set of uplink transmission occasions, $n_f$ defines a frame number, $N_{\{slot\}}^{\{frame,\mu\}}$ defines a quantity of slots per frame, and $n_{\{s,f\}}^{\{\mu\}}$ defines a slot number within the frame.

A method of wireless communication at a base station is described. The method may include determining a downlink configuration including a set of resources for transmitting downlink transmissions to a UE, determining a grant for the UE to perform uplink transmissions based on a RRC message, determining, based on the downlink configuration, the grant, or both, an uplink configuration including a set of resources for receiving uplink transmissions from the UE at a set of uplink transmission occasions, where the set of uplink transmission occasions are arranged according to a non-uniform spacing pattern in the time domain, and receiving, from the UE, one or more uplink transmissions based on the uplink configuration.

An apparatus for wireless communication at a base station is described. The apparatus may include a processor, memory coupled with the processor, and instructions stored in the memory. The instructions may be executable by the processor to cause the apparatus to determine a downlink configuration including a set of resources for transmitting downlink transmissions to a UE, determine a grant for the UE to perform uplink transmissions based on a RRC message, determine, based on the downlink configuration, the grant, or both, an uplink configuration including a set of resources for receiving uplink transmissions from the UE at a set of uplink transmission occasions, where the set of uplink transmission occasions are arranged according to a non-uniform spacing pattern in the time domain, and receive, from the UE, one or more uplink transmissions based on the uplink configuration.

Another apparatus for wireless communication at a base station is described. The apparatus may include means for determining a downlink configuration including a set of resources for transmitting downlink transmissions to a UE, determining a grant for the UE to perform uplink transmissions based on a RRC message, determining, based on the downlink configuration, the grant, or both, an uplink configuration including a set of resources for receiving uplink transmissions from the UE at a set of uplink transmission occasions, where the set of uplink transmission occasions are arranged according to a non-uniform spacing pattern in the time domain, and receiving, from the UE, one or more uplink transmissions based on the uplink configuration.

A non-transitory computer-readable medium storing code for wireless communication at a base station is described. The code may include instructions executable by a processor to determine a downlink configuration including a set of resources for transmitting downlink transmissions to a UE, determine a grant for the UE to perform uplink transmissions based on a RRC message, determine, based on the downlink configuration, the grant, or both, an uplink configuration including a set of resources for receiving uplink transmissions from the UE at a set of uplink transmission occasions, where the set of uplink transmission occasions are arranged according to a non-uniform spacing pattern in the time domain, and receive, from the UE, one or more uplink transmissions based on the uplink configuration.

Some examples of the method, apparatuses, and non-transitory computer-readable medium described herein may further include operations, features, means, or instructions for transmitting, to the UE, the RRC message including an indication of the grant for performing uplink transmissions, where receiving the one or more uplink transmissions may be based on transmitting the RRC message.

In some examples of the method, apparatuses, and non-transitory computer-readable medium described herein, the non-uniform spacing pattern includes a repeating periodicity format defining periodicities between adjacent uplink transmission occasions of the set of uplink transmission occasions.

In some examples of the method, apparatuses, and non-transitory computer-readable medium described herein, the repeating periodicity format includes a first periodicity and a second periodicity different from the first periodicity, the first periodicity and the second periodicity separating adjacent uplink transmission occasions of the set of uplink transmission occasions in the time domain.

In some examples of the method, apparatuses, and non-transitory computer-readable medium described herein, each iteration of the repeating periodicity format defines the first periodicity between a first uplink transmission occasion and a second uplink transmission occasion, the first periodicity between the second uplink transmission occasion and a third uplink transmission occasion, and the second periodicity between the third uplink transmission occasion and a fourth uplink transmission occasion.

In some examples of the method, apparatuses, and non-transitory computer-readable medium described herein, the non-uniform spacing pattern includes a repeating offset format defining time offsets between a reference time and a set of adjacent uplink transmission occasions of the set of uplink transmission occasions.

In some examples of the method, apparatuses, and non-transitory computer-readable medium described herein, each iteration of the repeating offset format defines a first offset between the reference time and a first uplink transmission occasion, a second offset between the reference time and a second uplink transmission occasion, and a third offset between the reference time and a third uplink transmission occasion.

Some examples of the method, apparatuses, and non-transitory computer-readable medium described herein may further include operations, features, means, or instructions for determining a set of uplink transmission durations based on the repeating offset format, each uplink transmission duration including one or more symbols in the time domain, and determining a set of uplink symbols within the set of uplink transmission durations, where the set of uplink transmission occasions include the set of uplink symbols, and where the one or more uplink transmissions may be received within one or more uplink symbols of the set of uplink symbols.

Some examples of the method, apparatuses, and non-transitory computer-readable medium described herein may further include operations, features, means, or instructions for determining an activity cycle of the UE, the activity cycle including a set of active durations of operation at the UE and a set of inactive durations of operation at the UE, and determining a set of uplink symbols within the set of active durations of operation at the UE, where the set of uplink transmission occasions include the set of uplink symbols, and where the one or more uplink transmissions may be received within one or more uplink symbols of the set of uplink symbols.

In some examples of the method, apparatuses, and non-transitory computer-readable medium described herein, the activity cycle includes a masking cycle of the UE.

In some examples of the method, apparatuses, and non-transitory computer-readable medium described herein, the activity cycle includes a DRX cycle of the UE.

Some examples of the method, apparatuses, and non-transitory computer-readable medium described herein may further include operations, features, means, or instructions for determining a DRX cycle of the UE, the DRX cycle including a set of active periods of operation at the UE and a set of inactive periods of operation at the UE, determining a set of uplink transmission windows based on the DRX cycle, and determining a set of uplink symbols within the set of uplink transmission windows, where the set of uplink transmission occasions include the set of uplink symbols, and where the one or more uplink transmissions may be received within one or more uplink symbols of the set of uplink symbols.

In some examples of the method, apparatuses, and non-transitory computer-readable medium described herein, an ending time of each uplink transmission window coincides with a start time of an active period of the set of active periods of the DRX cycle.

In some examples of the method, apparatuses, and non-transitory computer-readable medium described herein, determining the set of uplink transmission windows based on the DRX cycle may include operations, features, means, or instructions for determining at least one of an offset or a duration associated with each uplink transmission window of the set of uplink transmission windows relative to a start time of each active period of the DRX cycle.

In some examples of the method, apparatuses, and non-transitory computer-readable medium described herein, the set of resources for transmitting downlink transmissions includes a set of downlink transmission occasions arranged according to a uniform spacing pattern in the time domain.

Some examples of the method, apparatuses, and non-transitory computer-readable medium described herein may further include operations, features, means, or instructions for determining the set of uplink transmission occasions according to an equation Floor(mod(k−Offset, P))=0 where $k=n_f*N_{\{slot\}}^{\{frame,\mu\}}+n_{\{s,f\}}^{\{\mu\}}$, where k defines a symbol of an uplink transmission occasion of the set of uplink transmission occasions, P defines a periodicity between adjacent uplink transmission occasions, mod includes a modular operation, Floor defines a flooring operation, Offset defines an offset between a reference time and the uplink transmission occasion of the set of uplink transmission occasions, $n_f$ defines a frame number, $N_{\{slot\}}^{\{frame,\mu\}}$ defines a quantity of slots per frame, and $n_{\{s,f\}}^{\{\mu\}}$ defines a slot number within the frame.

DETAILED DESCRIPTION

Figure 1:
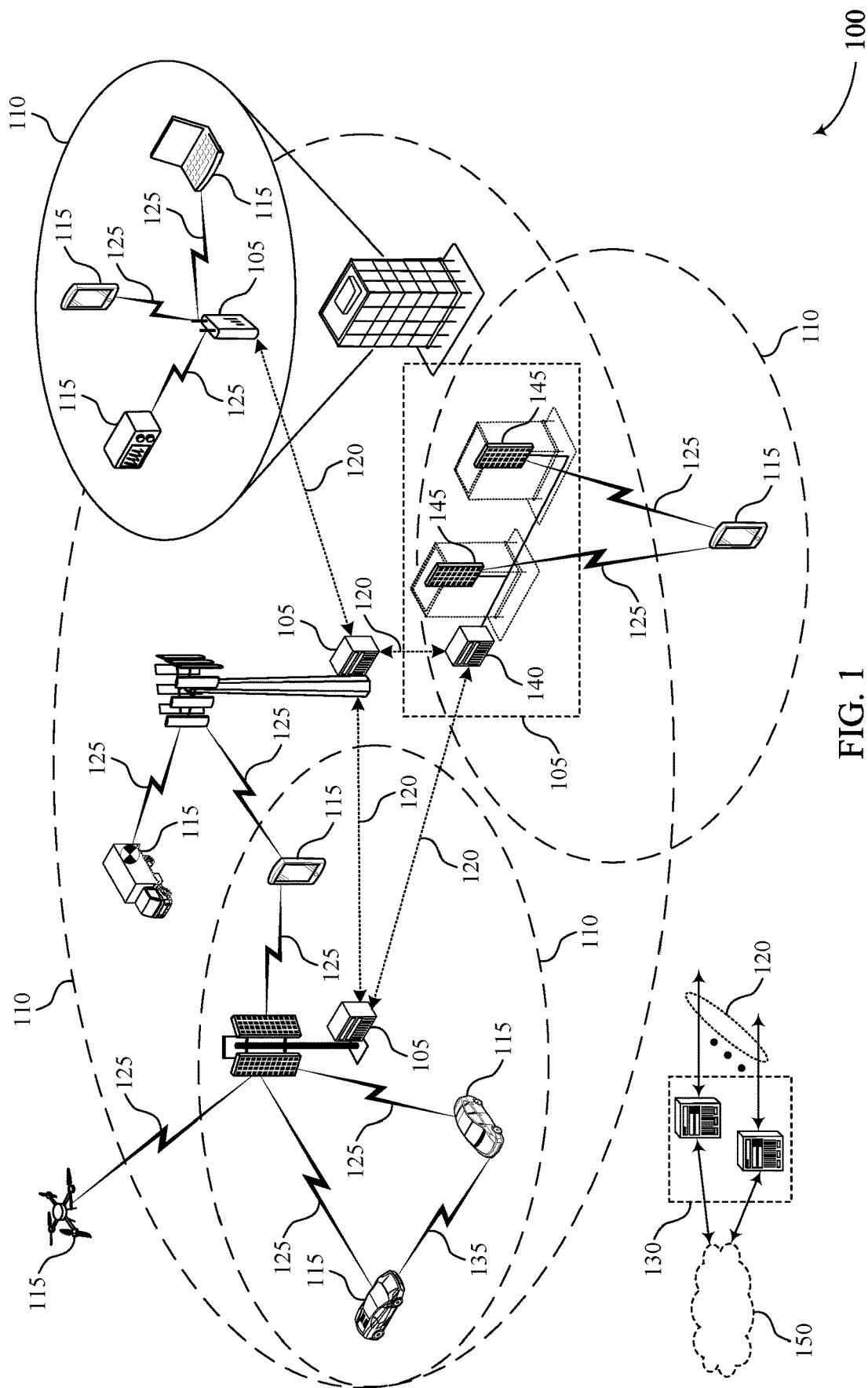
FIGS. 1 and 2 illustrate examples of wireless communications systems that support techniques for enhanced configured grant configuration in accordance with aspects of the present disclosure.

A communication device may receive downlink transmissions according to a downlink configuration at regular (e.g., uniform, evenly-distributed) downlink reception occasions. For example, a communication device running a virtual reality (VR) or augmented reality (AR) application (which may be referred to generally as extended reality (XR) applications) may receive data bursts that correspond to frame rates of the data that is communicated with the communication device. For instance, a communication device running an XR application may receive downlink frames every 8.33 ms in accordance with a 120 Hz frame generation periodicity. In some aspects, the communication device may additionally be configured to transmit uplink data (e.g., pose information, control information, scene information) via uplink transmissions according to a configured grant. The uplink transmissions associated with the configured grant may be transmitted according to an uplink configuration, which arranges uplink transmission occasions at regular intervals. For example, an uplink configuration may include uplink transmission occasions every 8 milliseconds (ms).

In some cases, the difference between downlink reception occasions (e.g., a downlink reception occasion every 8.33 ms) and the uplink transmission occasions (e.g., an uplink transmission occasion every 8 ms) may result in a mismatch (e.g., offset) between downlink reception occasions and uplink transmission occasions. The mismatch between the downlink reception occasions and the uplink transmission occasions may increase a power consumption by the communication device. Additionally, the mismatch between the downlink reception occasions and the uplink transmission occasions may interrupt a DRX cycle at the communication device, as the communication device may have to exit an inactive period of the DRX cycle more often, or remain in an active period of the DRX cycle for a longer duration, in order to handle both the mismatched downlink reception occasions and the uplink transmission occasions. Therefore, increasing the power consumption of the communication device 115, such mismatches may result in reduced battery performance and/or overall lower customer experience.

Techniques for enhanced configured grant configurations including configured grants, which include uplink transmission occasions arranged according to a non-uniform spacing pattern may enable improved coordination between downlink reception occasions and uplink transmission occasions. For example, a communication device may determine a downlink configuration including downlink reception/transmission occasions arranged according to a uniform spacing pattern in the time domain (e.g., downlink reception occasions every 8.33 ms). The communication device may determine a grant (e.g., configured grant) for performing uplink transmissions. In some aspects, the grant may be configured via RRC signaling. The communication device may determine an uplink configuration with uplink transmission occasions arranged according to a non-uniform spacing pattern in the time domain based on the downlink configuration, the grant, or both. The non-uniform spacing pattern of the uplink configuration may be configured/determined such that uplink transmission occasions of the uplink configuration overlap with, or correspond to, or are otherwise proximate to downlink reception occasions of the downlink configuration.

The non-uniform spacing pattern of the uplink configuration may be based on a repeating periodicity format with multiple periodicities, a repeating offset format with multiple offsets, or both. Additionally or alternatively, the communication device may define durations of time (e.g., uplink transmission durations, activity durations, masking durations) within which uplink transmission occasions may be valid. By enabling for uplink transmission occasions to be arranged according to a non-uniform spacing pattern in the time domain, techniques described herein may enable improved coordination of downlink reception occasions and uplink transmission occasions. The improved coordination of downlink reception occasions and uplink transmission occasions may reduce interruptions of DRX sleep cycles, thereby reducing power consumption at the communication device, improving battery performance for the communication device, and improving user experience.

Aspects of the disclosure are initially described in the context of wireless communications systems. Additional aspects of the disclosure are described in the context of an example communications configuration, example resource allocation schemes, and an example process flow. Aspects of the disclosure are further illustrated by and described with reference to apparatus diagrams, system diagrams, and flowcharts that relate to techniques for enhanced uplink transmission configuration.

FIG. 1 illustrates an example of a wireless communications system 100 that supports techniques for enhanced configured grant configuration in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, in the wireless communications system 100, mismatches between downlink reception occasions and uplink transmission occasions at a UE 115 may disrupt DRX cycles at the UE 115, thereby reducing the effectiveness for DRX cycles, increasing power consumption, and reducing battery performance. To improve wireless communications and reduce power consumption, the UEs 115 and the base stations 105 of the wireless communications system 100 may support techniques for enhanced configured grant configurations. In some examples, configured grants may include uplink transmission occasions arranged according to a non-uniform spacing pattern that may enable improved coordination between downlink reception occasions and uplink transmission occasions.

One or both of a UE 115 or a base station 105 of the wireless communications system 100 may determine a downlink configuration including downlink reception/transmission occasions arranged according to a uniform spacing pattern in a time domain (e.g., downlink reception occasions every 8.33 ms). The UE 115 may additionally determine a grant (e.g., configured grant) for performing uplink transmissions. In some aspects, the grant (e.g., configured grant) may be configured via RRC signaling. One or more of the UE 115 or the base station 105 may determine an uplink configuration with uplink transmission occasions arranged according to a non-uniform spacing pattern in the time domain based on the downlink configuration, the grant, or both.

The non-uniform spacing pattern of the uplink configuration may be configured/determined such that uplink transmission occasions of the uplink configuration overlap with, or correspond to, or are otherwise proximate to downlink reception occasions of the downlink configuration. The UE 115 may transmit uplink transmissions to the base station 105 based on (e.g., in accordance with) the uplink configuration. In some aspects, the non-uniform spacing pattern of the uplink configuration may be based on a repeating periodicity format with multiple periodicities, a repeating offset format with multiple offsets, or both. Additionally or alternatively, one or both of the UE 115 or the base station 105 may define durations of time (e.g., uplink transmission durations, activity durations, masking durations) within which uplink transmission occasions may be valid.

The techniques described herein may provide for reduced power consumption and improved battery performance at the UE 115. By enabling for uplink transmission occasions to be arranged according to a non-uniform spacing pattern in the time domain, techniques described herein may enable improved coordination of downlink reception occasions and uplink transmission occasions. The improved coordination of downlink reception occasions and uplink transmission occasions may reduce interruptions of DRX sleep cycles, thereby reducing power consumption at the UE 115, improving UE 115 battery performance, and improving user experience within the wireless communications system 100.

Figure 2:
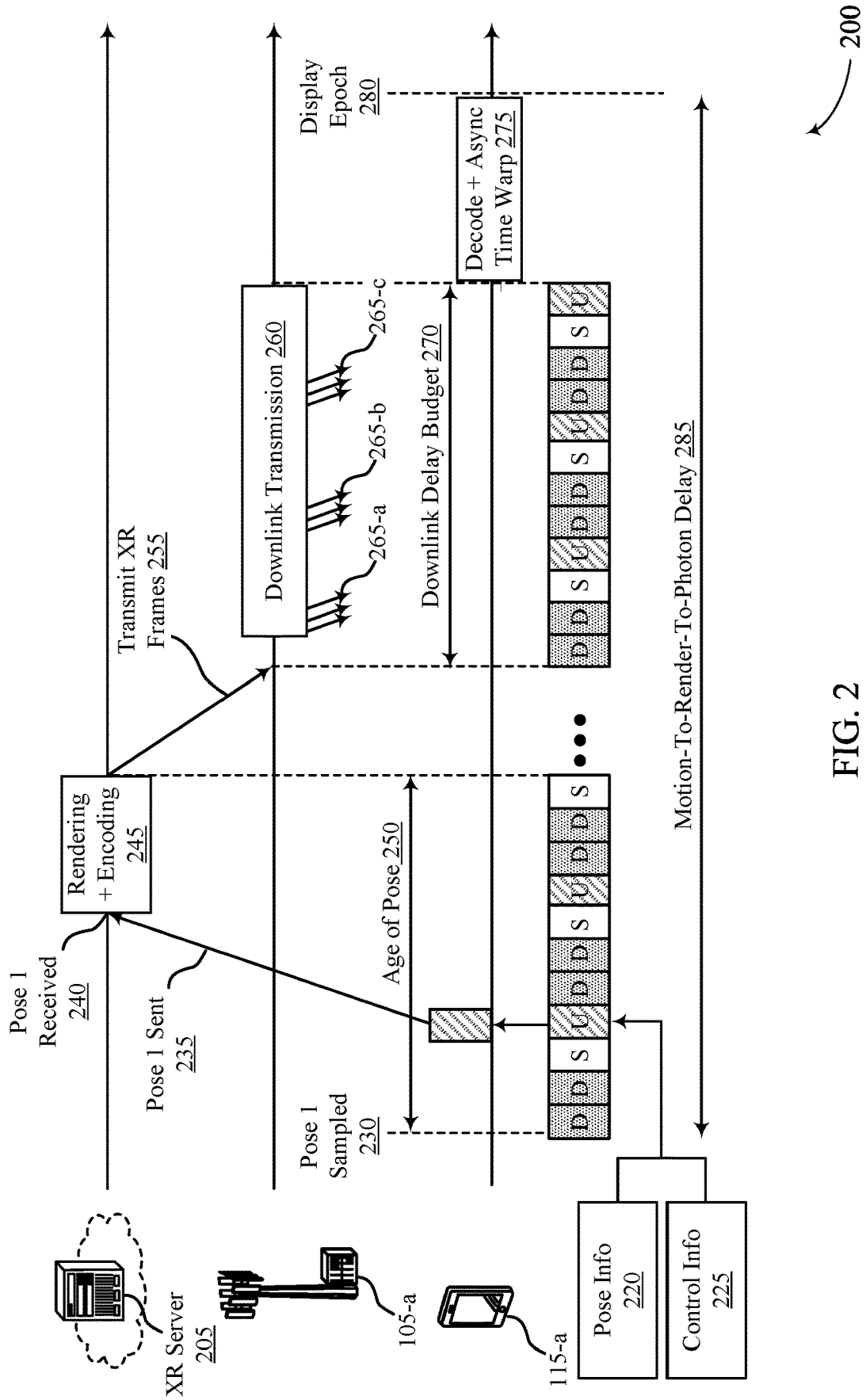

FIG. 2 illustrates an example of a wireless communications system 200 that supports techniques for enhanced configured grant configuration in accordance with aspects of the present disclosure. In some examples, the wireless communications system 200 may implement or be implemented by one or more aspects of the wireless communications system 100. In some aspects, the wireless communications system 200 may illustrate an example flow of data within a wireless communications system (e.g., wireless communications system 100), which is configured for XR communications. In this regard, the wireless communications system 200 illustrates the flow of information between a UE 115-a, a base station 105-a, and an XR server 205.

The UE 115-a may be configured to acquire information for XR applications (e.g., AR applications, VR applications). For example, the UE 115-a may acquire pose information 210 and control information 215. The pose information 210 may include information associated with the pose, posture, position, orientation, or movement of a user, and may be acquired via imaging devices including head-mounted units (HMUs), head-mounted displays (HMDs), external imaging devices, or any combination thereof. In this regard, the pose information 210 may include data regarding the freedom of movement of the user, and may be characterized by six degrees of freedom in which a user/object may change position (e.g., translation upwards/downwards, translation left/right, translation forwards/backwards, pitch, yaw, roll). The control information 215 may refer to other inputs or commands input by a user, such as movement/commands with a joystick, controller, or other device. The UE 115-a may additionally acquire scene information. Scene information may include images and/or video of a surrounding environment, and may be acquired in the context of AR applications along with the pose information 210, the control information 215, or both.

At 220, the UE 115 may sample the pose information 210, the control information 215, scene information, or any combination thereof. In this regard, the UE 115-a may acquire information, at 230, which is to be transmitted to the XR server and/or the base station 105-a. For example, the UE 115-a may sample Pose 1, at 230. In some aspects, the pose information 210 and the control information 215 may be acquired (e.g., sampled) at a data rate of approximately 0.5-2 Mbps, and may be transmitted to the XR server 205 approximately every 2 ms (e.g., 500 Hz). Additionally, the pose information 210, the control information 215, or both, may be sampled and/or transmitted with a file size of 1 Kbit (e.g., 125 bytes), or 4 Kbit (e.g., 500 bytes). Scene information may be acquired (e.g., sampled) at a data rate of approximately 10 Mbps, and may be transmitted to the XR server 205 at a rate of 10 Hz. Additionally, scene information may be sampled and/or transmitted with a file size of 1 Mbits per 100 ms (e.g., 125 kbytes).

At 225, the UE 115-a may transmit the sampled information (transmit Pose 1) to the XR server 205. In some aspects, the UE 115-a may transmit the sampled information within the first uplink symbol following the time in which the information (e.g., the pose information 210, the control information 215, scene information) was sampled. At 230, the sampled information may be received at the XR server 205. At 235, the XR server 205 may render and encode a new XR frame based on (e.g., according to) the received information (Pose 1). In some aspects, XR frames may be generated periodically, and may be divided into multiple slices that are encoded separately. As shown in FIG. 2, the age of acquired information (e.g., age of pose 240) may be defined as the duration between when the information was sampled (e.g., Pose 1 sampled at 220) and when the XR is rendered and/or encoded at the XR server 205. In some aspects, the XR server 205 may encode/render XR frames according to a predefined frame generation periodicity. For example, the XR server 205 may encode XR frames at 120 frames per second (fps), 90 fps, 60 fps, 45 fps, and the like.

At 235, the XR frame may be transmitted to the base station 105-a. In some aspects, each encoded slice (or file) of the XR frame may be transmitted from the XR server 205 to the base station 105-a separately. At 250, the base station 105-a may transmit the received XR frames to the UE 115-a. In some aspects, the slices of the XR frame may be transmitted through multiple transport blocks (TBs), or a burst of TBs, to the UE 115-a. For example, as will be discussed in further detail herein with respect to FIG. 3, the base station 105-a may transmit data to the UE 115-a via XR frame bursts 255 (e.g., a first XR frame burst 255-a, a second XR frame burst 255-b, and a third XR frame burst 255-c). In some aspects, the rate at which XR frames are transmitted between the XR server 205 and the base station 105-a, between the base station 105-a and the UE 115-a, or both, may be based on the frame generation periodicity at the XR server 205 (e.g., 120 fps, 90 fps, 60 fps, 45 fps). Each XR frame burst 255 may have a transmission delay requirement, and the downlink transmission from the base station 105-a to the UE 115-a may be characterized by a downlink delay budget 260. At 265, the UE 115-a may decode the data received from the base station 105-a (e.g., decode one or more of the XR frame bursts 255) and perform asynchronous time warp procedures. Subsequently, at 270, the received XR frames may be displayed at the UE 115-a. The example of FIG. 2 may depict a delay (e.g., a motion-to-render-to-photon delay 275) from motion to rendering to photon.

In some cases, based on the quasi-periodic arrival at the UE 115-a of XR frames (e.g., receiving an XR frame burst 255 every 8.33 ms for 120 fps; 16.67 ms for 60 fps), it can be predicted when the UE 115-a should wake up to receive the XR frame bursts 255. Such periodic communications may enable the UE 115-a to enter periods of a lower power mode of operation, inactive periods of a DRX cycle, or both, in order to reduce power consumption and improve battery performance. In some cases, DRX cycles at the UE 115-a may be configured at intervals of 1 ms. In cases where the XR frame bursts 255 are received at intervals which are not integer ms values (e.g., 8.33 ms, 16.67 ms), DRX cycles at the UE 115-a may be unable to align with the downlink reception occasions, thereby resulting in a mismatch after short durations of times. In some cases, the UE 115-a may be configured to transmit uplink data (e.g., the pose information 210, the control information 215, scene information) via uplink transmissions to the base station 105-a. In some cases, uplink transmission occasions may be unable to conform to the timing of the XR frame bursts 255. In such cases, a DRX cycle of the UE 115-a may be interrupted to allow the UE 115-a to transmit uplink transmissions.

To reduce power consumption at the UE 115-a, techniques for enhanced configured grant configurations are disclosed. According to aspects of the present disclosure, the wireless communications system 200 may support configured grants including uplink transmission occasions which are arranged to a non-uniform spacing pattern in order to improve coordination between downlink reception occasions at the UE 115-a (e.g., occasions for receiving XR frame bursts 255) and uplink transmission occasions. By improving coordination between downlink reception occasions and uplink transmission occasions, techniques described herein may enable improved DRX cycles, thereby improving power savings and leading to improved battery performance and user experience. Attendant advantages of the present disclosure will be described in further detail herein with respect to FIGS. 3-11.

Figure 3:
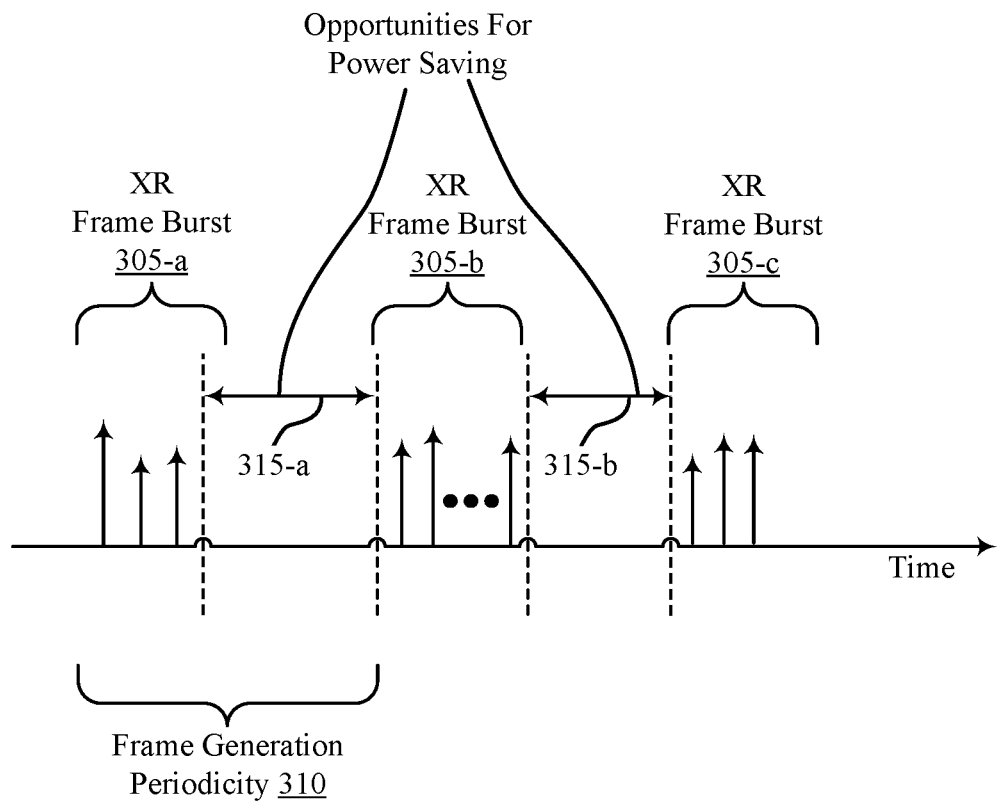
FIG. 3 illustrates an example of a communications configuration that supports techniques for enhanced configured grant configuration in accordance with aspects of the present disclosure.

FIG. 3 illustrates an example of a communications configuration 300 that supports techniques for enhanced configured grant configuration in accordance with aspects of the present disclosure. In some examples, the communications configuration 300 may implement, or be implemented by, aspects of the wireless communications system 100, the wireless communications system 200, or both. In this example, a UE 115 (e.g., a UE 115 of FIG. 1 or 2) may engage in XR type communications with a base station 105 (e.g., a base station 105 of FIG. 1 or 2). As discussed herein, such XR communications may provide relatively large amounts of data in communications bursts.

For example, a number of XR frame bursts 305 may be transmitted from the base station 105 to the UE 115. The XR frame bursts 305 illustrated in FIG. 3 may include examples of the XR frame bursts 255 illustrated in FIG. 2. The XR frame bursts 305 may be transmitted according to a frame generation periodicity 310, which may be based on a frame rate of the XR application (e.g., a 60 Hz or 120 Hz frame rate, which provide a frame generation periodicity of 16.67 ms or 8.33 ms, respectively). Thus, in such cases, the UE 115 may receive such bursts, and opportunities for power saving 315 may be present between the XR frame bursts 305. As discussed above, an XR frame may be divided into multiple slices that may be separately encoded, and each encoded slice (or file) sent from an XR server to the base station 105. The base station 105 may transmit the slices over the air through multiple TBs (a burst of TBs).

In some aspects, the UE 115 may enter a low power mode, an inactive period of a DRX cycle, or both, throughout the opportunities for power saving 315-a and 315-b. Subsequently, the UE 115 may enter a higher power mode, an active period of a DRX cycle, or both, in order to receive the XR frame bursts 305. However, in some cases, the UE 115 may be configured to transmit uplink data (e.g., pose information, control information) via uplink transmissions to the base station 105 and/or another wireless device (e.g., XR server). In some wireless communications systems, uplink transmission occasions may not sufficiently conform to the timing of the XR frame bursts 305 such that the uplink transmission occasions fall within the opportunities for power saving 315-a and 315-b. In such cases, DRX cycle of the UE 115 may be interrupted to allow the UE 115 to transmit uplink transmissions during the opportunities for power saving 315, thereby leading to increased power consumption, decreased power consumption, and overall lower customer experience.

To reduce power consumption at the UE 115, techniques for enhanced configured grant configurations are disclosed. In particular, according to aspects of the present disclosure, the communications configuration 300 may support configured grants including uplink transmission occasions which are arranged to a non-uniform spacing pattern in order to improve coordination between downlink reception occasions at the UE 115 (e.g., occasions for XR frame bursts 305) and uplink transmission occasions. By improving coordination between downlink reception occasions and uplink transmission occasions, techniques described herein may enable improved DRX cycles, thereby improving power savings and leading to improved battery performance and user experience. Attendant advantages of the present disclosure will be described in further detail herein with respect to FIGS. 4-11.

Figure 4:
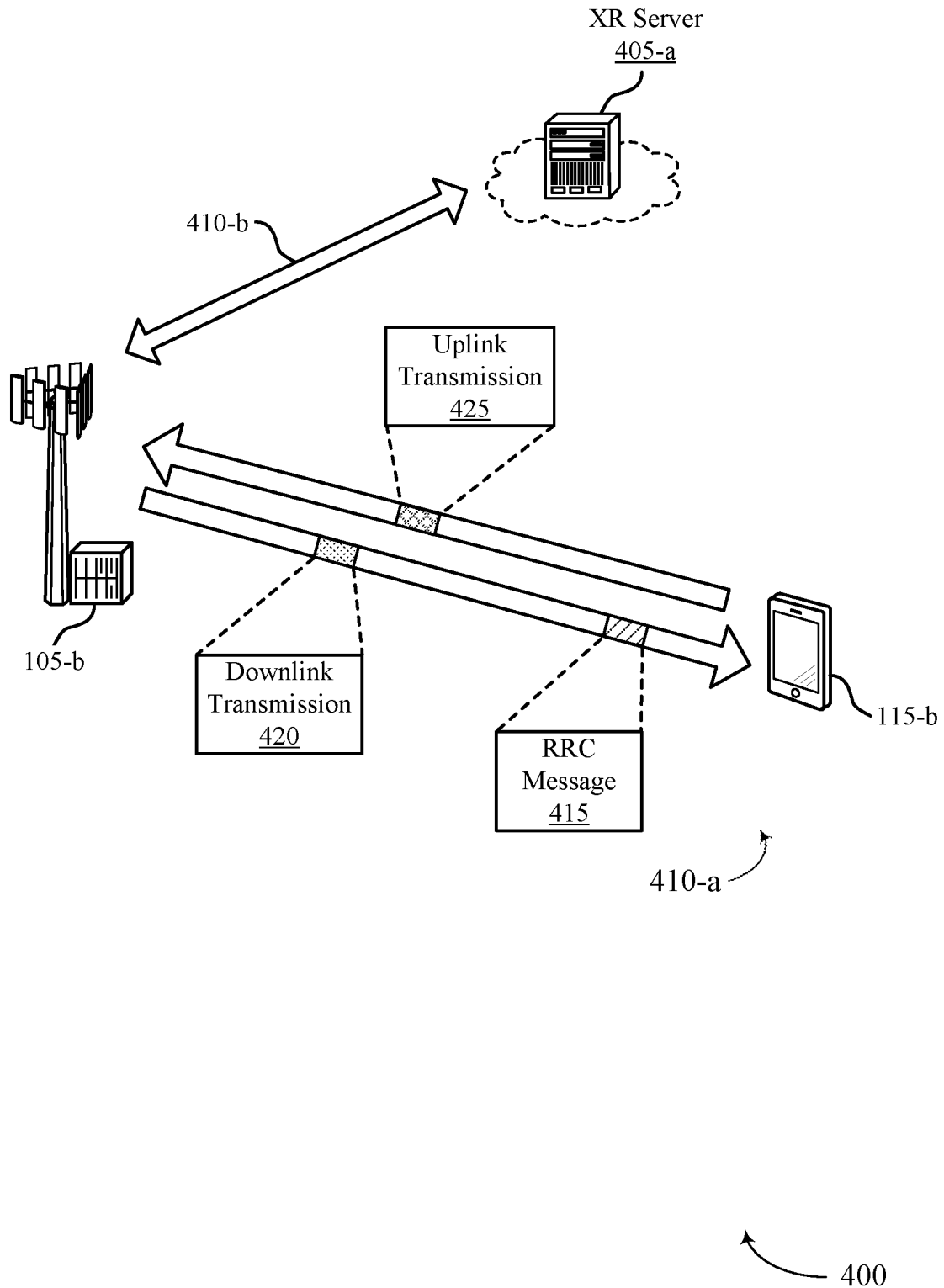
FIG. 4 illustrates an example of a wireless communications system that supports techniques for enhanced configured grant configuration in accordance with aspects of the present disclosure.

FIG. 4 illustrates an example of a wireless communications system 400 that supports techniques for enhanced configured grant configuration in accordance with aspects of the present disclosure. In some examples, the wireless communications system 400 may implement aspects of the wireless communications system 100, the wireless communications system 200, the communications configuration 300, or any combination thereof. The wireless communications system 400 may include a UE 115-$b$, a base station 105-$b$, and an XR server 405-$a$, which may be examples of UEs 115 and base stations 105, as described with reference to FIGS. 1-3.

The UE 115-$b$ may communicate with the base station 105-$b$ using a communication link 410-$a$. In some cases, the communication link 410-$a$ may include an example of an access link (e.g., a Uu link). The communication link 410-$a$ may include a bi-directional link that can include both uplink and downlink communication. For example, the UE 115-$b$ may transmit uplink transmissions, such as uplink control signals or uplink data signals (e.g., uplink transmissions 425, uplink transmissions 435), to the base station 105-$b$ using the communication link 410-$a$, and the base station 105-$b$ may transmit downlink transmissions 420, such as downlink control signals or downlink data signals, to the UE 115-$b$ using the communication link 410-$a$.

Similarly, the base station 105-$b$ may communicate with the XR server 405-$a$ using a communication link 410-$b$. The UE 115-$b$ may communicate with the XR server 405-$a$ through the base station 105-$b$ (e.g., via communication links 410-$a$ and 410-$b$). For example, the UE 115-$b$ may transmit uplink transmissions 425 to the base station 105-$b$ via the communication link 410-$a$, where the base station 105-$b$ may relay or forward the uplink transmissions 425 to the XR server 405-$a$ for processing. The communication links 410-$b$ and 410-$c$ may include unidirectional communication links and/or bidirectional communications links. In the context of an XR application, the UE 115-$b$ may transmit uplink data associated with the XR application (e.g., pose information, control information, scene information) to the XR server 405-$a$ via communication links 410-$a$ and 410-$b$. The XR server 405-$a$ may encode and render XR frames based on the received information, and may transmit XR frames to the base station 105-$b$ via communication link 410-$b$. Subsequently, the base station 105-$c$ may transmit downlink data (e.g., XR frames, XR frame bursts) to the UE 115-$b$ via communication link 410-$a$.

The UE 115-$b$, the base station 105-$b$, and the XR server 405-$a$ of the wireless communications system 400 may support techniques for enhanced configured grant configurations. In particular, the UE 115-$b$ and the base station 105-$b$ of the wireless communications system 400 may support configured grants associated with uplink configurations which include uplink transmission occasions arranged according to a non-uniform spacing pattern. By enabling for uplink transmission occasions to be arranged according to a non-uniform spacing pattern in the time domain, techniques described herein may enable improved coordination of downlink reception occasions and uplink transmission occasions.

For example, the UE 115-$b$, the base station 105-$b$, or both, may determine a downlink configuration for communications between the UE 115-$b$ and the base station 105-$b$. The downlink configuration may include a set of resources usable by the UE 115-$b$ for receiving downlink transmissions 420 from the base station 105-$b$. In this regard, the downlink configuration may include a set of time resources, a set of frequency resources, a set of spatial resources, or any combination thereof. In some aspects, the set of resources of the downlink configuration may include a set of downlink reception occasions (or downlink transmission occasions from the perspective of the base station 105-$b$) arranged according to a uniform spacing pattern in the time domain. For example, in the context of XR applications, the downlink configuration may include a set of downlink reception occasions which are separated by a constant periodicity (e.g., 8.33 ms, 16.67 ms) in the time domain. As noted previously herein, in the context of XR applications, the downlink reception occasions may be based on a frame generation periodicity of XR frames at the XR server 405-$a$.

In some aspects, the base station 105-$b$ may transmit a control message (e.g., RRC message 415) to the UE 115-$b$. In some aspects, the RRC message 415 may include an indication of the downlink configuration determined for communications between the base station 105-$b$ and the UE 115-$b$. Additionally or alternatively, the RRC message 415 may include an indication of a grant (e.g., configured grant) for the UE 115-$a$ to use to perform uplink transmissions 425 to the base station 105-$b$. For example, in cases where the base station 105-$b$ determines the downlink configuration, the base station 105-$b$ may determine a configured grant and/or an uplink configuration based on the downlink configuration, and may transmit the RRC message 415 to the UE 115-$b$, where the RRC message 415 includes an indication of the downlink configuration, the configured grant, the uplink configuration, or any combination thereof.

In some aspects, the UE 115-$b$ may determine a grant (e.g., configured grant) for performing uplink transmissions 425 to the base station 105-$b$, another wireless device (e.g., another UE 115 or other relay wireless device which relays transmissions to the base station 105-$b$), or both. In some aspects, the UE 115-$b$ may be configured to determine the grant (e.g., configured grant) for performing uplink transmissions 425 based on the RRC message 415. In some aspects, the UE 115-$b$, the base station 105-$b$, or both, may additionally determine an uplink configuration for communications between the UE 115-$b$ and the base station 105-$b$, for communications between the UE 115-$b$ and the XR server 405-$a$, or both. In some aspects, the UE 115-$b$ and/or the base station 105-$b$ may determine the uplink configuration based on determining the downlink configuration, receiving the RRC message 415, determining the grant (e.g., configured grant), or any combination thereof. The uplink configuration may include a set of resources for transmitting uplink transmissions 425 at a set of uplink transmission occasions. In this regard, the uplink configuration may include a set of time resources, a set of frequency resources, a set of spatial resources, or any combination thereof. In some aspects, the uplink transmissions 425 of the uplink configuration may be arranged according to a non-uniform spacing pattern in the time domain (e.g., uplink transmission occasions separated by one another by non-equivalent time durations).

In some cases, uplink configurations for transmitting uplink transmission occasions may be associated with a number of different parameters including an uplink transmission occasion periodicity (CG-periodicity), an uplink transmission occasion offset (CG-offset), an uplink transmission prohibit timer (CG-ProhibitTimer), a maximum uplink transmission value (CG-TransMax), or any combination thereof. The uplink transmission periodicity (CG-Periodicity) may define one or more periodicities between uplink transmission occasions in the time domain, and the uplink transmission offset (CG-Offset) may define one or more offsets between one or more reference times and uplink transmission occasions in the time domain. The uplink transmission prohibit timer (CG-ProhibitTimer) may define a minimum time (e.g., 1 ms, 2 ms, 4 ms, 16 ms, 32 ms, 128 ms) between two consecutive uplink transmissions transmitted by the UE 115-b. For example, in cases where the request prohibit timer is 16 ms, if the UE 115-b transmits a first uplink transmission, the UE 115-b may be unable to transmit a second uplink transmission for the next 16 ms even if there are valid uplink transmission occasions within that duration. The maximum uplink transmission value (CG-TransMax) may define a maximum quantity of uplink transmissions (e.g., 4, 8, 16, 32, 64) that the UE 115-b may transmit to the base station 105-b before the UE 115-b is to release the resources (e.g., physical uplink control channel (PUCCH) resources, sounding reference signal (SRS) resources) associated with transmitting the uplink transmissions.

In some aspects, the non-uniform spacing pattern of the uplink configuration may include a repeating periodicity format which defines periodicities between adjacent uplink transmission occasions. The repeating periodicity format may include two or more periodicities, and may be repeated for multiple iterations within the uplink configuration. For example, the non-uniform spacing pattern may include a repeating periodicity format including a first periodicity (e.g., 8 ms) and a second periodicity (e.g., 9 ms) different from the first periodicity, where the first periodicity and the second periodicity separate adjacent uplink transmission occasions within the uplink configuration in the time domain. In this example, the repeating periodicity format including the first periodicity and the second periodicity may be repeated for a quantity of iterations (e.g., first iteration of the repeating periodicity format, second iteration of the repeating periodicity format). In particular, each iteration of the repeating periodicity format may define the first periodicity between a first uplink transmission occasion and a second uplink transmission occasion (e.g., 8 ms between the first and second uplink transmission occasions), the first periodicity between the second uplink transmission occasion and a third uplink transmission occasion (e.g., 8 ms between the second and third uplink transmission occasions), and the second periodicity between the third uplink transmission occasion and a fourth uplink transmission occasion (e.g., 9 ms between the third and fourth uplink transmission occasions).

In additional or alternative aspects, the non-uniform spacing pattern of the uplink configuration may include a repeating offset format which defines time offsets between one or more reference times and a set of adjacent uplink transmission occasions. The repeating offset format may include two or more time offsets, and may be repeated for multiple iterations within the uplink configuration. For example, the non-uniform spacing pattern may include a repeating offset format which defines a first offset between a reference time and a first uplink transmission occasion, a second offset between the reference time and a second uplink transmission occasion, and a third offset between the reference time and a third uplink transmission occasion. In this example, the repeating offset format including the first offset, the second offset, and the third offset may be repeated for a quantity of iterations (e.g., first iteration of the repeating offset format, second iteration of the repeating offset format). In particular, each iteration of the repeating offset format may define the first offset between a reference time and a first uplink transmission occasion, the second offset between the reference time and a second uplink transmission occasion, and the third offset between the reference time and a third uplink transmission occasion.

In some aspects, the UE 115-b may determine one or more uplink transmission durations (e.g., CG-duration). Uplink transmission durations may indicate sets (sub-sets) of time resources in which uplink transmissions 425 may be transmitted. In some aspects, the uplink transmission durations may be associated with the uplink configuration, and may be determined based on a repeating offset format of the non-uniform spacing pattern. In some aspects, each uplink transmission duration may include one or more symbols in the time domain, and may be used to differentiate uplink transmission occasions of the uplink configuration which are valid from uplink transmission occasions which are invalid. In particular, the UE 115-b may be configured to identify uplink symbols (e.g., uplink symbols defining uplink transmission occasions) which are within the uplink transmission durations as valid (e.g., usable, available). Conversely, the UE 115-b may be configured to identify uplink symbols (e.g., uplink symbols defining uplink transmission occasions) which are outside of the uplink transmission durations as invalid (e.g., unusable, unavailable). In some aspects, the uplink transmission durations may be configured by the base station 105-b (e.g., via RRC message 415). Additionally or alternatively, the UE 115-b may be pre-configured with the uplink transmission durations, and may be configured to selectively modify uplink transmission durations based on network conditions.

Additionally or alternatively, the UE 115-b may determine an activity cycle associated with the UE 115-b. The activity cycle may include a making cycle, a DRX cycle, or both. In some aspects, the activity cycle may include a set of active durations of operation at the UE 115-b and a set of inactive durations of operation at the UE 115-b. For example, in the context of a DRX cycle, the DRX cycle may include a set of DRX off durations (e.g., inactive durations) in which the UE 115-b is in a lower power mode of operation, and a set of DRX on durations (e.g., active durations) in which the UE 115-b is in a higher power mode of operation. In some aspects, the activity cycle may be associated with the uplink configuration, and may be determined/configured based on a repeating offset format of the non-uniform spacing pattern. In some aspects, each active duration and/or inactive duration may include one or more symbols in the time domain, and may be used to differentiate uplink transmission occasions of the uplink configuration which are valid from uplink transmission occasions which are invalid. In particular, the UE 115-*b* may be configured to identify uplink symbols (e.g., uplink symbols defining uplink transmission occasions) which are within the set of active durations of operation at the UE 115-*b* as valid (e.g., usable, available). Conversely, the UE 115-*b* may be configured to identify uplink symbols (e.g., uplink symbols defining uplink transmission occasions) which are outside of the set of active durations of operation at the UE 115-*b* (e.g., within the set of inactive durations of operation) as invalid (e.g., unusable, unavailable). In some aspects, the UE 115-*b* may be configured to selectively adjust the activity cycle of the UE 115-*b* (e.g., making cycle, DRX cycle) based on the downlink configuration, the uplink configuration including the non-uniform spacing pattern, or both.

In this regard, the UE 115-*b* may determine valid uplink transmission occasions associated with the uplink configuration. The UE 115-*b* may determine the valid uplink transmission on the determined uplink configuration, the determined downlink configuration, the RRC message 415, the determined grant (e.g., configured grant), or any combination thereof. In some cases, the UE 115-*b* may determine valid uplink transmission occasions by identifying uplink symbols (e.g., uplink symbols defining uplink transmission occasions) which are within the determined uplink transmission durations, which are within the determined active durations of the activity cycle (e.g., masking cycle, DRX cycle), or any combination thereof.

In some aspects, the UE 115-*b* may determine the uplink transmission occasions using one or more equations, algorithms, or other mathematical operations. For example, in some cases, the UE 115-*c* may determine the set of uplink transmission occasions (e.g., set of valid uplink transmission occasions) according to Equation (1) below:

$$\text{Floor}(\text{mod}(k-\text{Offset},P))=0 \quad \text{where} \quad k=n_f * N_{\{slot\}}^{\{frame,\mu\}}+n_{\{s,f\}}^{\{\mu\}} \quad (1)$$

where k defines a symbol of an uplink transmission occasion of the plurality of uplink transmission occasions, P defines a periodicity between adjacent uplink transmission occasions, mod comprises a modular operation, Floor defines a flooring operation, Offset defines an offset between a reference time and the uplink transmission occasion of the plurality of uplink transmission occasions, $n_f$ defines a frame number, $N_{\{slot\}}^{\{frame,\mu\}}$ defines a quantity of slots per frame, and $n_{\{s,f\}}^{\{\mu\}}$ defines a slot number within the frame.

In some cases, Equation (1) may be used to determine uplink transmission occasions at the symbol level (e.g., Offset, k, P may be defined in terms of symbols). Equation (1) may be used to determine a real-numbered uplink transmission periodicity (P) by a floating-point notation. Specifically, the flooring operation (Floor) may be configured to convert real-numbered periodicities to integer-based periodicities. For instance, the flooring operation (Floor) may be configured to convert a periodicity of 8.33 ms to a periodicity of 8 ms, and may be configured to convert a periodicity of 16.67.33 ms to a periodicity of 16 ms.

In some other aspects, the UE 115-*b* may determine (e.g., identify) configured grant resources using one or more equations, algorithms, or other mathematical operations. The UE 115-*b* may determine (e.g., identify) configured grant resources in terms of symbol numbers. In some examples, the Nth (N=0, 1, 2, . . . ) uplink configurated grant may be given in terms of symbol number when Equation (2) below is satisfied $$S_{CN}=\text{ceil}(S_{NG} \text{ modulo } S_{TN}) \quad (2)$$

$S_{CN}$ is the current symbol number, $S_{NG}$ is the symbol number for an Nth grant from start, and $S_{TN}$ is the total number of symbols per SFN. In some examples, ceil( ) is ceiling operation. Alternatively, in some cases, Equation (2) may use a floor( ) operation.

In some examples, $S_{CN}$ may be defined according to Equation (3) below:

$$S_{CN}=[(\text{SFN}\times S_{MPF}\times S_{NPF})+(S_{MF}\times S_{NPF})+S_{NF}] \quad (3)$$

where $S_{MPF}$ is the number of slots per frame, $S_{NPF}$ is the number of symbols per slot, $S_{MF}$ is the slot number in the frame, and $S_{NF}$ is a symbol number in the slot. This is the $S_{CN}$ running between 0 . . . (SFN$_{max}$−1)×$S_{MPF}$×$S_{NPF}$, where $S_{MPF}$ is the number of slots per frame, and $S_{NPF}$ is the number of symbols per slot.

In some examples, $S_{NG}$ may be defined according to Equation (4) below:

$$S_{NG}=(\text{SFN}_{ST}\times S_{MPF}\times S_{NPF}+S_{MST}\times S_{NPF}+S_{NST})+N\times P \quad (4)$$

Equation (4) may define the symbol number for Nth configured grant, where a periodicity is given in the unit of symbols. In some examples, a real number (e.g., 6.668 may be possible). In some examples, SFN$_{ST}$ is the SFN start time and may be the SFN number where the first configured grant starts. $S_{MST}$ is the slot start time and may be the slot number in the frame of the first configured grant. $S_{NST}$ is the symbol start time and may be the symbol number of a slot where the first configured grant starts. P is the periodicity in terms of symbols (e.g., may be a real number) given as periodicity$_{ms}\times$ the number of symbols per 1 ms, where periodicity$_{ms}$ is the periodicity of grant in ms.

In some examples, $S_{TN}$ may be defined according to Equation (5) below:

$$S_{TN}=1024\times S_{MPF}\times S_{NPF} \quad (5)$$

Equation (5) may give the total number of symbols in 1024 SFN.

The UE 115-*b* may receive downlink transmissions 420 from the base station 105-*b*. In some aspects, the UE 115-*b* may receive the downlink transmissions 420 based on (e.g., in accordance with) the determined downlink configuration, the indication of the downlink configuration indicated in the RRC message 415, or both. In the context of XR applications, the XR server 405-*a* may transmit XR data (e.g., XR frames) to the base station 105-*b* via the communication link 410-*c*, and the base station 105-*b* may transmit (e.g., relay) the received XR data to the UE 115-*b* via communication link 410-*a* via downlink transmissions 420. In this example, the downlink transmissions 420 may include XR frames, XR frame bursts, or both, associated with the XR application.

The UE 115-*b* may transmit, to the base station 105-*b*, one or more uplink transmissions 425. In some cases, the UE 115-*b* may transmit the uplink transmissions 425 to the base station 105-*b* such that the base station 105-*b* may transmit (e.g., relay, forward) the uplink transmissions 425 to the XR server 405-*a*. In some aspects, the UE 115-*b* may transmit uplink transmissions 425 to the base station 105-*b* via a physical uplink shared channel (PUSCH). The UE 115-*b* may transmit the one or more uplink transmissions 425 based on identifying that the UE 115-*b* has data which is to be transmitted to the base station 105-*b* and/or another wireless device (e.g., XR server 405-*a*). For example, in the context of XR applications, the UE 115-*b* may transmit the uplink transmissions 425 based on identifying pose information, control information, and/or scene information which is to be transmitted to the XR server 405-*a* to carry out an XR application.

The UE 115-*b* may transmit the uplink transmissions 425 based on identifying data which is waiting to be transmitted, and identifying an absence of uplink grants with which to transmit the data. In some aspects, the UE 115-*b* may transmit the one or more uplink transmissions 425 based on the RRC message 415, the determined grants (e.g., configured grants) for performing uplink transmissions, the determined uplink configuration, the determined downlink configuration, determining the uplink transmission durations, determining the activity cycle and/or DRX cycle of the UE 115-*b*, determining the uplink transmission occasions, or any combination thereof. In some aspects, upon transmitting the uplink transmissions 425 (e.g., uplink transmission pending), the UE 115-*b* may transition into a "uplink transmission active time," as discussed previously herein.

In some aspects, data which is to be transmitted by the UE 115-*b* (e.g., pose information, control information, scene information) may be associated with (e.g., mapped to) one or more logical channels. The logical channels for data transmission at the UE 115-*b* may be associated with (e.g., mapped to) one or more uplink transmission identifiers (IDs), where each uplink transmission ID may be associated with (e.g., mapped to) one or more uplink transmission resources. In this regard, uplink transmissions 425 transmitted by the UE 115-*b* may include an uplink transmission ID such that the base station 105-*b* may be able to determine the logical channels associated with each uplink transmission 425 based on the uplink transmission IDs. Based on the priority and bit-rates of the respective logical channels determined based on the uplink transmission IDs, the base station1 105-*b* may be able to determine and organize uplink grants 430 for use by the UE 115-*b*.

For example, pose information and control information may be associated with a first logical channel, and scene information may be associated with a second logical channel. In this example, the first logical channel may be associated with a higher priority as compared to the second logical channel. Both the first logical channel and the second logical channel may be associated with a single uplink transmission ID (e.g., CG ID=0). In this example, the UE 115-*b* may determine that it has pose information, control information, and/or scene information which is to be transmitted, and may therefore transmit an uplink transmission with an uplink transmission ID associated with the first logical channel and the second logical channel (e.g., CG ID=0). Upon receiving the uplink transmission, the base station 105-*b* may determine a first uplink transmission resource (e.g., CG resource ID=1) and a second uplink transmission resource (e.g., CG resource ID=2) associated with the determined uplink transmission ID, and may determine uplink grants 430 which are usable by the UE 115-*b* based on the determined uplink transmission resources.

The techniques described herein may provide for reduced power consumption and improved battery performance at the UE 115-*b*. In particular, by enabling for uplink transmission occasions to be arranged according to a non-uniform spacing pattern in the time domain, techniques described herein may enable improved coordination of downlink reception occasions and uplink transmission occasions. The improved coordination of downlink reception occasions and uplink transmission occasions may reduce interruptions of DRX sleep cycles, thereby reducing power consumption at the UE 115-*b*, improving UE 115-*b* battery performance, and improving user experience within the wireless communications system 400.

Figure 5:
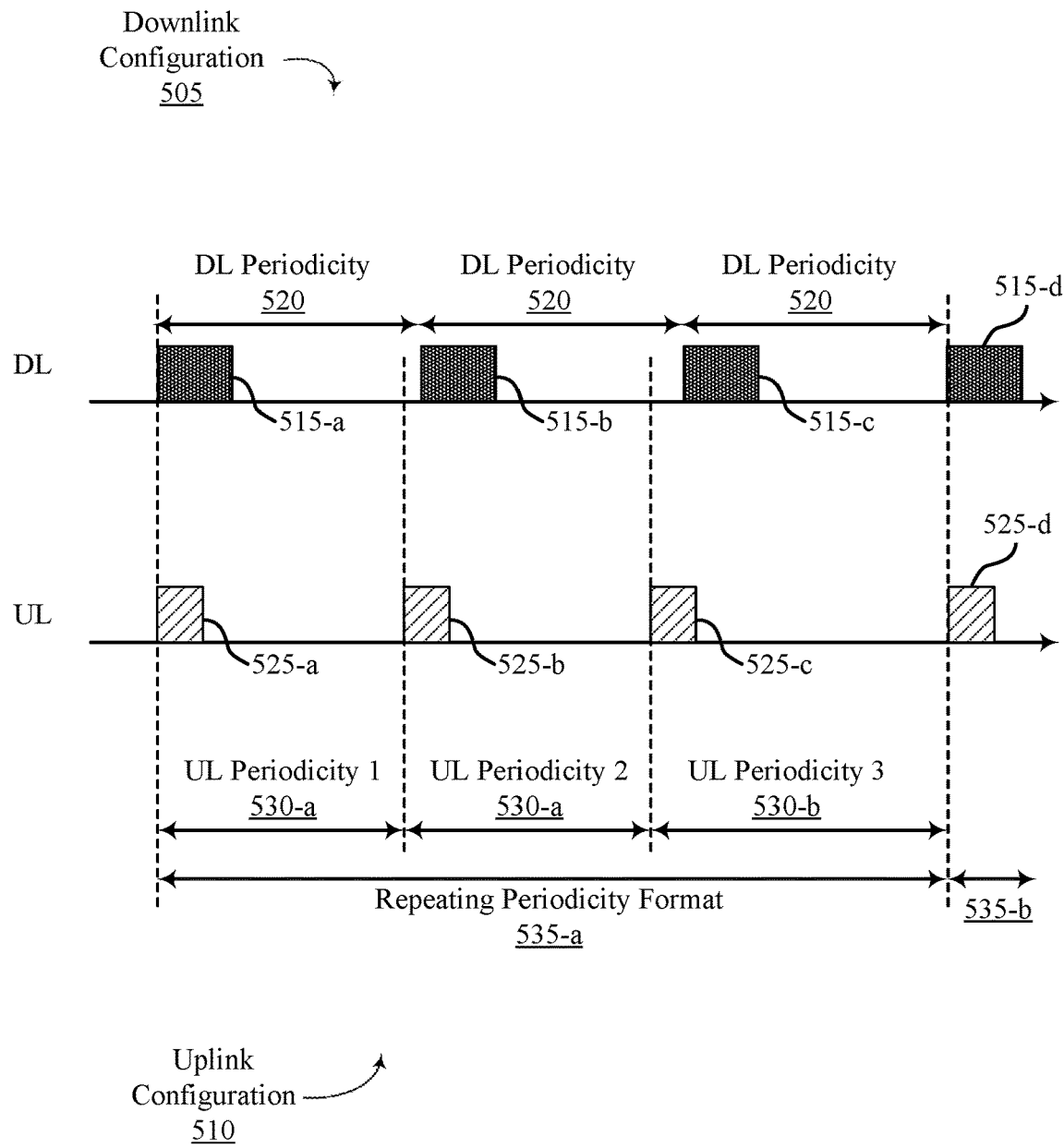
FIGS. 5 through 10 illustrate examples of resource allocation schemes that support techniques for enhanced configured grant configuration in accordance with aspects of the present disclosure.

FIG. 5 illustrates an example of a resource allocation scheme 500 that supports techniques for enhanced configured grant configuration in accordance with aspects of the present disclosure. In some examples, the resource allocation scheme 500 may implement, or be implemented by, aspects of the wireless communications system 100, the wireless communications system 200, the communications configuration 300, the wireless communications system 400, or any combination thereof.

The resource allocation scheme 500 may support improved coordination of downlink reception occasions 515 and uplink transmission occasions 525. The improved coordination of downlink reception occasions 515 and uplink transmission occasions 525 may reduce interruptions of DRX sleep cycles at a UE 115, thereby reducing power consumption at the UE 115, improving UE 115 battery performance, and improving user experience within a wireless communications system. For example, a base station 105 and/or a UE 115 of a wireless communications system may determine a downlink configuration 505 including a set of downlink reception occasions 515 (e.g., downlink reception occasions 515-*a*, 515-*b*, 515-*c*, 515-*d*). The downlink reception occasions 515 may define sets of resources in which the base station 105 may transmit downlink transmissions to the UE 115. In some aspects, the downlink reception occasions 515 may be arranged according to a uniform spacing pattern in the time domain. In this regard, adjacent downlink reception occasions 515 may be separated from one another by a constant periodicity 520.

A first downlink periodicity 520 separating the first downlink reception occasion 515-*a* and the second downlink reception occasion 515-*b* may be equal to the second downlink periodicity 520 separating the second downlink reception occasion 515-*b* and the third downlink reception occasion 515-*c*, and so forth. For instance, in the context of XR applications, an XR frame generation rate of 120 fps may result in a downlink periodicity 520 of 8.33 ms (e.g., downlink periodicity 520=8.33 ms), and an XR frame generation rate of 60 fps may result in a downlink periodicity of 16.67 ms (e.g., downlink periodicity 520=16.67 ms).

In cases where the downlink reception occasions 515 are spaced according to a uniform spacing pattern with non-integer downlink periodicities (e.g., downlink periodicity 520=8.33 ms, 16.67 ms), uplink configurations 510 which include uplink transmission occasions 525 which are arranged according to a uniform spacing pattern with uplink transmission periodicities 530 including integer numbers (e.g., 8 ms, 16 ms) may result in mis-matches between downlink reception occasions 515 and uplink transmission occasions 525. For example, in the case of an XR frame generation rate of 120 fps, downlink reception occasions 515 may each be separated by a downlink periodicity of 8.33 ms. In some wireless communications systems, uplink transmission occasions 525 may be spaced from one another by a granularity on the order of 1 ms. For instance, in cases where downlink reception occasions 515 are separated by 8.33 ms (e.g., downlink periodicity 520=8.33 ms), uplink transmission occasions 525 may be separated by 8 ms (e.g., uplink transmission periodicity 530=8 ms).

In some cases, even by matching the uplink transmission periodicity 530 to the downlink periodicity 520 as closely as possible, there may be a mis-match or offset between downlink reception occasions 515 and uplink transmission occasions 525. For instance, in cases where downlink periodicity 520 is 8.33 ms and the uplink transmission periodicity 530 is 8 ms, the second uplink transmission occasion 525-*b* may be offset from the second downlink reception occasion 515-*b* by 0.33 ms, and the third uplink transmission occasion 525-*c* may be offset from the third downlink reception occasion 515-c by 0.66 ms. This offset may become more significant over time, such that the uplink transmission occasions 525 eventually are completely offset and no longer overlap in the time domain with the downlink reception occasions 515. The mismatches between downlink reception occasions 515 and uplink transmission occasions 525 may interrupt a DRX cycle at the UE 115, as the UE 115 may have to exit an inactive period of the DRX cycle more often, or remain in an active period of the DRX cycle for a longer duration, in order to handle both the mismatched downlink reception occasions 515 and the uplink transmission occasions 525. Therefore, by increasing the power consumption of the UE 115, such mismatches may result in reduced battery performance and/or overall lower customer experience To improve coordination of downlink reception occasions 515 and uplink transmission occasions 525, the base station 105 and/or UE 115 may determine an uplink configuration 510 based on the downlink configuration 505. The uplink configuration 510 may include a set of uplink transmission occasions 525 (e.g., uplink transmission occasions 525-a, 525-b, 525-c, 525-d). The uplink transmission occasions 525 may define sets of resources in which the UE 115 may transmit uplink transmissions to the base station 105. In some aspects, the uplink transmission occasions 525 may be arranged according to a non-uniform spacing pattern in the time domain. In this regard, adjacent uplink transmission occasions 525 may be separated from one another by non-uniform time durations.

For example, the non-uniform spacing pattern may include a repeating periodicity format 535 which defines uplink transmission periodicities 530 between adjacent uplink transmission occasions 525. The repeating periodicity format 535 may include two or more uplink transmission periodicities 530, and may be repeated for multiple iterations within the uplink configuration 510 (e.g., first iteration of the repeating periodicity format 535-a, second iteration of the repeating periodicity format 535-b). For example, the non-uniform spacing pattern may include a repeating periodicity format 535 including a first uplink transmission periodicity 530-a and a second uplink transmission periodicity 530-b different from the first uplink transmission periodicity 530-a. Each of the first and second uplink transmission periodicities 530-a and 530-b may separate adjacent uplink transmission occasions 525 within the uplink configuration 510 in the time domain.

In some cases, the repeating periodicity format 535 including two or more uplink transmission periodicities may enable improved coordination between uplink transmission occasions 525 and downlink reception occasions 515. For example, in some cases, the downlink reception occasions 515 may be separated from one another by 8.33 ms (e.g., downlink periodicity 520=8.33 ms). In such cases, the base station 105 and/or UE 115 may determine or configure the uplink configuration 510 including the repeating periodicity format 535 such that the first uplink transmission periodicity 530-a is 8 ms (e.g., UL Periodicity 1 and 2=8 ms), and the second uplink transmission periodicity 530-b is 9 ms (e.g., UL Periodicity 3=9 ms).

The repeating periodicity format 535 including the first uplink transmission periodicity 530-a and the second uplink transmission periodicity 530-b may be repeated for a quantity of iterations (e.g., first iteration of the repeating periodicity format 535-a, second iteration of the repeating periodicity format 535-b). Each iteration of the repeating periodicity format 535 may define the first uplink transmission periodicity 530-a between a first uplink transmission occasion 525 and a second uplink transmission occasion 525 (e.g., 8 ms between the first uplink transmission occasion 525-a and the second uplink transmission occasion 525-b), the first uplink transmission periodicity 530-a between the second uplink transmission occasion 525 and a third uplink transmission occasion 525 (e.g., 8 ms between the second uplink transmission occasion 525-b and third uplink transmission occasion 525-c), and the second uplink transmission periodicity 530-b between the third uplink transmission occasion 525 and a fourth uplink transmission occasion 525 (e.g., 9 ms between the third uplink transmission occasion 525-c and the fourth uplink transmission occasion 525-d). It is noted herein that the repeating periodicity format 535 may include any quantity of uplink transmission periodicities 530 (e.g., first uplink transmission periodicity 530-a, second uplink transmission periodicity 530-b, third uplink transmission periodicity (not shown)).

By including multiple uplink transmission periodicities 530 within the repeating periodicity format 535, coordination between the downlink reception occasions 515 and the uplink transmission occasions 525 may be improved. For example, by configuring the uplink configuration 510 such that the second uplink transmission periodicity 530-b (e.g., UL Periodicity 3=9 ms) which is different from the first uplink transmission periodicity 530-a (e.g., UL Periodicity 1 and 2=8 ms), the mismatch between the downlink reception occasions 515 and the uplink transmission occasions 525 may be reduced or eliminated such that the fourth downlink reception occasion 515-d and the fourth uplink transmission occasion 525-d are aligned. An uplink configuration 510 including a repeating periodicity format 535 with a first uplink transmission periodicity 530-a of 8 ms and a second uplink transmission periodicity 530-b of 9 ms may enable every fourth uplink transmission occasion 525 and downlink reception occasion 515 to be aligned in the time domain.

By reducing or eliminating mismatches and improving coordination between downlink reception occasions 515 and uplink transmission occasions 525, the uplink configuration 510 illustrated in FIG. 5 may reduce interruptions to DRX cycles at the UE 115, thereby reducing power consumption, improving battery performance, and improving overall user experience.

Figure 6:
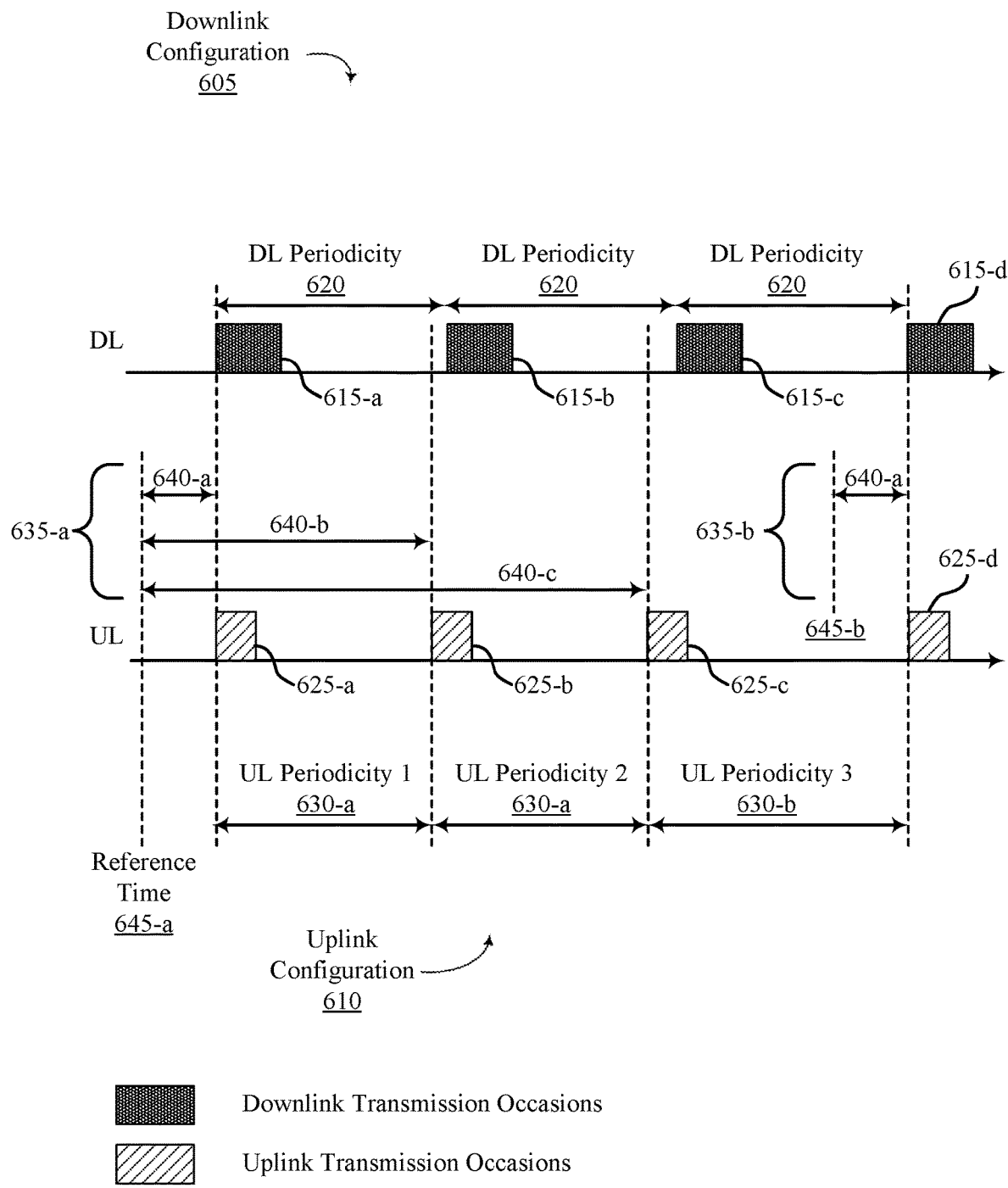

FIG. 6 illustrates an example of a resource allocation scheme 600 that supports techniques for enhanced configured grant configuration in accordance with aspects of the present disclosure. In some examples, the resource allocation scheme 600 may implement, or be implemented by, aspects of the wireless communications system 100, the wireless communications system 200, the communications configuration 300, the wireless communications system 400, or any combination thereof. The resource allocation scheme 600 may support improved coordination of downlink reception occasions 615 and uplink transmission occasions 625. The improved coordination of downlink reception occasions 615 and uplink transmission occasions 625 may reduce interruptions of DRX sleep cycles at a UE 115, thereby reducing power consumption at the UE 115, improving UE 115 battery performance, and improving user experience within a wireless communications system.

A base station 105 and/or a UE 115 of a wireless communications system may determine a downlink configuration 605 including a set of downlink reception occasions 615 (e.g., downlink reception occasions 615-a, 615-b, 615-c, 615-d). The downlink reception occasions 615 may define sets of resources in which the base station 105 may transmit downlink transmissions to the UE 115. In some aspects, the downlink reception occasions 615 may be arranged according to a uniform spacing pattern in the time domain. In this regard, adjacent downlink reception occasions 615 may be separated from one another by a constant periodicity 620.

A first downlink periodicity 620 separating the first downlink reception occasion 615-a and the second downlink reception occasion 615-b may be equal to the second downlink periodicity 620 separating the second downlink reception occasion 615-b and the third downlink reception occasion 615-c, and so forth. For instance, in the context of XR applications, an XR frame generation rate of 120 fps may result in a downlink periodicity 620 of 8.33 ms (e.g., downlink periodicity 620=8.33 ms), and an XR frame generation rate of 60 fps may result in a downlink periodicity of 16.67 ms (e.g., downlink periodicity 620=16.67 ms).

To improve coordination of downlink reception occasions 615 and uplink transmission occasions 625, the base station 105 and/or UE 115 may determine an uplink configuration 610 based on the downlink configuration 605. The uplink configuration 610 may include a set of uplink transmission occasions 625 (e.g., uplink transmission occasions 625-a, 625-b, 625-c, 625-d). The uplink transmission occasions 625 may define sets of resources in which the UE 115 may transmit uplink transmissions to the base station 105. In some aspects, the uplink transmission occasions 625 may be arranged according to a non-uniform spacing pattern in the time domain. In this regard, adjacent uplink transmission occasions 625 may be separated from one another by non-uniform time durations.

For example, the non-uniform spacing pattern may include a repeating offset format 635 which defines time offsets 640 between one or more reference times 645 and a set of adjacent uplink transmission occasions 625. The repeating offset format 635 may include two or more time offsets 640, and may be repeated for multiple iterations within the uplink configuration 610 (e.g., first iteration of the repeating offset format 635-a, second iteration of the repeating offset format 635-b). For example, the non-uniform spacing pattern may include a repeating offset format 635 including a first offset 640-a, a second offset 640-b, and a third offset 640-c. In this example, each iteration of the repeating offset format 635 may define the first offset 640-a between a reference time 645 and a first uplink transmission occasion 625, the second offset 640-b between the reference time 645 and a second uplink transmission occasion 625, and the third offset 640-c between the reference time 645 and a third uplink transmission occasion 625. It is noted herein that each repeating offset format 635 may include any quantity of time offsets 640.

The repeating offset format 635 may achieve a similar or identical result as the repeating periodicity format 535 shown and described with respect to FIG. 5. For example, the repeating offset format 635 may be configured such that the offsets 640 of the repeating offset format result in a first uplink transmission periodicity 630-a (e.g., UL Periodicity 1 and 1=8 ms) and a second uplink transmission periodicity 630-b (e.g., UL Periodicity 3=9 ms) which are similarly repeated for multiple iterations in conjunction with the repeating offset format 635. In some cases, the repeating offset format 635 including two or more time offsets 640 may enable improved coordination between uplink transmission occasions 625 and downlink reception occasions 615.

For example, in some cases, the downlink reception occasions 615 may be separated from one another by 8.33 ms (e.g., downlink periodicity 620=8.33 ms). In such cases, the base station 105 and/or UE 115 may determine or configure the uplink configuration 610 including the repeating offset format 635 such that the offsets 640-a, 640-b, and 640-c of each respective iteration of the repeating offset format 635 results in a first uplink transmission periodicity 630-a of 8 ms (e.g., UL Periodicity 1 and 2=8 ms), and a second uplink transmission periodicity 630-b of 9 ms (e.g., UL Periodicity 3=9 ms). The repeating offset format 635 including the set of offsets 640 may be repeated for a quantity of iterations (e.g., first iteration of the repeating offset format 635-a, second iteration of the repeating offset format 635-b). Each iteration of the repeating offset format 635 may define the set of offsets 640 with respect to one or more reference times 645 (e.g., first reference time 645-a, second reference time 645-b).

By including multiple offsets 640 within the repeating offset format 635, coordination between the downlink reception occasions 615 and the uplink transmission occasions 625 may be improved. For example, by configuring the uplink configuration 610 to include the repeating offset format 635, mismatches between the downlink reception occasions 615 and the uplink transmission occasions 625 may be reduced or eliminated such that the fourth downlink reception occasion 615-d and the fourth uplink transmission occasion 625-d are aligned. An uplink configuration 610 including a repeating offset format 635 may enable every fourth uplink transmission occasion 625 and downlink reception occasion 615 to be aligned in the time domain.

By reducing or eliminating mismatches and improving coordination between downlink reception occasions 615 and uplink transmission occasions 625, the uplink configuration 610 illustrated in FIG. 6 may reduce interruptions to DRX cycles at the UE 115, thereby reducing power consumption, improving battery performance, and improving overall user experience.

Figure 7:
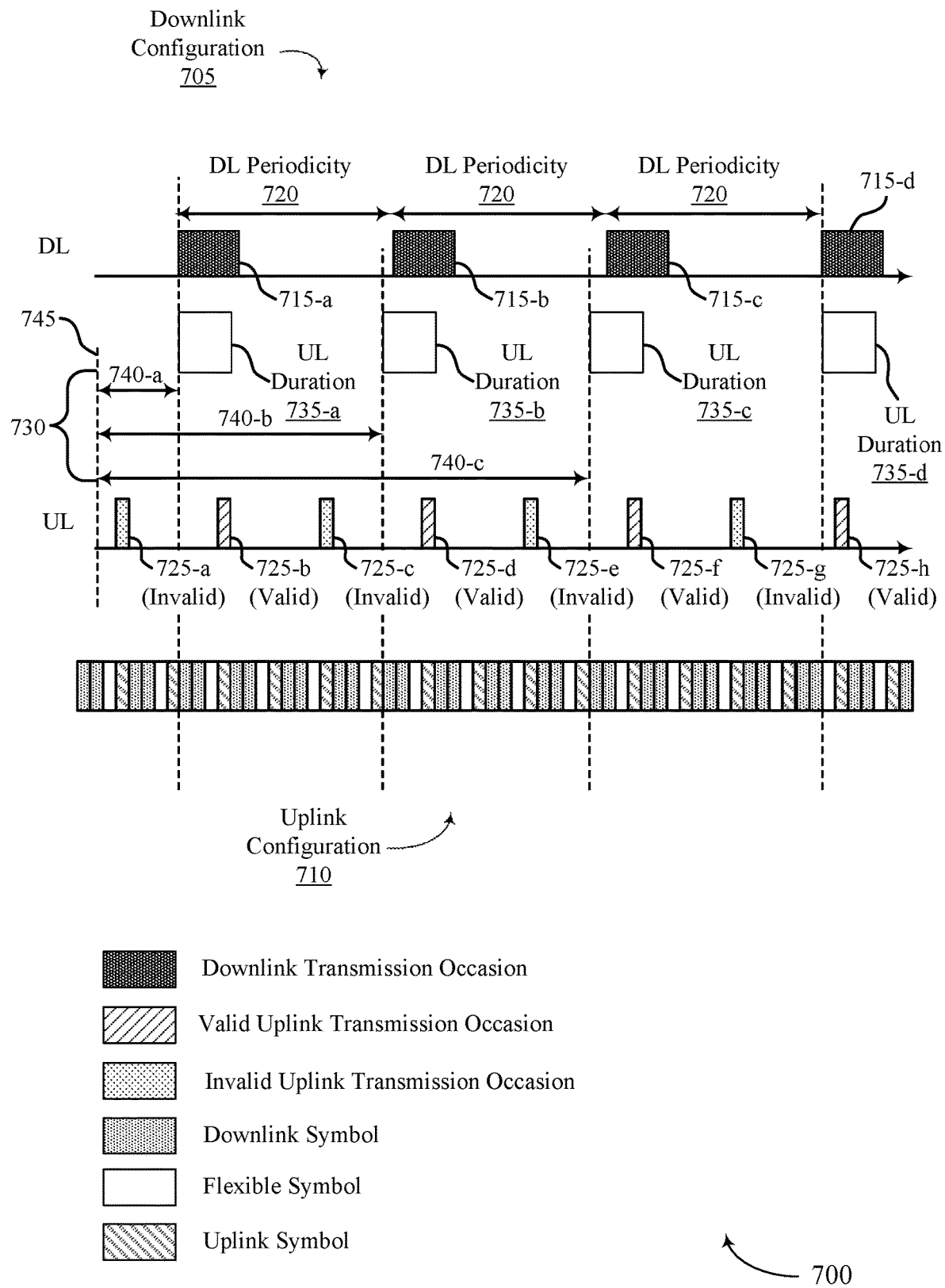

FIG. 7 illustrates an example of a resource allocation scheme 700 that supports techniques for enhanced configured grant configuration in accordance with aspects of the present disclosure. In some examples, the resource allocation scheme 700 may implement, or be implemented by, aspects of the wireless communications system 100, the wireless communications system 200, the communications configuration 300, the wireless communications system 400, or any combination thereof. The resource allocation scheme 700 may support improved coordination of downlink reception occasions 715 and uplink transmission occasions 725. The improved coordination of downlink reception occasions 715 and uplink transmission occasions 725 may reduce interruptions of DRX sleep cycles at a UE 115, thereby reducing power consumption at the UE 115, improving UE 115 battery performance, and improving user experience within a wireless communications system.

A base station 105 and/or a UE 115 of a wireless communications system may determine a downlink configuration 705 including a set of downlink reception occasions 715 (e.g., downlink reception occasions 715-a, 715-b, 715-c, 715-d). The downlink reception occasions 715 may define sets of resources in which the base station 105 may transmit downlink transmissions to the UE 115. In some aspects, the downlink reception occasions 715 may be arranged according to a uniform spacing pattern in the time domain. In this regard, adjacent downlink reception occasions 715 may be separated from one another by a constant periodicity 720.

A first downlink periodicity 720 separating the first downlink reception occasion 715-a and the second downlink reception occasion 715-b may be equal to the second downlink periodicity 720 separating the second downlink reception occasion 715-b and the third downlink reception occasion 715-c, and so forth. For instance, in the context of XR applications, an XR frame generation rate of 120 fps may result in a downlink periodicity 720 of 8.33 ms (e.g., downlink periodicity 720=8.33 ms), and an XR frame generation rate of 60 fps may result in a downlink periodicity of 16.67 ms (e.g., downlink periodicity 720=16.67 ms).

To improve coordination of downlink reception occasions 715 and uplink transmission occasions 725, the base station 105 and/or UE 115 may determine an uplink configuration 710 based on the downlink configuration 705. The uplink configuration 710 may include a set of uplink transmission occasions 725 (e.g., uplink transmission occasions 725-a, 725-b, 725-c, 725-d). The uplink transmission occasions 725 may define sets of resources in which the UE 115 may transmit uplink transmissions to the base station 105. In some aspects, the uplink transmission occasions 725 may be arranged according to a non-uniform spacing pattern in the time domain. In this regard, adjacent uplink transmission occasions 725 may be separated from one another by non-uniform time durations. For example, the non-uniform spacing pattern may include a repeating offset format 730 which defines time offsets 740 between one or more reference times 745 and a set of adjacent uplink transmission occasions 725. The repeating offset format 730 may include two or more time offsets 740, and may be repeated for multiple iterations within the uplink configuration 710 (e.g., first iteration of the repeating offset format 730-a, second iteration of the repeating offset format (not shown)). For example, the non-uniform spacing pattern may include a repeating offset format 730 including a first offset 740-a, a second offset 740-b, and a third offset 740-c.

In some aspects, the UE 115 and/or the base station 105 may determine a set of uplink transmission durations 735 based on the repeating offset format 730. For example, the first offset 740-a may indicate the start of a first uplink transmission duration 735-a, the second offset 740-b may indicate the start of a second uplink transmission duration 735-b, and the third offset 740-c may indicate the start of a third uplink transmission duration 735-c. In some aspects, each uplink transmission duration 735 may include/span one or more symbols in the time domain. For example, as shown in FIG. 7, each uplink transmission duration 735 may include/span four symbols in the time domain.

In some aspects, the UE 115 and/or the base station 105 may be configured to differentiate valid uplink transmission occasions 725 and invalid uplink transmission occasions 725 based on the uplink transmission durations 735. In particular, valid uplink transmission occasions 725 may include those uplink transmission occasions 725 which are positioned within an uplink transmission duration 735. In this regard, the UE 115 and/or the base station 105 may be configured to determine a set of uplink symbols within the uplink transmission durations 735, where the set of valid uplink transmission occasions include the set of uplink symbols within the uplink transmission durations 735. For example, uplink transmission occasion 725-b may be valid due to the fact that it is positioned within the first uplink transmission duration 735-a, whereas uplink transmission occasions 725-a and 725-c may be invalid due to the fact that they are not positioned within an uplink transmission duration 735. Similarly, in the example illustrated in FIG. 4, uplink transmission occasions 725-d, 725-f, and 725-h may be valid due to the fact that they are positioned within uplink transmission durations 735, and uplink transmission occasions 725-e and 725-g may be invalid due to the fact that they are not positioned within an uplink transmission duration.

In this example, the UE 115 may be configured to transmit uplink transmissions within the valid uplink transmission occasions 725 (e.g., uplink transmission occasions 725-b, 725-d, 725-f, and 725-h) positioned within the uplink transmission durations. By enabling any uplink symbols within an uplink transmission duration 735 to include a valid uplink transmission occasion 725, the use of uplink transmission durations 735 may increase the likelihood that valid uplink transmission occasions 725 may correspond to (e.g., overlap in the time domain with) the downlink reception occasions 715, thereby reducing interruptions to DRX cycles at the UE 115, reducing power consumption, improving battery performance, and improving overall user experience.

Figure 8:
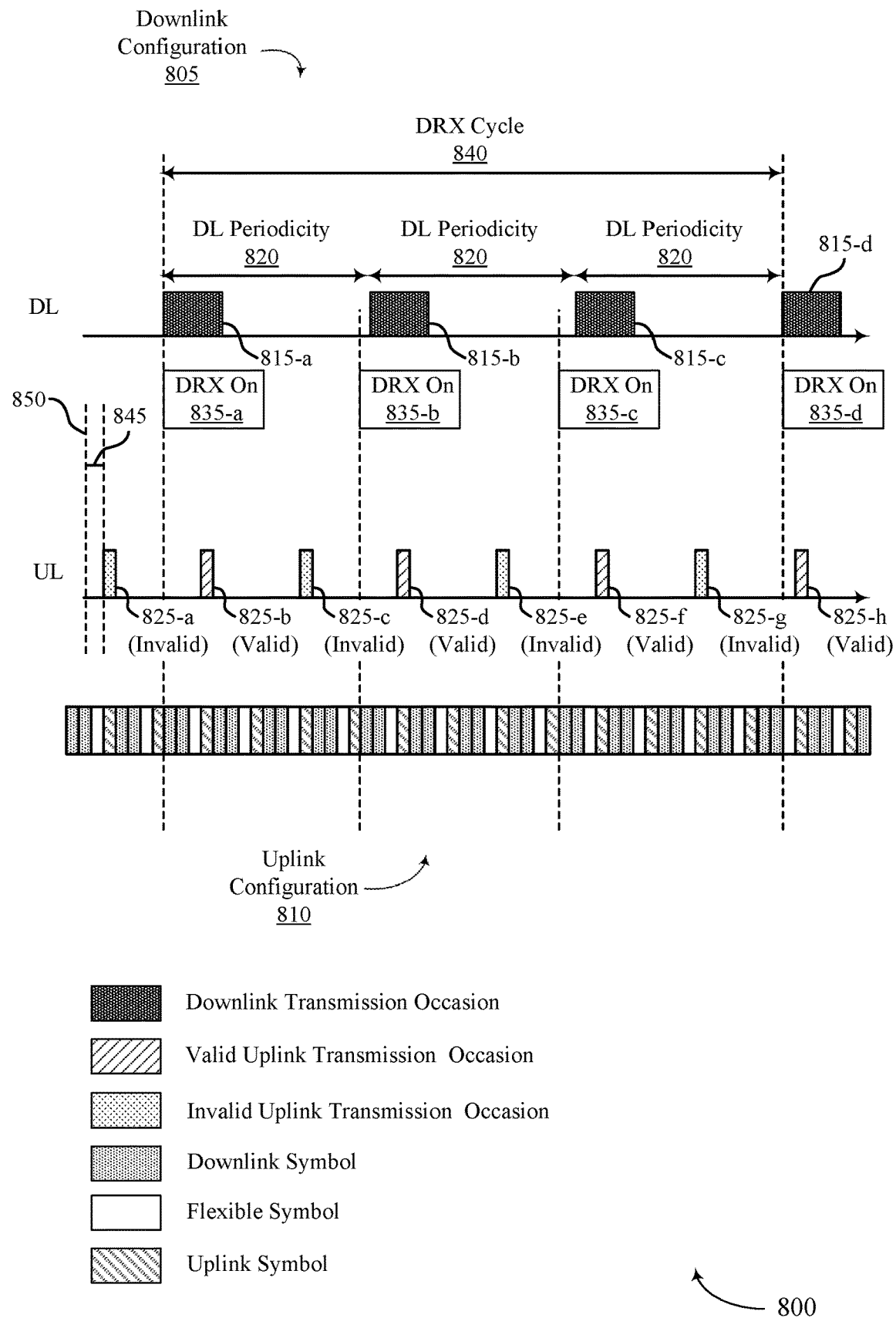

FIG. 8 illustrates an example of a resource allocation scheme 800 that supports techniques for enhanced configured grant configuration in accordance with aspects of the present disclosure. In some examples, the resource allocation scheme 800 may implement, or be implemented by, aspects of the wireless communications system 100, the wireless communications system 200, the communications configuration 300, the wireless communications system 400, or any combination thereof. The resource allocation scheme 800 may support improved coordination of downlink reception occasions 815 and uplink transmission occasions 825. The improved coordination of downlink reception occasions 815 and uplink transmission occasions 825 may reduce interruptions of DRX sleep cycles at a UE 115, thereby reducing power consumption at the UE 115, improving UE 115 battery performance, and improving user experience within a wireless communications system.

A base station 105 and/or a UE 115 of a wireless communications system may determine a downlink configuration 805 including a set of downlink reception occasions 815 (e.g., downlink reception occasions 815-a, 815-b, 815-c, 815-d). The downlink reception occasions 815 may define sets of resources in which the base station 105 may transmit downlink transmissions to the UE 115. In some aspects, the downlink reception occasions 815 may be arranged according to a uniform spacing pattern in the time domain. In this regard, adjacent downlink reception occasions 815 may be separated from one another by a constant periodicity 820.

A first downlink periodicity 820 separating the first downlink reception occasion 815-a and the second downlink reception occasion 815-b may be equal to the second downlink periodicity 820 separating the second downlink reception occasion 715-b and the third downlink reception occasion 815-c, and so forth. For instance, in the context of XR applications, an XR frame generation rate of 120 fps may result in a downlink periodicity 820 of 8.33 ms (e.g., downlink periodicity 820=8.33 ms), and an XR frame generation rate of 60 fps may result in a downlink periodicity of 16.67 ms (e.g., downlink periodicity 820=16.67 ms).

To improve coordination of downlink reception occasions 815 and uplink transmission occasions 825, the base station 105 and/or UE 115 may determine an uplink configuration 810 based on the downlink configuration 805. The uplink configuration 810 may include a set of uplink transmission occasions 825 (e.g., uplink transmission occasions 825-a, 825-b, 825-c, 825-d). The uplink transmission occasions 825 may define sets of resources in which the UE 115 may transmit uplink transmissions to the base station 105. In some aspects, the uplink transmission occasions 825 may be arranged according to a non-uniform spacing pattern in the time domain. In some aspects, the uplink transmission occasions 725 may be configured relative to a reference time 850 by a determined offset 845.

The UE 115 and/or the base station 105 may determine a DRX cycle 840 of the UE 115. The DRX cycle 840 may include a set of active durations (e.g., DRX on durations 835) and a set of inactive durations (e.g., periods of time between DRX on durations 835). In some aspects, the term "DRX on duration 835" may refer to durations of time in which a DRX on duration timer is running. In some aspects, each DRX on duration 835 may include/span one or more symbols in the time domain. In some aspects, the UE 115 and/or the base station 105 may be configured to differentiate valid uplink transmission occasions 825 and invalid uplink transmission occasions 825 based on the DRX on durations 835. In particular, valid uplink transmission occasions 825 may include those uplink transmission occasions 825 which are positioned within a DRX on duration 835 (e.g., uplink transmission occasions 825 while a DRX on duration timer is running).

The UE 115 and/or the base station 105 may be configured to determine a set of uplink symbols within the DRX on durations 835, where the set of valid uplink transmission occasions include the set of uplink symbols within the DRX on durations 835. For example, uplink transmission occasion 825-*b* may be valid due to the fact that it is positioned within the first DRX on duration 835-*a*, whereas uplink transmission occasions 825-*a* and 825-*c* may be invalid due to the fact that they are not positioned within a DRX on duration 835. Similarly, in the example illustrated in FIG. 8, uplink transmission occasions 825-*d*, 825-*f*, and 825-*h* may be valid due to the fact that they are positioned within DRX on durations 835, and uplink transmission occasions 825-*e* and 825-*g* may be invalid due to the fact that they are not positioned within a DRX on duration 835.

The UE 115 may be configured to transmit uplink transmissions within the valid uplink transmission occasions 825 (e.g., uplink transmission occasions 825-*b*, 825-*d*, 825-*f*, and 825-*h*) positioned within the DRX on durations 835. By enabling any uplink symbols within a DRX on duration 835 to include a valid uplink transmission occasion 825, the use of DRX on durations 835 may increase the likelihood that valid uplink transmission occasions 825 may correspond to (e.g., overlap in the time domain with) the downlink reception occasions 815, thereby reducing interruptions to DRX cycles at the UE 115, reducing power consumption, improving battery performance, and improving overall user experience.

Figure 9:
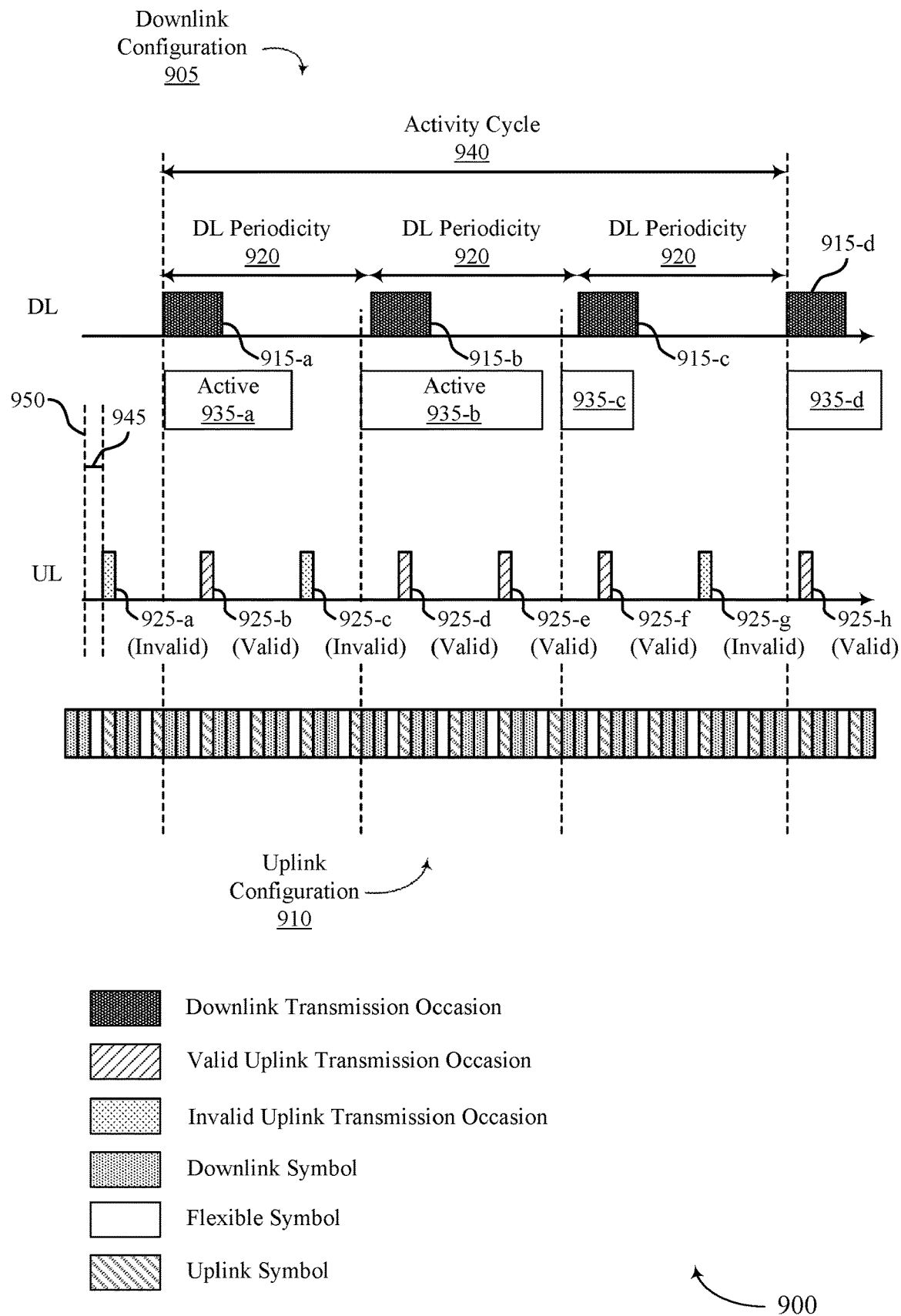

FIG. 9 illustrates an example of a resource allocation scheme 900 that supports techniques for enhanced configured grant configuration in accordance with aspects of the present disclosure. In some examples, the resource allocation scheme 900 may implement, or be implemented by, aspects of the wireless communications system 100, the wireless communications system 200, the communications configuration 300, the wireless communications system 400, or any combination thereof. The resource allocation scheme 900 may support improved coordination of downlink reception occasions 915 and uplink transmission occasions 925. The improved coordination of downlink reception occasions 915 and uplink transmission occasions 925 may reduce interruptions of DRX sleep cycles at a UE 115, thereby reducing power consumption at the UE 115, improving UE 115 battery performance, and improving user experience within a wireless communications system.

A base station 105 and/or a UE 115 of a wireless communications system may determine a downlink configuration 905 including a set of downlink reception occasions 915 (e.g., downlink reception occasions 915-*a*, 915-*b*, 915-*c*, 915-*d*). The downlink reception occasions 915 may define sets of resources in which the base station 105 may transmit downlink transmissions to the UE 115. In some aspects, the downlink reception occasions 915 may be arranged according to a uniform spacing pattern in the time domain. In this regard, adjacent downlink reception occasions 915 may be separated from one another by a constant periodicity 920.

A first downlink periodicity 920 separating the first downlink reception occasion 815-*a* and the second downlink reception occasion 915-*b* may be equal to the second downlink periodicity 920 separating the second downlink reception occasion 915-*b* and the third downlink reception occasion 915-*c*, and so forth. For instance, in the context of XR applications, an XR frame generation rate of 120 fps may result in a downlink periodicity 920 of 8.33 ms (e.g., downlink periodicity 920=8.33 ms), and an XR frame generation rate of 60 fps may result in a downlink periodicity of 16.67 ms (e.g., downlink periodicity 920=16.67 ms).

To improve coordination of downlink reception occasions 915 and uplink transmission occasions 925, the base station 105 and/or UE 115 may determine an uplink configuration 910 based on the downlink configuration 905. The uplink configuration 910 may include a set of uplink transmission occasions 925 (e.g., uplink transmission occasions 925-*a*, 925-*b*, 925-*c*, 925-*d*). The uplink transmission occasions 925 may define sets of resources in which the UE 115 may transmit uplink transmissions to the base station 105. In some aspects, the uplink transmission occasions 925 may be arranged according to a non-uniform spacing pattern in the time domain. In some aspects, the uplink transmission occasions 925 may be configured relative to a reference time 950 by a determined offset 945.

In some aspects, the UE 115 and/or the base station 105 may determine an activity cycle 940 of the UE 115. The activity cycle 940 may include, but is not limited to, a DRX cycle (e.g., DRX cycle illustrated in FIG. 8), a masking cycle, or both. The activity cycle 940 may include a set of active times 935 of operation and a set of inactive times of operation (e.g., periods of time between active times 935). In some aspects, each active time 935 may include/span one or more symbols in the time domain. The active time 935 may be of differing lengths in the time domain. For example, the first active time 935-*a* may be longer than the third active time 935-*c*.

The UE 115 and/or the base station 105 may be configured to differentiate valid uplink transmission occasions 925 and invalid uplink transmission occasions 925 based on the active times 935. In particular, valid uplink transmission occasions 925 may include those uplink transmission occasions 925 which are positioned within an active time 935. In this regard, the UE 115 and/or the base station 105 may be configured to determine a set of uplink symbols within the active times 935, where the set of valid uplink transmission occasions 925 include the set of uplink symbols within the active times 935. For example, uplink transmission occasion 925-*b* may be valid due to the fact that it is positioned within the first active time 935-*a* of operation, whereas uplink transmission occasions 925-*a* and 925-*c* may be invalid due to the fact that they are not positioned within an active time 935 of operation. Similarly, in the example illustrated in FIG. 9, uplink transmission occasions 925-*d*, 925-*e*, 925-*f*, and 925-*h* may be valid due to the fact that they are positioned within active times 935, and uplink transmission occasion 925-*g* may be invalid due to the fact that it is not positioned within an active time 935.

The UE 115 may be configured to transmit uplink transmissions within the valid uplink transmission occasions 925 (e.g., uplink transmission occasions 925-*b*, 925-*d*, 925-*e*, 925-*f*, and 925-*h*) positioned within the active times 935 of operation. By enabling any uplink symbols within an active time 935 to include a valid uplink transmission occasion 925, the use of active times 935 may increase the likelihood that valid uplink transmission occasions 925 may correspond to (e.g., overlap in the time domain with) the downlink reception occasions 915, thereby reducing interruptions to DRX cycles at the UE 115, reducing power consumption, improving battery performance, and improving overall user experience.

Figure 10:
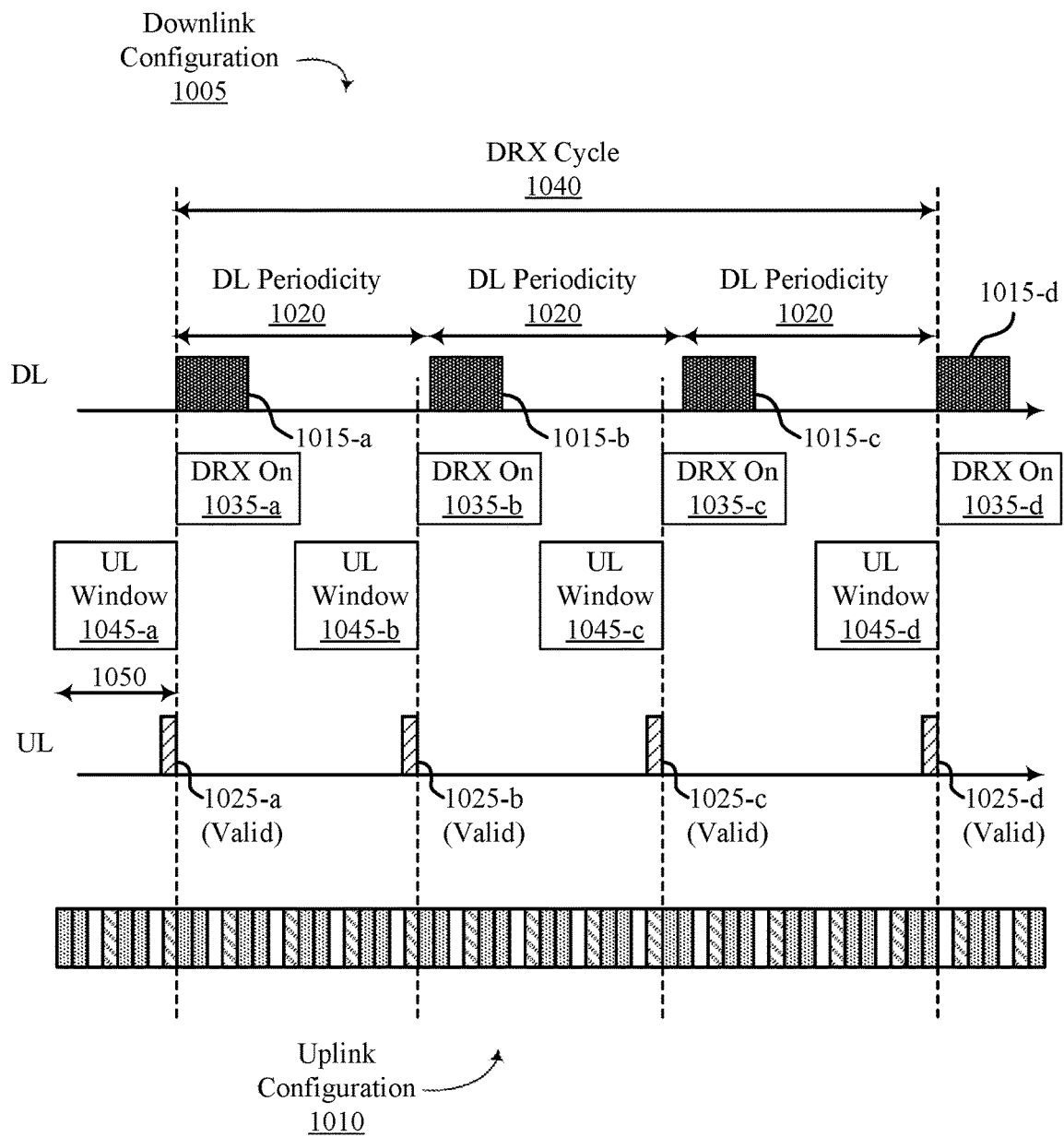

FIG. 10 illustrates an example of a resource allocation scheme 1000 that supports techniques for enhanced configured grant configuration in accordance with aspects of the present disclosure. In some examples, the resource allocation scheme 1000 may implement, or be implemented by, aspects of the wireless communications system 100, the wireless communications system 200, the communications configuration 300, the wireless communications system 400, or any combination thereof. The resource allocation scheme 1000 may support improved coordination of downlink reception occasions 1015 and uplink transmission occasions 1025. The improved coordination of downlink reception occasions 1015 and uplink transmission occasions 1025 may reduce interruptions of DRX sleep cycles at a UE 115, thereby reducing power consumption at the UE 115, improving UE 115 battery performance, and improving user experience within a wireless communications system.

For example, a base station 105 and/or a UE 115 of a wireless communications system may determine a downlink configuration 1005 including a set of downlink reception occasions 1015 (e.g., downlink reception occasions 1015-*a*, 1015-*b*, 1015-*c*, 1015-*d*). The downlink reception occasions 1015 may define sets of resources in which the base station 105 may transmit downlink transmissions to the UE 115. In some aspects, the downlink reception occasions 1015 may be arranged according to a uniform spacing pattern in the time domain. In this regard, adjacent downlink reception occasions 1015 may be separated from one another by a constant periodicity 1020.

A first downlink periodicity 1020 separating the first downlink reception occasion 1015-*a* and the second downlink reception occasion 1015-*b* may be equal to the second downlink periodicity 1020 separating the second downlink reception occasion 1015-*b* and the third downlink reception occasion 1015-*c*, and so forth. For instance, in the context of XR applications, an XR frame generation rate of 120 fps may result in a downlink periodicity 1020 of 8.33 ms (e.g., downlink periodicity 1020=8.33 ms), and an XR frame generation rate of 60 fps may result in a downlink periodicity of 16.67 ms (e.g., downlink periodicity 1020=16.67 ms).

To improve coordination of downlink reception occasions 1015 and uplink transmission occasions 1025, the base station 105 and/or UE 115 may determine an uplink configuration 1010 based on the downlink configuration 1005. The uplink configuration 1010 may include a set of uplink transmission occasions 1025 (e.g., uplink transmission occasions 1025-*a*, 1025-*b*, 1025-*c*, 1025-*d*). The uplink transmission occasions 1025 may define sets of resources in which the UE 115 may transmit uplink transmissions to the base station 105. In some aspects, the uplink transmission occasions 1025 may be arranged according to a non-uniform spacing pattern in the time domain. The UE 115 and/or the base station 105 may determine a DRX cycle 1040 of the UE 115. The DRX cycle 1040 may include a set of active durations (e.g., DRX on durations 1035) and a set of inactive durations (e.g., periods of time between DRX on durations 1035). In some aspects, each DRX on duration 1035 may include/span one or more symbols in the time domain. In some cases, a duration of each of the DRX on durations 1035 may be constant.

Additionally or alternatively, the UE 115 and/or the base station 105 may be configured to determine a set of uplink transmission windows 1045 based on the DRX cycle 1040. For example, set of uplink transmission windows 1045 may be configured such that an ending time of each uplink transmission window 1045 coincides with a start time of an active period of a DRX cycle 1040. For instance, an ending time of the second uplink transmission window 1045-*b* may coincide with a start time of the second DRX on duration 1035-*b* of the DRX cycle 1040. In some cases, the UE 115 and/or the base station 105 may determine the set of uplink transmission windows 1045 by determining an offset associated with the uplink transmission windows 1045 relative to a start time of each DRX on duration 1035. Additionally or alternatively, the UE 115 and/or the base station 105 may determine the set of uplink transmission windows 1045 by determining a duration 1050 associated with the uplink transmission windows 1045 relative to a start time of each DRX on duration 1035.

The UE 115 and/or the base station 105 may be configured to differentiate valid uplink transmission occasions 925 and invalid uplink transmission occasions 925 based on the DRX on durations 1035, the uplink transmission windows 1045, or both. In particular, valid uplink transmission occasions 1025 may include those uplink transmission occasions 1025 which are positioned within an uplink transmission window 1045. In this regard, the UE 115 and/or the base station 105 may be configured to determine a set of uplink symbols within the uplink transmission windows 1045, where the set of valid uplink transmission occasions 1025 include the set of uplink symbols within the uplink transmission windows 1045. For example, the UE 115 and/or the base station 105 may determine the uplink transmission occasions 1025-*a*, 1025-*b*, 1025-*c*, and 1025-*d* to be valid based on the uplink symbols associated with the uplink transmission occasions 1025-*a*, 1025-*b*, 1025-*c*, and 1025-*d* being positioned within the uplink transmission windows 1045. In this example, the UE 115 may be configured to transmit uplink transmissions within the valid uplink transmission occasions 1025 (e.g., uplink transmission occasions 1025-*a*, 1025-*b*, 1025-*c*, and 1025-*d*) positioned within the uplink transmission windows 1045.

In some examples, arranging uplink transmission windows 1045 relative to DRX on durations 1035 and downlink reception occasions 1015 as shown in FIG. 10 may result in valid uplink transmission occasions 1025 not to overlap in the time domain with the downlink reception occasions 1015. However, the arrangement of the uplink transmission windows 1045 and uplink transmission occasions 1025 relative to the downlink reception occasions 1015 may prevent frequent interruptions to DRX cycles 1040 or other activity cycles at the UE 115, enabling the UE 115 to remain in an active state of operation for slightly longer durations to handle both reception of downlink transmissions and transmission of uplink transmissions. Such configurations may improve the DRX cycles 1040 at the UE 115, reduce power consumption, and improve battery performance.

Figure 11:
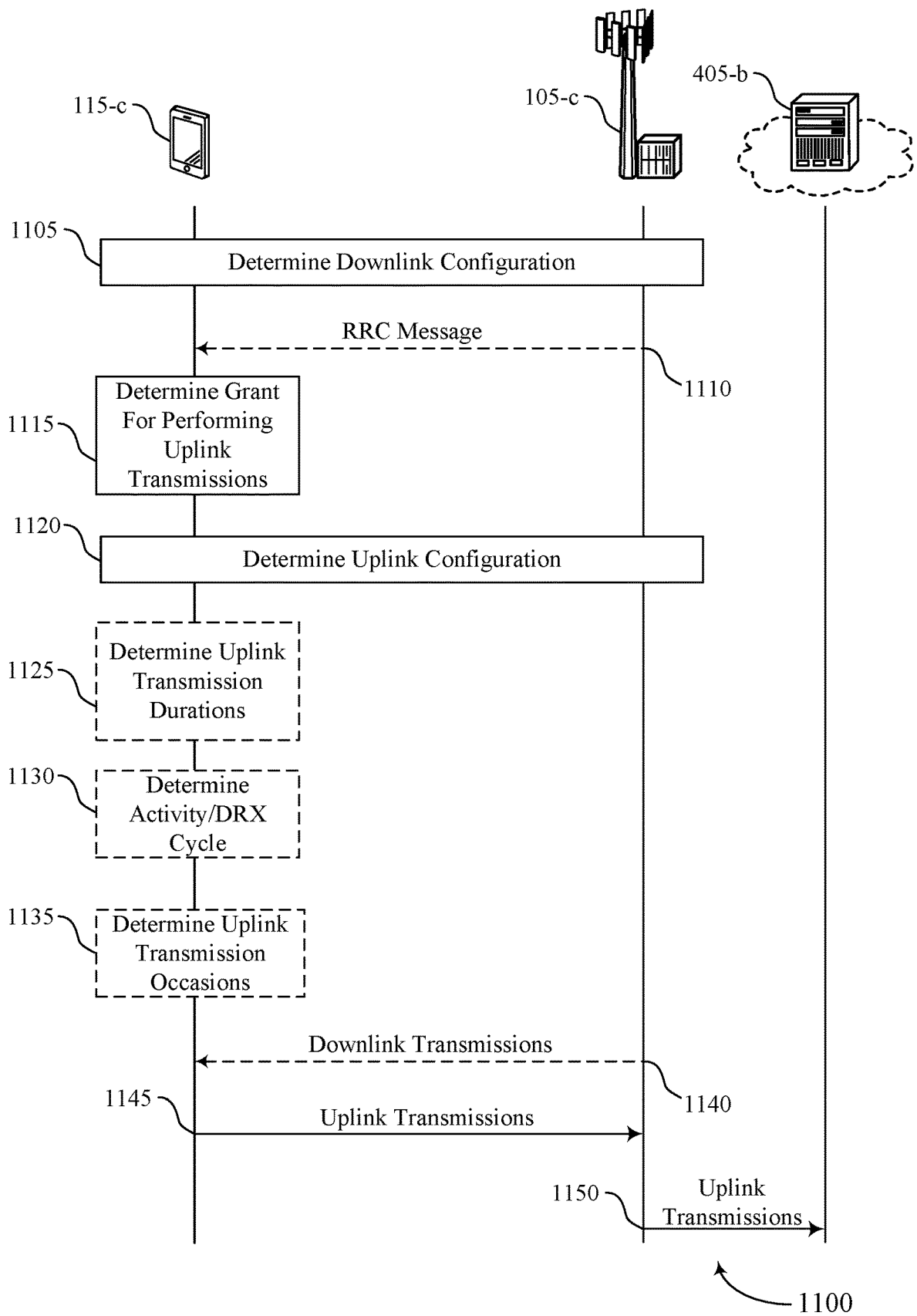
FIG. 11 illustrates an example of a process flow that supports techniques for enhanced configured grant configuration in accordance with aspects of the present disclosure.

FIG. 11 illustrates an example of a process flow 1100 that supports techniques for enhanced configured grant configuration in accordance with aspects of the present disclosure. In some examples, process flow 1100 may implement, or be implemented by, aspects of wireless communications system 100, wireless communications system 200, communications configuration 300, wireless communications system 400, resource allocation schemes 500, 600, 700, 800, 900, 1000, or any combination thereof. For example, the process flow 1100 may illustrate determining a downlink configuration for communications between the base station 105-*c* and the UE 115-*c*, determining an uplink configuration including uplink transmission occasions spaced according to a non-uniform spacing pattern, and transmitting uplink transmissions based on the uplink configuration, as described with reference to FIGS. 1-9, among other aspects. The process flow 1100 may include a UE 115-*c*, a base station 105-*c*, and an XR server 405-*b*, which may be examples of UEs 115, base stations 105, and XR servers 405 as described with reference to FIGS. 1-9.

In some examples, the operations illustrated in process flow 1100 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned herein, or further steps may be added.

At 1105, the UE 115-*c*, the base station 105-*c*, or both, may determine a downlink configuration for communications between the UE 115-*c* and the base station 105-*c*. The downlink configuration may include a set of resources usable by the UE 115-*c* for receiving downlink transmissions from the base station 105-*c*. In this regard, the downlink configuration may include a set of time resources, a set of frequency resources, a set of spatial resources, or any combination thereof. In some aspects, the set of resources of the downlink configuration may include a set of downlink reception occasions (or downlink transmission occasions from the perspective of the base station 105-*c*) arranged according to a uniform spacing pattern in the time domain. For example, in the context of XR applications, the downlink configuration may include a set of downlink reception occasions which are separated by a constant periodicity (e.g., 8.33 ms, 16.67 ms) in the time domain. As noted previously herein, in the context of XR applications, the downlink reception occasions may be based on a frame generation periodicity of XR frames at an XR server (e.g., XR server 205 illustrated in FIG. 2).

At 1110, the base station 105-*c* may transmit an RRC message to the UE 115-*c*. In some aspects, the RRC message may include an indication of the downlink configuration determined at 1105. Additionally or alternatively, the RRC message may include an indication of a grant (e.g., configured grant) for the UE 115-*c* to perform uplink transmissions. In this regard, the RRC message may include an indication of a grant (e.g., configured grant) associated with an uplink configuration for communications between the UE 115-*c* and the base station 105-*c*. For example, in cases where the base station 105-*c* determines the downlink configuration at 1105, the base station 105-*c* may determine an uplink configuration based on the downlink configuration, and may transmit the RRC message at 1110, where the RRC message includes an indication of the downlink configuration, a grant for performing uplink transmissions, the uplink configuration, or any combination thereof.

At 1115, the UE 115-*c* may determine a grant for performing uplink transmissions to the base station 105-*c*, another wireless device (e.g., another UE 115, other wireless device for relaying uplink transmissions to the base station 105-*c*), or both. In some aspects, the UE 115-*c* may be configured to determine the grant (e.g., configured grant) for performing uplink transmissions based on the RRC message received at 1110.

At 1120, the UE 115-*c*, the base station 105-*c*, or both, may determine an uplink configuration for communications between the UE 115-*c* and the base station 105-*c*. In some aspects, the UE 115-*c* and/or the base station 105-*c* may determine the uplink configuration based on determining the downlink configuration at 1105, receiving the RRC message at 1110, determining the grant for performing the uplink transmission at 1115, or any combination thereof. The uplink configuration may include a set of resources for transmitting uplink transmissions at a set of uplink transmission occasions. In this regard, the uplink configuration may include a set of time resources, a set of frequency resources, a set of spatial resources, or any combination thereof. In some aspects, the uplink transmission occasions of the uplink configuration may be arranged according to a non-uniform spacing pattern in the time domain (e.g., uplink transmission occasions separated by one another by non-equivalent time durations).

In some aspects, the non-uniform spacing pattern may include a repeating periodicity format which defines periodicities between adjacent uplink transmission occasions. The repeating periodicity format may include two or more periodicities, and may be repeated for multiple iterations within the uplink configuration. For example, the non-uniform spacing pattern may include a repeating periodicity format 535 including a first uplink transmission periodicity 530-*a* (e.g., 8 ms) and a second uplink transmission periodicity (e.g., 9 ms) different from the first periodicity, where the first periodicity and the second periodicity separate adjacent uplink transmission occasions within the uplink configuration in the time domain. In this example, the repeating periodicity format including the first periodicity and the second periodicity may be repeated for a quantity of iterations (e.g., first iteration of the repeating periodicity format, second iteration of the repeating periodicity format). In particular, each iteration of the repeating periodicity format may define the first periodicity between a first uplink transmission occasion and a second uplink transmission occasion (e.g., 8 ms between the first and second uplink transmission occasions), the first periodicity between the second uplink transmission occasion and a third uplink transmission occasion (e.g., 8 ms between the second and third uplink transmission occasions), and the second periodicity between the third uplink transmission occasion and a fourth uplink transmission occasion (e.g., 9 ms between the third and fourth uplink transmission occasions).

In additional or alternative aspects, the non-uniform spacing pattern may include a repeating offset format which defines time offsets between one or more reference times and a set of adjacent uplink transmission occasions. The repeating offset format may include two or more time offsets, and may be repeated for multiple iterations within the uplink configuration. For example, the non-uniform spacing pattern may include a repeating offset format which defines a first offset between a reference time and a first uplink transmission occasion, a second offset between the reference time and a second uplink transmission occasion, and a third offset between the reference time and a third uplink transmission occasion. In this example, the repeating offset format including the first offset, the second offset, and the third offset may be repeated for a quantity of iterations (e.g., first iteration of the repeating offset format, second iteration of the repeating offset format). In particular, each iteration of the repeating offset format may define the first offset between a reference time and a first uplink transmission occasion, the second offset between the reference time and a second uplink transmission occasion, and the third offset between the reference time and a third uplink transmission occasion.

At 1125, the UE 115-*c* may determine one or more uplink transmission durations (e.g., CG-duration). Uplink transmission durations may indicate sets (sub-sets) of time resources in which uplink transmissions may be transmitted. In some aspects, the uplink transmission durations may be associated with the uplink configuration, and may be determined based on a repeating offset format of the non-uniform spacing pattern. In some aspects, each uplink transmission duration may include one or more symbols in the time domain, and may be used to differentiate uplink transmission occasions of the uplink configuration which are valid from uplink transmission occasions which are invalid. In particular, the UE 115-*c* may be configured to identify uplink symbols (e.g., uplink symbols defining uplink transmission occasions) which are within the uplink transmission durations as valid (e.g., usable, available) uplink transmission occasions. Conversely, the UE 115-*c* may be configured to identify uplink symbols (e.g., uplink symbols defining uplink transmission occasions) which are outside of the uplink transmission durations as invalid (e.g., unusable, unavailable) uplink transmission occasions. In some aspects, the uplink transmission durations may be configured by the base station 105-*c* (e.g., via RRC message at 1110). Additionally or alternatively, the UE 115-*c* may be pre-configured with the uplink transmission durations, and may be configured to selectively modify uplink transmission durations based on network conditions.

At 1130, the UE 115-*c* may determine an activity cycle associated with the UE 115-*c*. The activity cycle may include a making cycle, a DRX cycle, or both. In some aspects, the activity cycle may include a set of active durations of operation at the UE 115-*c* and a set of inactive durations of operation at the UE 115-*c*. For example, in the context of a DRX cycle, the DRX cycle may include a set of DRX off durations (e.g., inactive durations) in which the UE 115-*c* is in a lower power mode, and a set of DRX on durations (e.g., active durations) in which the UE 115-*c* is in a higher power mode. In some aspects, the activity cycle may be associated with the uplink configuration, and may be determined/configured based on a repeating offset format of the non-uniform spacing pattern. In some aspects, each active duration and/or inactive duration may include one or more symbols in the time domain, and may be used to differentiate uplink transmission occasions of the uplink configuration which are valid from uplink transmission occasions which are invalid. In particular, the UE 115-*c* may be configured to identify uplink symbols (e.g., uplink symbols defining uplink transmission occasions) which are within the set of active durations of operation at the UE 115-*c* as valid (e.g., usable, available) uplink transmission occasions. Conversely, the UE 115-*c* may be configured to identify uplink symbols (e.g., uplink symbols defining uplink transmission occasions) which are outside of the set of active durations of operation at the UE 115-*c* (e.g., within the set of inactive durations of operation) as invalid (e.g., unusable, unavailable) uplink transmission occasions. In some aspects, the UE 115-*c* may be configured to selectively adjust the activity cycle of the UE 115-*c* (e.g., making cycle, DRX cycle) based on the downlink configuration, the uplink configuration including the non-uniform spacing pattern, or both.

At 1135, the UE 115-*c* may determine valid uplink transmission occasions associated with the uplink configuration. In this regard, the UE 115-*c* may determine the valid uplink transmission on the determining the uplink configuration at 1120. Additionally or alternatively, the UE 115-*c* may determine the uplink transmission occasions at 1135 based on determining the downlink configuration at 1105, receiving the RRC message at 1110, determining the grant for performing uplink transmissions at 1115, or any combination thereof. In some cases, the UE 115-*c* may determine valid uplink transmission occasions by identifying uplink symbols (e.g., uplink symbols defining uplink transmission occasions) which are within the uplink transmission durations determined at 1125, which are within the active durations of the activity cycle (e.g., masking cycle, DRX cycle) determined at 1130, or any combination thereof. In some aspects, the UE 115-*c* may determine the uplink transmission occasions using one or more equations, algorithms, or other mathematical operations. For example, in some cases, the UE 115-*c* may determine the set of uplink transmission occasions (e.g., set of valid uplink transmission occasions) according to Equation (1), as described herein.

At 1140, the UE 115-*c* may receive downlink transmissions from the base station 105-*c*. In some aspects, the UE 115-*c* may receive the downlink transmissions at 1135 based on (e.g., in accordance with) the downlink configuration determined at 1105, the indication of the downlink configuration indicated in the RRC message received at 1110, or both. In the context of XR applications, the downlink transmissions may include downlink data (e.g., XR frames) which are transmitted from an XR server to the base station 105-*c* for transmission to the UE 115-*c*.

At 1145, the UE 115-*c* may transmit, to the base station 105-*c*, one or more uplink transmissions. The UE 115-*c* may transmit the one or more uplink transmissions based on identifying that the UE 115-*c* has data which is to be transmitted to the base station 105-*c* and/or the XR server 405-*b*. For example, in the context of XR applications, the UE 115-*c* may transmit the uplink transmissions to the base station 105-*b* at 1145 based on identifying pose information, control information, and/or scene information which is to be transmitted (e.g., relayed) to the XR server 405-*b* to carry out an XR application.

In some aspects, the UE 115-*c* may transmit the one or more uplink transmissions based on the uplink configuration determined at 1120. In this regard, the UE 115-*c* may transmit the uplink transmissions based on the downlink configuration determined at 1105, receiving the RRC message at 1110, determining the uplink transmission durations at 1125, determining the activity cycle and/or DRX cycle at 1130, determining the uplink transmission occasions at 1135, or any combination thereof. For example, the UE 115-*c* may transmit the uplink transmissions within the set of uplink symbols within the uplink transmission durations. Similarly, the UE 115-*c* may transmit the uplink transmissions within the set of uplink symbols within the active durations of the activity cycle and/or DRX cycle.

At 1150, the base station 105-*c* may transmit (e.g., relay, forward) the uplink transmissions received from the UE 115-*c* to the XR server 405-*b*. In this regard, the base station 105-*b* may transmit the uplink transmissions to the XR server 405-*b* at 1150 based on receiving the uplink transmissions from the UE 115-*c* at 1145. For example, the uplink transmissions received from the UE 115-*c* may include an indication that the uplink transmissions are intended for the XR server 405-*b*, and the base station 105-*c* may transmit the uplink transmissions to the XR server 405-*b* based on the indication. In the context of XR applications, the XR server 405-*b* may be configured to receive the uplink transmissions from the UE 115-*b* through the base station 105-*c*, and may be configured to process the information (e.g., pose information, control information, scene information) within the uplink transmissions, as discussed previously herein.

The techniques described herein may provide for reduced power consumption and improved battery performance at the UE 115-*c*. In particular, by enabling for uplink transmission occasions to be arranged according to a non-uniform spacing pattern in the time domain, techniques described herein may enable improved coordination of downlink reception occasions and uplink transmission occasions. The improved coordination of downlink reception occasions and uplink transmission occasions may reduce interruptions of DRX sleep cycles, thereby reducing power consumption at the UE 115-*c*, improving UE 115-*c* battery performance, and improving user experience within a wireless communications system (e.g., wireless communications system 100, 200, or 400).

Figure 12:
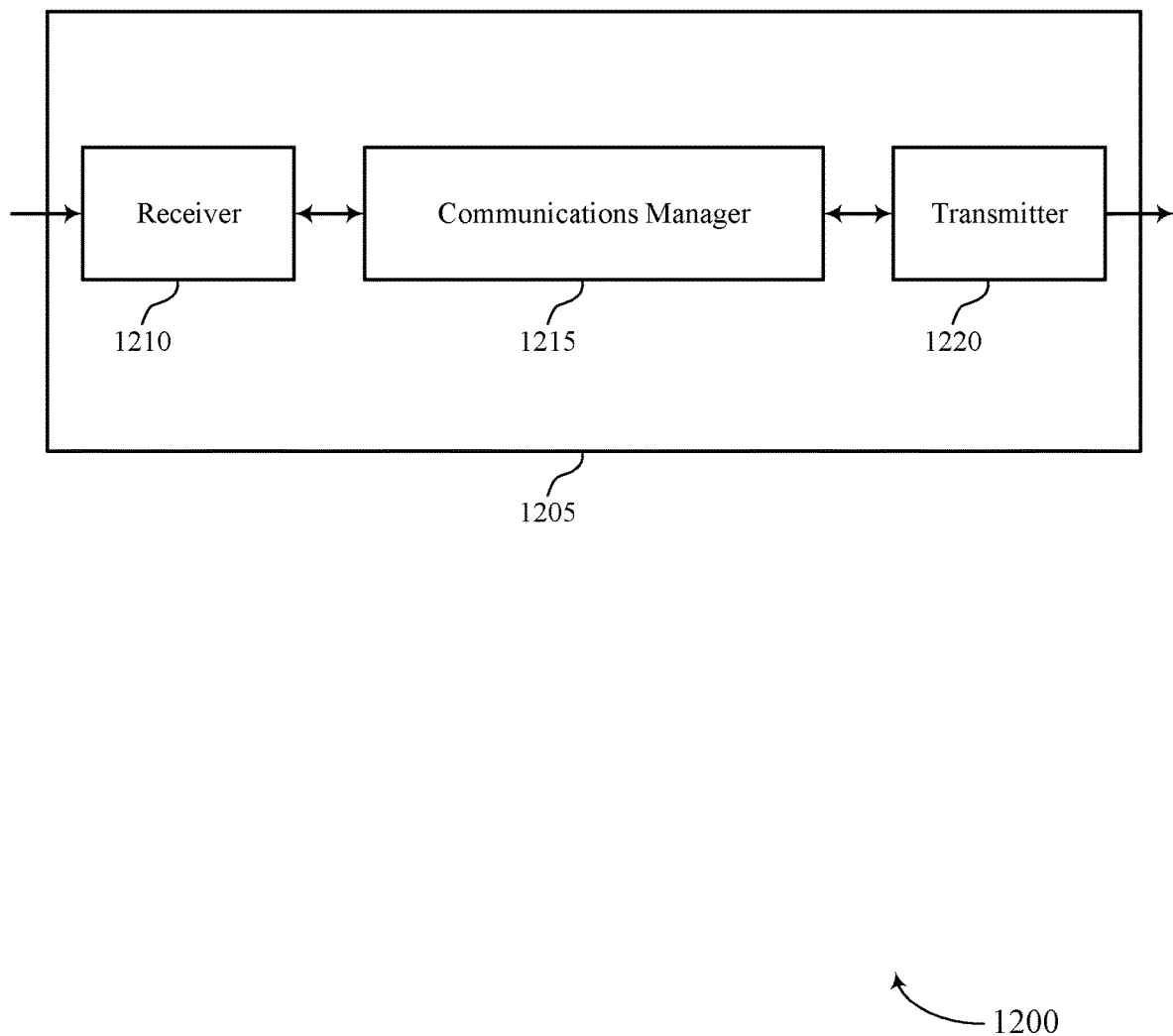
FIGS. 12 and 13 show block diagrams of devices that support techniques for enhanced configured grant configuration in accordance with aspects of the present disclosure.

FIG. 12 shows a block diagram 1200 of a device 1205 that supports techniques for enhanced configured grant configuration in accordance with aspects of the present disclosure. The device 1205 may be an example of aspects of a UE 115 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to techniques for enhanced configured grant configuration, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may determine a downlink configuration including a set of resources for receiving downlink transmissions. The communications manager 1215 may determine a grant for performing uplink transmissions based on an RRC message. The communications manager 1215 may determine, based on the downlink configuration, the grant, or both, an uplink configuration including a set of resources for transmitting the uplink transmissions at a set of uplink transmission occasions. In some examples, the set of uplink transmission occasions are arranged according to a non-uniform spacing pattern in a time domain. The communications manager 1215 may transmit, to a base station, one or more uplink transmission based on the uplink configuration. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver. For example, the transmitter 1220 may be an example of aspects of the transceiver 1520 described with reference to FIG. 15. The transmitter 1220 may utilize a single antenna or a set of antennas.

Figure 13:
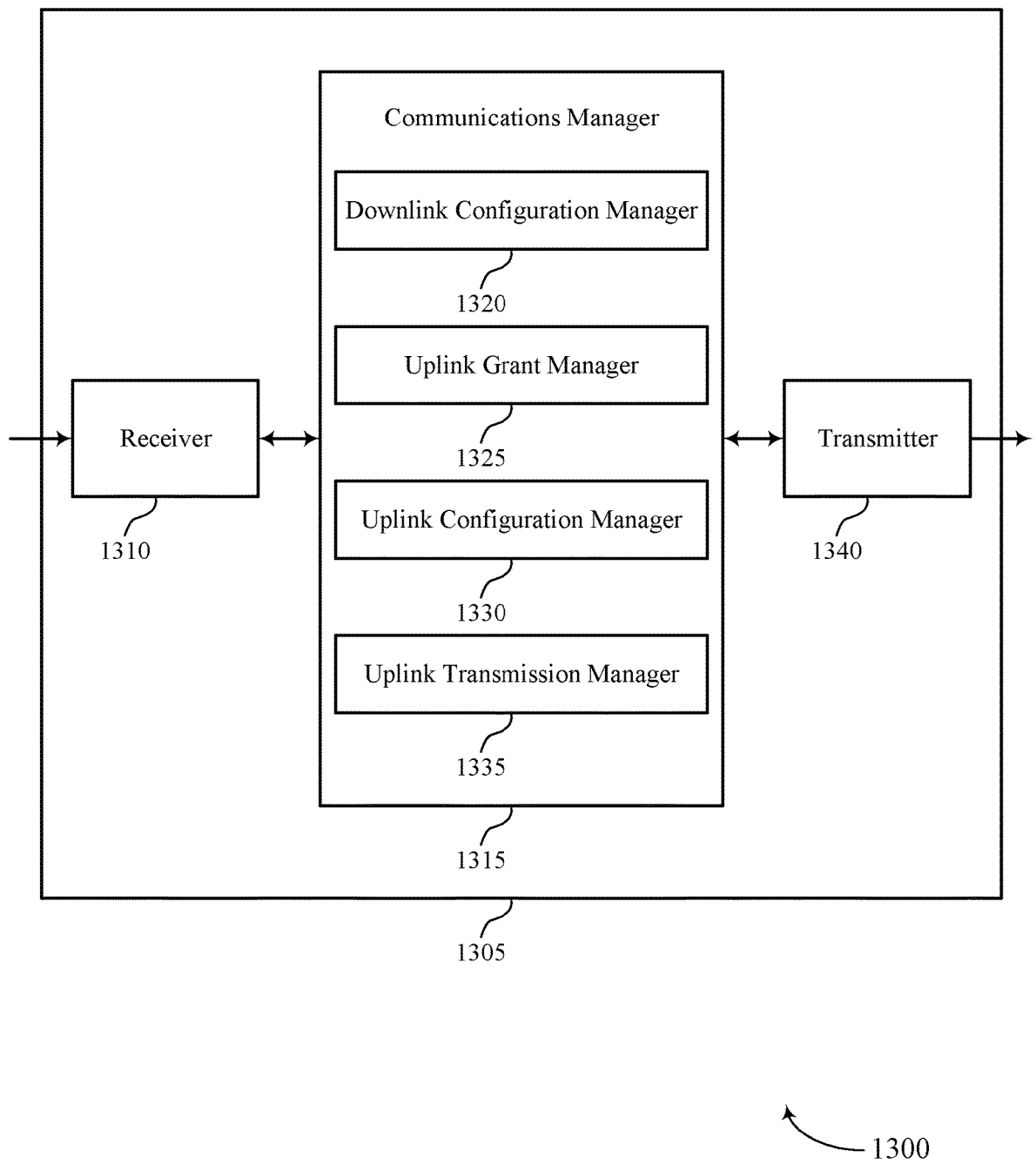

FIG. 13 shows a block diagram 1300 of a device 1305 that supports techniques for enhanced configured grant configuration in accordance with aspects of the present disclosure. The device 1305 may be an example of aspects of a device 1205 or a UE 115 as described herein. The device 1305 may include a receiver 1310, a communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to techniques for enhanced configured grant configuration, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a downlink configuration manager 1320, an uplink grant manager 1325, an uplink configuration manager 1330, and an uplink transmission manager 1335. The communications manager 1315 may be an example of aspects of the communications manager 1510 described herein. The downlink configuration manager 1320 may determine a downlink configuration including a set of resources for receiving downlink transmissions. The uplink grant manager 1325 may determine a grant for performing uplink transmissions based on an RRC message. The uplink configuration manager 1330 may determine, based on the downlink configuration, the grant, or both, an uplink configuration including a set of resources for transmitting the uplink transmissions at a set of uplink transmission occasions, where the set of uplink transmission occasions are arranged according to a non-uniform spacing pattern in a time domain. The uplink transmission manager 1335 may transmit, to a base station, one or more uplink transmission based on the uplink configuration.

The transmitter 1340 may transmit signals generated by other components of the device 1305. In some examples, the transmitter 1340 may be collocated with a receiver 1310 in a transceiver. For example, the transmitter 1340 may be an example of aspects of the transceiver 1520 described with reference to FIG. 15. The transmitter 1340 may utilize a single antenna or a set of antennas.

Figure 14:
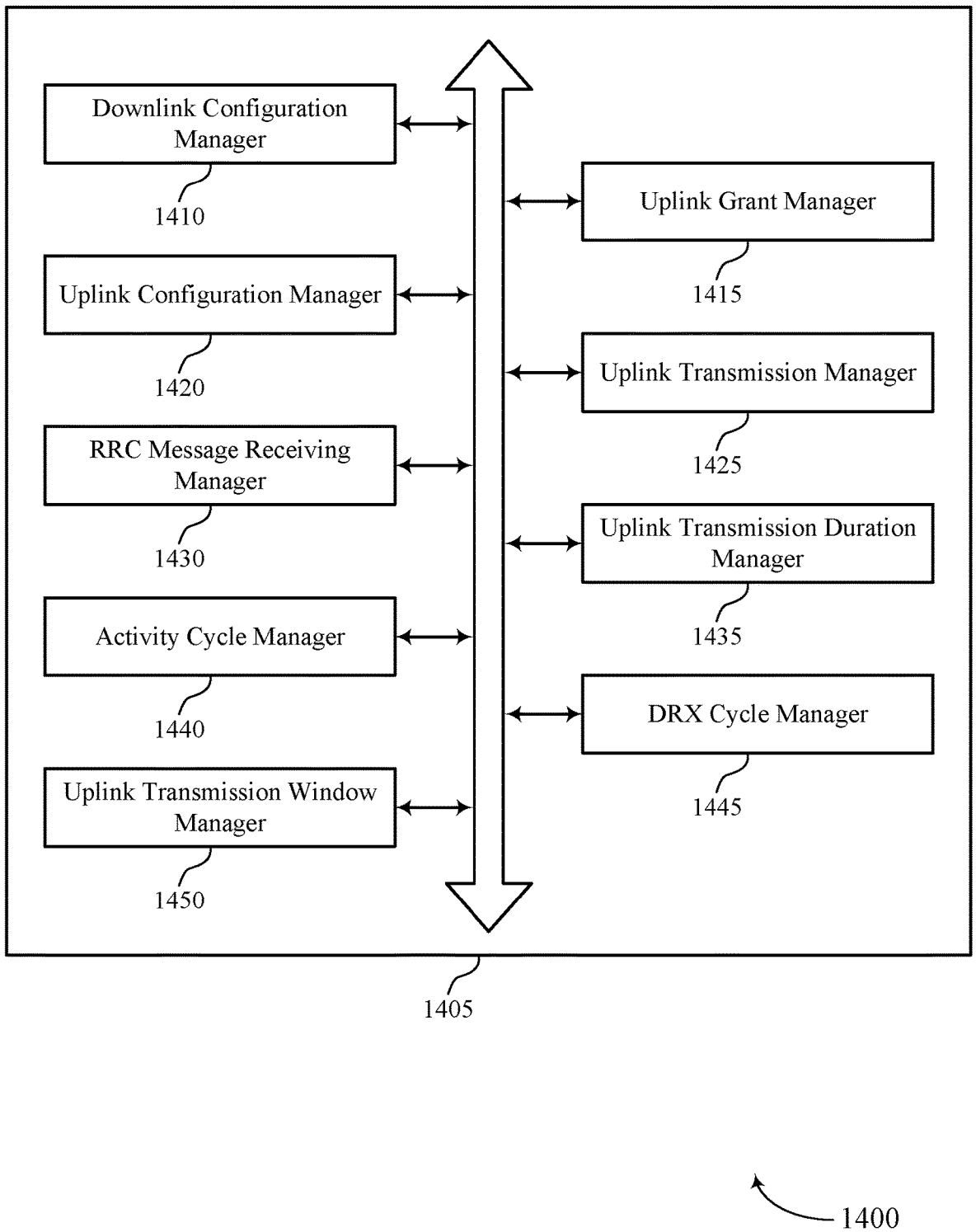
FIG. 14 shows a block diagram of a communications manager that supports techniques for enhanced configured grant configuration in accordance with aspects of the present disclosure.

FIG. 14 shows a block diagram 1400 of a communications manager 1405 that supports techniques for enhanced configured grant configuration in accordance with aspects of the present disclosure. The communications manager 1405 may be an example of aspects of a communications manager 1215, a communications manager 1315, or a communications manager 1510 described herein. The communications manager 1405 may include a downlink configuration manager 1410, an uplink grant manager 1415, an uplink configuration manager 1420, an uplink transmission manager 1425, an RRC message receiving manager 1430, an uplink transmission duration manager 1435, an activity cycle manager 1440, a DRX cycle manager 1445, and an uplink transmission window manager 1450. Each of these components may communicate, directly or indirectly, with one another (e.g., via one or more buses).

The downlink configuration manager 1410 may determine a downlink configuration including a set of resources for receiving downlink transmissions. In some cases, the set of resources for receiving downlink transmissions includes a set of downlink reception occasions arranged according to a uniform spacing pattern in a time domain. The uplink grant manager 1415 may determine a grant for performing uplink transmissions based on an RRC message. The uplink configuration manager 1420 may determine, based on the downlink configuration, the grant, or both, an uplink configuration including a set of resources for transmitting the uplink transmissions at a set of uplink transmission occasions, where the set of uplink transmission occasions are arranged according to a non-uniform spacing pattern in the time domain. In some cases, the non-uniform spacing pattern includes a repeating periodicity format defining periodicities between adjacent uplink transmission occasions of the set of uplink transmission occasions.

The uplink configuration manager 1420 may determine the set of uplink transmission occasions according to an equation Floor(mod(k−Offset, P))=0 where $k = n_f * N_{\{slot\}}^{\{frame,\mu\}} + n_{\{s,f\}}^{\{\mu\}}$. In some examples, k defines a symbol of an uplink transmission occasion of the set of uplink transmission occasions. In some examples, P defines a periodicity between adjacent uplink transmission occasions. In some examples, mod includes a modular operation and Floor defines a flooring operation. In some examples, Offset defines an offset between a reference time and the uplink transmission occasion of the set of uplink transmission occasions. In some examples, $n_f$ defines a frame number, $N_{\{slot\}}^{\{frame,\mu\}}$ defines a quantity of slots per frame, and $n_{\{s,f\}}^{\{\mu\}}$ defines a slot number within the frame.

The repeating periodicity format includes a first periodicity and a second periodicity different from the first periodicity, the first periodicity and the second periodicity separating adjacent uplink transmission occasions of the set of uplink transmission occasions in the time domain. In some cases, each iteration of the repeating periodicity format defines the first periodicity between a first uplink transmission occasion and a second uplink transmission occasion, the first periodicity between the second uplink transmission occasion and a third uplink transmission occasion, and the second periodicity between the third uplink transmission occasion and a fourth uplink transmission occasion.

The non-uniform spacing pattern includes a repeating offset format defining time offsets between a reference time and a set of adjacent uplink transmission occasions of the set of uplink transmission occasions. In some cases, each iteration of the repeating offset format defines a first offset between the reference time and a first uplink transmission occasion, a second offset between the reference time and a second uplink transmission occasion, and a third offset between the reference time and a third uplink transmission occasion.

The uplink transmission manager 1425 may transmit, to a base station, one or more uplink transmission based on the uplink configuration. The RRC message receiving manager 1430 may receive, from the base station, the RRC message including an indication of the grant for performing the uplink transmissions, where determining the uplink configuration is based on receiving the RRC message. The uplink transmission duration manager 1435 may determine a set of uplink transmission durations based on the repeating offset format, each uplink transmission duration including one or more symbols in the time domain. In some examples, the uplink transmission duration manager 1435 may determine a set of uplink symbols within the set of uplink transmission durations. In some examples, the set of uplink transmission occasions include the set of uplink symbols. In some examples, the one or more uplink transmissions are transmitted within one or more uplink symbols of the set of uplink symbols.

The activity cycle manager 1440 may determine an activity cycle of the UE, the activity cycle including a set of active durations of operation at the UE and a set of inactive durations of operation at the UE. In some examples, the activity cycle manager 1440 may determine a set of uplink symbols within the set of active durations of operation at the UE. In some examples, the set of uplink transmission occasions include the set of uplink symbols. In some examples, the one or more uplink transmissions are transmitted within one or more uplink symbols of the set of uplink symbols. In some cases, the activity cycle includes a masking cycle of the UE. In some cases, the activity cycle includes a DRX cycle of the UE.

The DRX cycle manager 1445 may determine a DRX cycle of the UE, the DRX cycle including a set of active periods of operation at the UE and a set of inactive periods of operation at the UE. The uplink transmission window manager 1450 may determine a set of uplink transmission windows based on the DRX. In some examples, the uplink transmission window manager 1450 may determine a set of uplink symbols within the set of uplink transmission windows. In some examples, the set of uplink transmission occasions include the set of uplink symbols, and the one or more uplink transmissions are transmitted within one or more uplink symbols of the set of uplink symbols. In some examples, the uplink transmission window manager 1450 may determine at least one of an offset or a duration associated with each uplink transmission window of the set of uplink transmission windows relative to a start time of each active period of the DRX. In some cases, an ending time of each uplink transmission window coincides with a start time of an active period of the set of active periods of the DRX.

Figure 15:
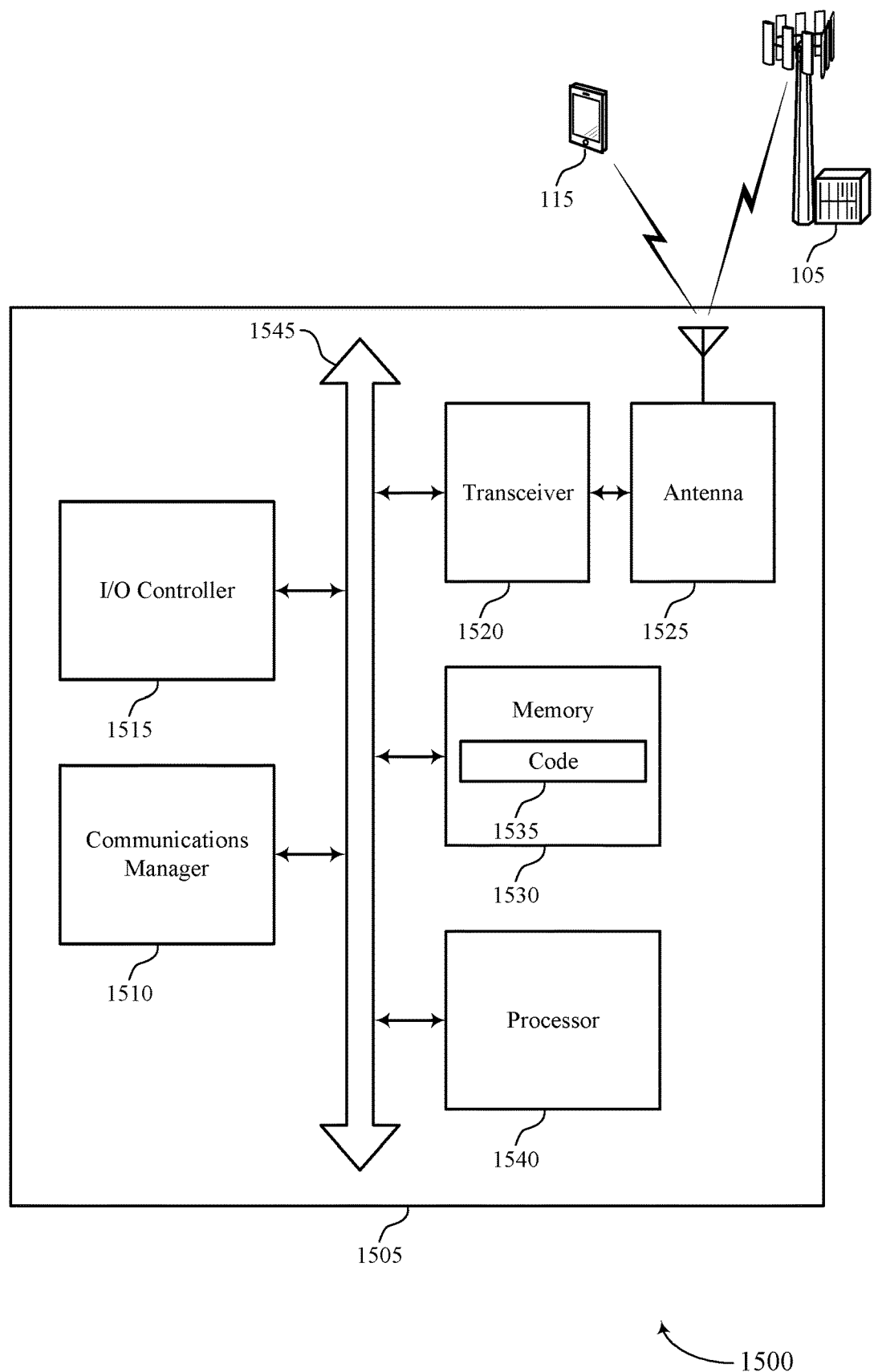
FIG. 15 shows a diagram of a system including a device that supports techniques for enhanced configured grant configuration in accordance with aspects of the present disclosure.

FIG. 15 shows a diagram of a system 1500 including a device 1505 that supports techniques for enhanced configured grant configuration in accordance with aspects of the present disclosure. The device 1505 may be an example of or include the components of device 1205, device 1305, or a UE 115 as described herein. The device 1505 may include components for bi-directional voice and data communications including components for transmitting and receiving communications, including a communications manager 1510, an I/O controller 1515, a transceiver 1520, an antenna 1525, memory 1530, and a processor 1540. These components may be in electronic communication via one or more buses (e.g., bus 1545).

The communications manager 1510 may determine a downlink configuration including a set of resources for receiving downlink transmissions, determine a grant for performing uplink transmissions based on an RRC message, determine, based on the downlink configuration, the grant, or both, an uplink configuration including a set of resources for transmitting the uplink transmissions at a set of uplink transmission occasions, where the set of uplink transmission occasions are arranged according to a non-uniform spacing pattern in a time domain, and transmit, to a base station, one or more uplink transmission based on the uplink configuration.

The I/O controller 1515 may manage input and output signals for the device 1505. The I/O controller 1515 may also manage peripherals not integrated into the device 1505. In some cases, the I/O controller 1515 may represent a physical connection or port to an external peripheral. In some cases, the I/O controller 1515 may utilize an operating system such as iOS®, ANDROID®, MS-DOS®, MS-WINDOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of a processor. In some cases, a user may interact with the device 1505 via the I/O controller 1515 or via hardware components controlled by the I/O controller 1515.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas. In some cases, the device 1505 may include a single antenna 1525. However, in some cases, the device 1505 may have more than one antenna 1525, which may be capable of concurrently transmitting or receiving multiple wireless transmissions.

The memory 1530 may include random-access memory (RAM) and read-only memory (ROM). The memory 1530 may store computer-readable, computer-executable code 1535 including instructions that, when executed, cause the processor 1540 to perform various functions described herein. In some cases, the memory 1530 may contain, among other things, a basic I/O system (BIOS) which may control basic hardware or software operation such as the interaction with peripheral components or devices.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

The processor 1540 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1540 may be configured to operate a memory array using a memory controller. In other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting techniques for enhanced configured grant configuration).

Figure 16:
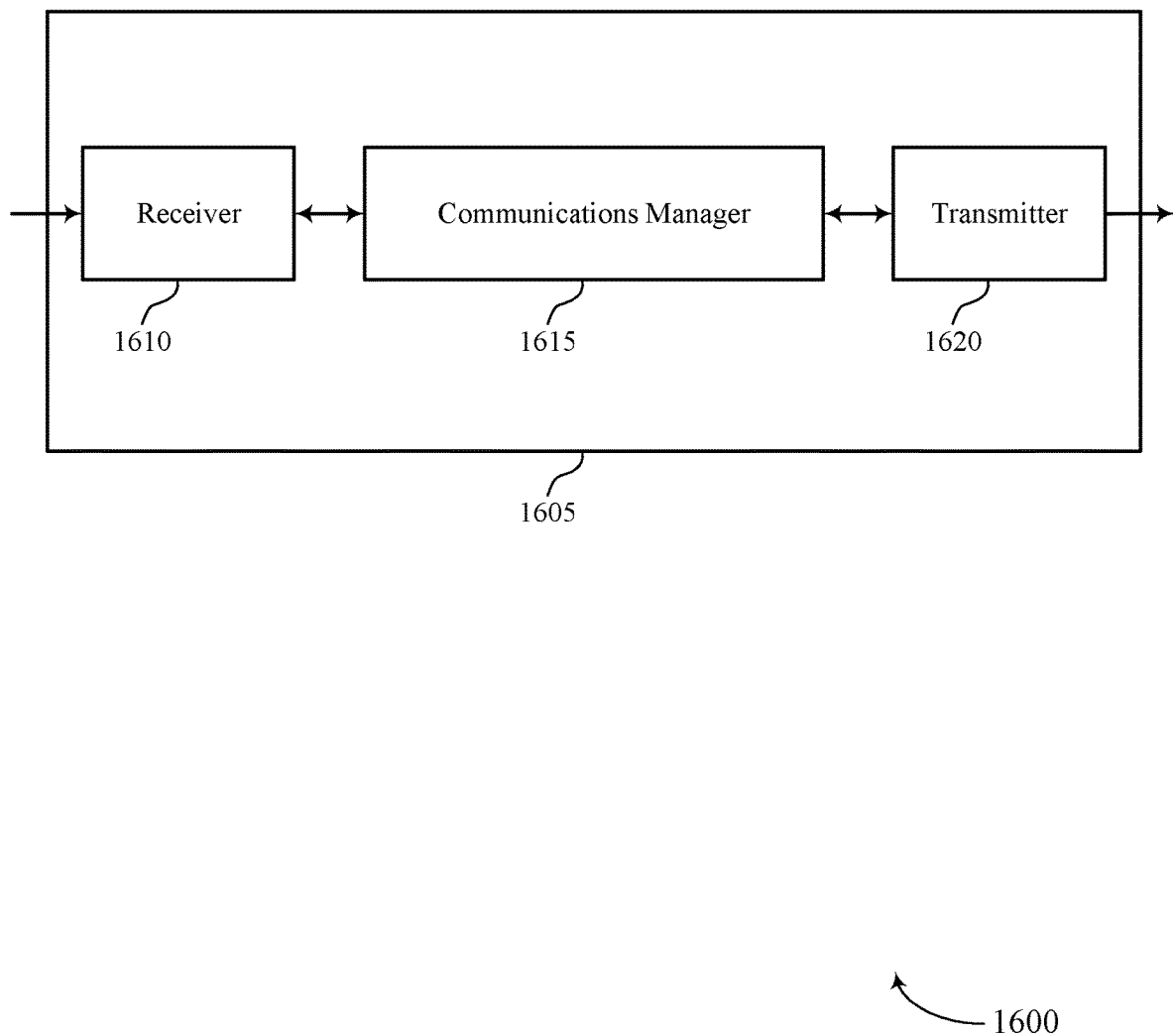
FIGS. 16 and 17 show block diagrams of devices that support techniques for enhanced configured grant configuration in accordance with aspects of the present disclosure.

FIG. 16 shows a block diagram 1600 of a device 1605 that supports techniques for enhanced configured grant configuration in accordance with aspects of the present disclosure. The device 1605 may be an example of aspects of a base station 105 as described herein. The device 1605 may include a receiver 1610, a communications manager 1615, and a transmitter 1620. The device 1605 may also include a processor. Each of these components may be in communication with one another (e.g., via one or more buses).

The receiver 1610 may receive information such as packets, user data, or control information associated with various information channels (e.g., control channels, data channels, and information related to techniques for enhanced configured grant configuration, etc.). Information may be passed on to other components of the device 1605. The receiver 1610 may be an example of aspects of the transceiver 1920 described with reference to FIG. 19. The receiver 1610 may utilize a single antenna or a set of antennas.

The communications manager 1615 may determine a downlink configuration including a set of resources for transmitting downlink transmissions to a UE. The communications manager 1615 may determine a grant for the UE to perform uplink transmissions based on an RRC message. The communications manager 1615 may determine, based on the downlink configuration, the grant, or both, an uplink configuration including a set of resources for receiving the uplink transmissions from the UE at a set of uplink transmission occasions. In some examples, the set of uplink transmission occasions are arranged according to a non-uniform spacing pattern in a time domain. The communications manager 1615 may receive, from the UE, one or more uplink transmissions based on the uplink configuration. The communications manager 1615 may be an example of aspects of the communications manager 1910 described herein.

The communications manager 1615, or its sub-components, may be implemented in hardware, code (e.g., software or firmware) executed by a processor, or any combination thereof. If implemented in code executed by a processor, the functions of the communications manager 1615, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1615, or its sub-components, may be physically located at various positions, including being distributed such that portions of functions are implemented at different physical locations by one or more physical components. In some examples, the communications manager 1615, or its sub-components, may be a separate and distinct component in accordance with various aspects of the present disclosure. In some examples, the communications manager 1615, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1620 may transmit signals generated by other components of the device 1605. In some examples, the transmitter 1620 may be collocated with a receiver 1610 in a transceiver. For example, the transmitter 1620 may be an example of aspects of the transceiver 1920 described with reference to FIG. 19. The transmitter 1620 may utilize a single antenna or a set of antennas.

Figure 17:
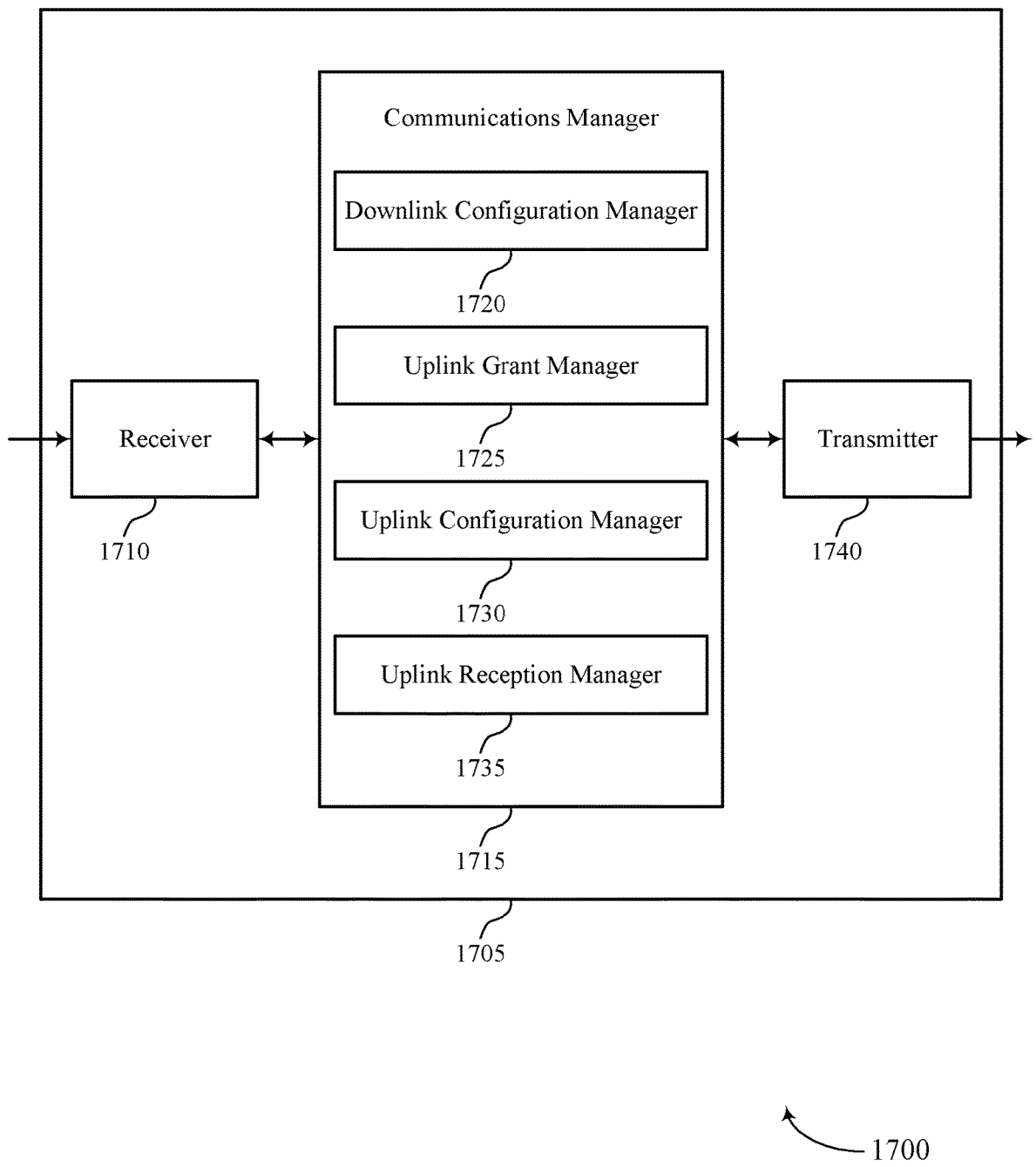

FIG. 17 shows a block diagram 1700 of a device 1705 that supports techniques for enhanced configured grant configuration in accordance with aspects of the present disclosure. The device 1705 may be an example of aspects of a device 1605, or a base station 105 as described herein. The device 1705 may include a receiver 1710, a communications manager 1715, and a transmitter 1740. The device 1705 may also include a processor. Each of these components may be in communication with one another (e.g., via one or more buses).

The receiver 1710 may receive information such as packets, user data, or control information associated with various information channels (e.g., control channels, data channels, and information related to techniques for enhanced configured grant configuration, etc.). Information may be passed on to other components of the device 1705. The receiver 1710 may be an example of aspects of the transceiver 1920 described with reference to FIG. 19. The receiver 1710 may utilize a single antenna or a set of antennas.

The communications manager 1715 may be an example of aspects of the communications manager 1615 as described herein. The communications manager 1715 may include a downlink configuration manager 1720, an uplink grant manager 1725, an uplink configuration manager 1730, and an uplink reception manager 1735. The communications manager 1715 may be an example of aspects of the communications manager 1910 described herein. The downlink configuration manager 1720 may determine a downlink configuration including a set of resources for transmitting downlink transmissions to a UE. The uplink grant manager 1725 may determine a grant for the UE to perform the uplink transmissions based on an RRC message. The uplink configuration manager 1730 may determine, based on the downlink configuration, the grant, or both, an uplink configuration including a set of resources for receiving uplink transmissions from the UE at a set of uplink transmission occasions, where the set of uplink transmission occasions are arranged according to a non-uniform spacing pattern in the time domain. The uplink reception manager 1735 may receive, from the UE, one or more uplink transmissions based on the uplink configuration.

The transmitter 1740 may transmit signals generated by other components of the device 1705. In some examples, the transmitter 1740 may be collocated with a receiver 1710 in a transceiver. For example, the transmitter 1740 may be an example of aspects of the transceiver 1920 described with reference to FIG. 19. The transmitter 1740 may utilize a single antenna or a set of antennas.

Figure 18:
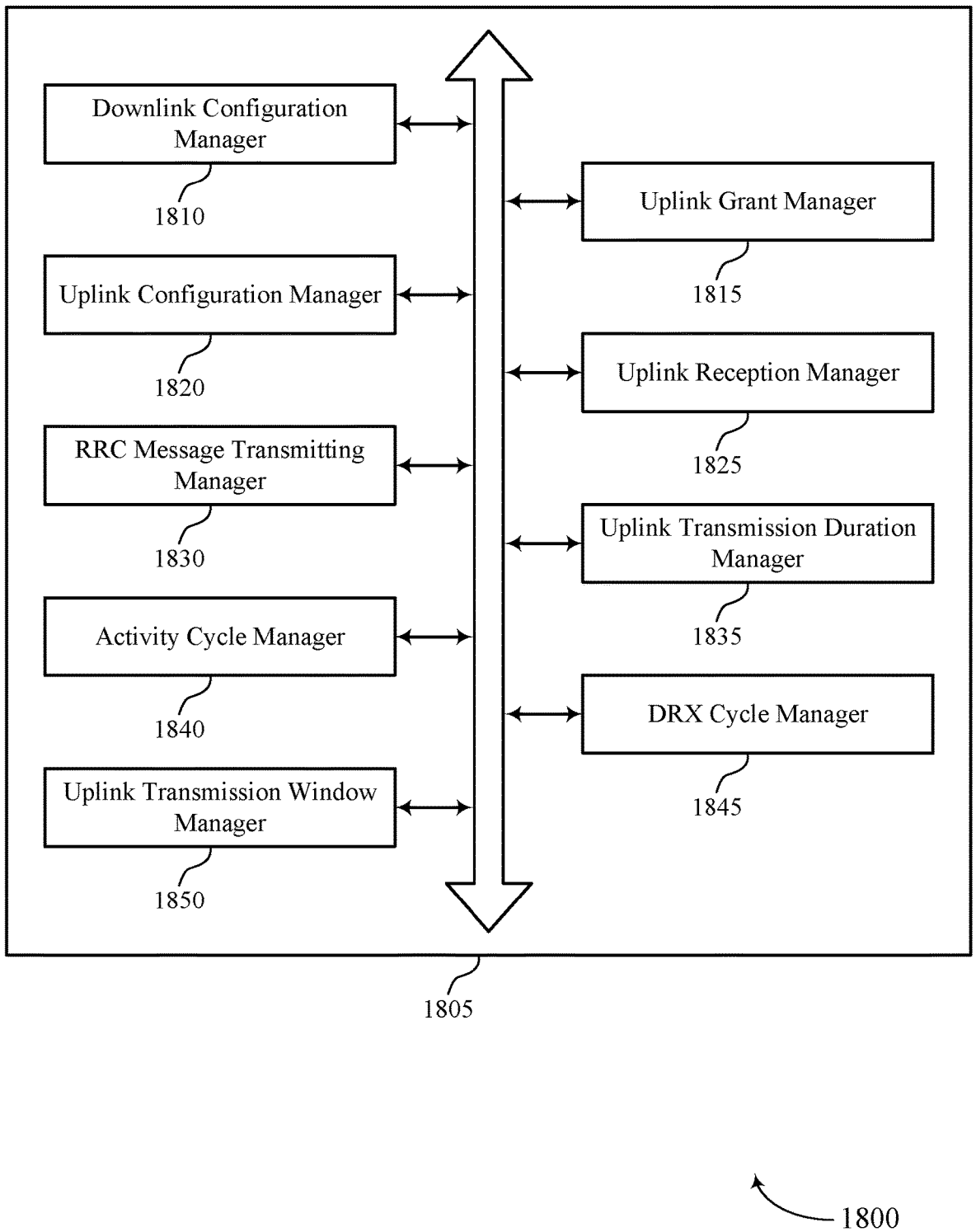
FIG. 18 shows a block diagram of a communications manager that supports techniques for enhanced configured grant configuration in accordance with aspects of the present disclosure.

FIG. 18 shows a block diagram 1800 of a communications manager 1805 that supports techniques for enhanced configured grant configuration in accordance with aspects of the present disclosure. The communications manager 1805 may be an example of aspects of a communications manager 1615, a communications manager 1715, or a communications manager 1910 described herein. The communications manager 1805 may include a downlink configuration manager 1810, an uplink grant manager 1815, an uplink configuration manager 1820, an uplink reception manager 1825, an RRC message transmitting manager 1830, an uplink transmission duration manager 1835, an activity cycle manager 1840, a DRX cycle manager 1845, and an uplink transmission window manager 1850. Each of these components may communicate, directly or indirectly, with one another (e.g., via one or more buses).

The downlink configuration manager 1810 may determine a downlink configuration including a set of resources for transmitting downlink transmissions to a UE. In some cases, the set of resources for transmitting the downlink transmissions includes a set of downlink transmission occasions arranged according to a uniform spacing pattern in a time domain. The uplink grant manager 1815 may determine a grant for the UE to perform uplink transmissions based on an RRC message. The uplink configuration manager 1820 may determine, based on the downlink configuration, the grant, or both, an uplink configuration including a set of resources for receiving the uplink transmissions from the UE at a set of uplink transmission occasions. In some examples, the set of uplink transmission occasions are arranged according to a non-uniform spacing pattern in the time domain. In some cases, the non-uniform spacing pattern includes a repeating periodicity format defining periodicities between adjacent uplink transmission occasions of the set of uplink transmission occasions.

The uplink grant manager 1815 may determine the set of uplink transmission occasions according to an equation Floor(mod(k−Offset, P))=0 where $k=n_f*N_{\{slot\}}^{\{frame,\mu\}} + n_{\{s,f\}}^{\{\mu\}}$. In some examples, k defines a symbol of an uplink transmission occasion of the set of uplink transmission occasions, and P defines a periodicity between adjacent uplink transmission occasions. In some examples, mod includes a modular operation, and Floor defines a flooring operation. In some examples, Offset defines an offset between a reference time and the uplink transmission occasion of the set of uplink transmission occasions. In some examples, $n_f$ defines a frame number, $N_{\{slot\}}^{\{frame,\mu\}}$ defines a quantity of slots per frame, and $n_{\{s,f\}}^{\{\mu\}}$ defines a slot number within the frame.

The repeating periodicity format includes a first periodicity and a second periodicity different from the first periodicity, the first periodicity and the second periodicity separating adjacent uplink transmission occasions of the set of uplink transmission occasions in the time domain. In some cases, each iteration of the repeating periodicity format defines the first periodicity between a first uplink transmission occasion and a second uplink transmission occasion, the first periodicity between the second uplink transmission occasion and a third uplink transmission occasion, and the second periodicity between the third uplink transmission occasion and a fourth uplink transmission occasion.

In some cases, the non-uniform spacing pattern includes a repeating offset format defining time offsets between a reference time and a set of adjacent uplink transmission occasions of the set of uplink transmission occasions. In some cases, each iteration of the repeating offset format defines a first offset between the reference time and a first uplink transmission occasion, a second offset between the reference time and a second uplink transmission occasion, and a third offset between the reference time and a third uplink transmission occasion.

The uplink reception manager 1825 may receive, from the UE, one or more uplink transmissions based on the uplink configuration. The RRC message transmitting manager 1830 may transmit, to the UE, the RRC message including an indication of the grant for performing uplink transmissions. In some examples, receiving the one or more uplink transmissions is based on transmitting the RRC message.

The uplink transmission duration manager 1835 may determine a set of uplink transmission durations based on the repeating offset format, each uplink transmission duration including one or more symbols in the time domain. In some examples, the uplink transmission duration manager 1835 may determine a set of uplink symbols within the set of uplink transmission durations. In some examples, the set of uplink transmission occasions include the set of uplink symbols. In some examples, the one or more uplink transmissions are received within one or more uplink symbols of the set of uplink symbols.

The activity cycle manager 1840 may determine an activity cycle of the UE, the activity cycle including a set of active durations of operation at the UE and a set of inactive durations of operation at the UE. In some examples, the activity cycle manager 1840 may determine a set of uplink symbols within the set of active durations of operation at the UE, where the set of uplink transmission occasions include the set of uplink symbols, and where the one or more uplink transmissions are received within one or more uplink symbols of the set of uplink symbols. In some cases, the activity cycle includes a masking cycle of the UE. In some cases, the activity cycle includes a DRX cycle of the UE.

The DRX cycle manager 1845 may determine a DRX cycle of the UE, the DRX cycle including a set of active periods of operation at the UE and a set of inactive periods of operation at the UE. The uplink transmission window manager 1850 may determine a set of uplink transmission windows based on the DRX cycle. In some examples, the uplink transmission window manager 1850 may determine a set of uplink symbols within the set of uplink transmission windows. In some examples, the set of uplink transmission occasions include the set of uplink symbols, and the one or more uplink transmissions are received within one or more uplink symbols of the set of uplink symbols. In some examples, the uplink transmission window manager 1850 may determine at least one of an offset or a duration associated with each uplink transmission window of the set of uplink transmission windows relative to a start time of each active period of the DRX cycle. In some cases, an ending time of each uplink transmission window coincides with a start time of an active period of the set of active periods of the DRX cycle.

Figure 19:
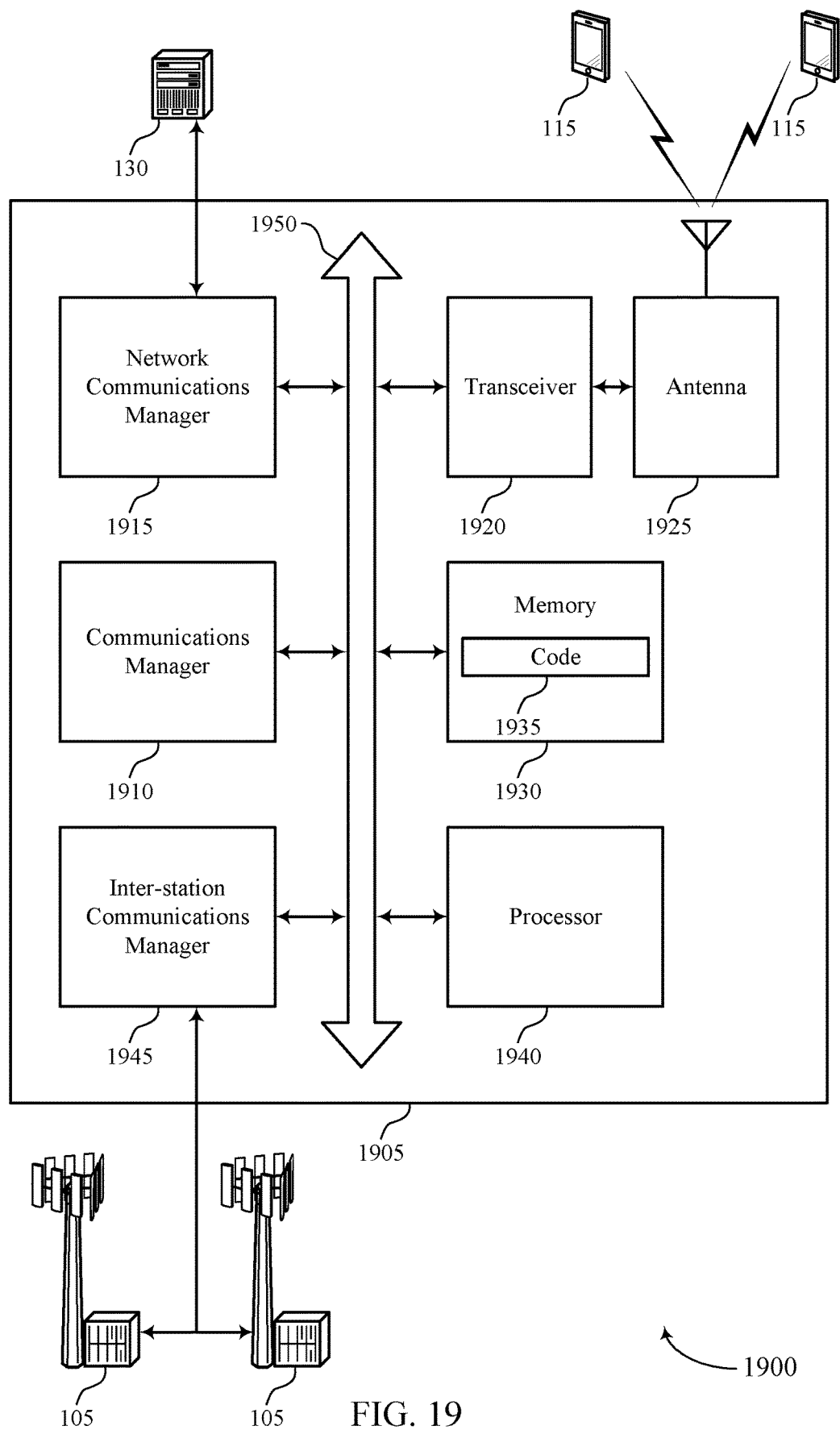
FIG. 19 shows a diagram of a system including a device that supports techniques for enhanced configured grant configuration in accordance with aspects of the present disclosure.

FIG. 19 shows a diagram of a system 1900 including a device 1905 that supports techniques for enhanced configured grant configuration in accordance with aspects of the present disclosure. The device 1905 may be an example of or include the components of device 1605, device 1705, or a base station 105 as described herein. The device 1905 may include components for bi-directional voice and data communications including components for transmitting and receiving communications, including a communications manager 1910, a network communications manager 1915, a transceiver 1920, an antenna 1925, memory 1930, a processor 1940, and an inter-station communications manager 1945. These components may be in electronic communication via one or more buses (e.g., bus 1950).

The communications manager 1910 may determine a downlink configuration including a set of resources for transmitting downlink transmissions to a UE. The communications manager 1910 may determine a grant for the UE to perform uplink transmissions based on an RRC message. The communications manager 1910 may determine, based on the downlink configuration, the grant, or both, an uplink configuration including a set of resources for receiving the uplink transmissions from the UE at a set of uplink transmission occasions. In some examples, the set of uplink transmission occasions are arranged according to a non-uniform spacing pattern in a time domain. The communications manager 1910 may receive, from the UE, one or more uplink transmissions based on the uplink configuration.

The network communications manager 1915 may manage communications with the core network (e.g., via one or more wired backhaul links). For example, the network communications manager 1915 may manage the transfer of data communications for client devices, such as one or more UEs 115.

The transceiver 1920 may communicate bi-directionally, via one or more antennas, wired, or wireless links as described herein. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas. In some cases, the device 1905 may include a single antenna 1925. However, in some cases, the device 1905 may have more than one antenna 1925, which may be capable of concurrently transmitting or receiving multiple wireless transmissions.

The memory 1930 may include RAM, ROM, or a combination thereof. The memory 1930 may store computer-readable code 1935 including instructions that, when executed by a processor (e.g., the processor 1940) cause the device to perform various functions described herein. In some cases, the memory 1930 may contain, among other things, a BIOS which may control basic hardware or software operation such as the interaction with peripheral components or devices.

The code 1935 may include instructions to implement aspects of the present disclosure, including instructions to support wireless communications. The code 1935 may be stored in a non-transitory computer-readable medium such as system memory or other type of memory. In some cases, the code 1935 may not be directly executable by the processor 1940 but may cause a computer (e.g., when compiled and executed) to perform functions described herein.

The processor 1940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In some cases, a memory controller may be integrated into processor 1940. The processor 1940 may be configured to execute computer-readable instructions stored in a memory (e.g., the memory 1930) to cause the device 1905 to perform various functions (e.g., functions or tasks supporting techniques for enhanced configured grant configuration).

The inter-station communications manager 1945 may manage communications with other base station 105, and may include a controller or scheduler for controlling communications with UEs 115 in cooperation with other base stations 105. For example, the inter-station communications manager 1945 may coordinate scheduling for transmissions to UEs 115 for various interference mitigation techniques such as beamforming or joint transmission. In some examples, the inter-station communications manager 1945 may provide an X2 interface within an LTE/LTE-A wireless communication network technology to provide communication between base stations 105.

Figure 20:
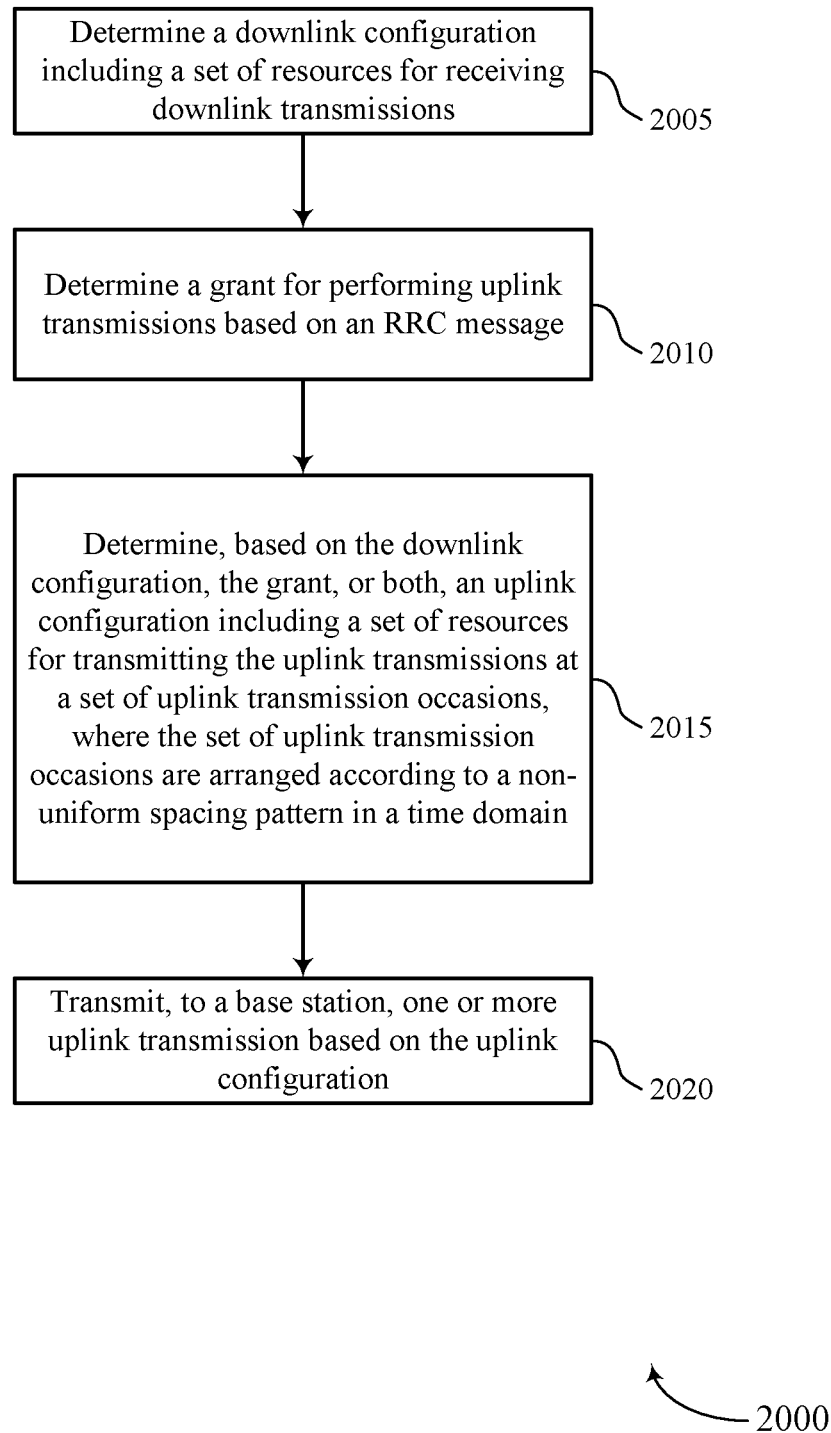
FIGS. 20 through 23 show flowcharts illustrating methods that support techniques for enhanced configured grant configuration in accordance with aspects of the present disclosure.

FIG. 20 shows a flowchart illustrating a method 2000 that supports techniques for enhanced configured grant configuration in accordance with aspects of the present disclosure.

The operations of method 2000 may be implemented by a UE 115 or its components as described herein. For example, the operations of method 2000 may be performed by a communications manager as described with reference to FIGS. 12 through 15. In some examples, a UE may execute a set of instructions to control the functional elements of the UE to perform the functions described herein. Additionally or alternatively, a UE may perform aspects of the functions described herein using special-purpose hardware.

At 2005, the UE may determine a downlink configuration including a set of resources for receiving downlink transmissions. The operations of 2005 may be performed according to the methods described herein. In some examples, aspects of the operations of 2005 may be performed by a downlink configuration manager as described with reference to FIGS. 12 through 15.

At 2010, the UE may determine a grant for performing uplink transmissions based on an RRC message. The operations of 2010 may be performed according to the methods described herein. In some examples, aspects of the operations of 2010 may be performed by an uplink grant manager as described with reference to FIGS. 12 through 15.

At 2015, the UE may determine, based on the downlink configuration, the grant, or both, an uplink configuration including a set of resources for transmitting the uplink transmissions at a set of uplink transmission occasions, where the set of uplink transmission occasions are arranged according to a non-uniform spacing pattern in a time domain. The operations of 2015 may be performed according to the methods described herein. In some examples, aspects of the operations of 2015 may be performed by an uplink configuration manager as described with reference to FIGS. 12 through 15.

At 2020, the UE may transmit, to a base station, one or more uplink transmission based on the uplink configuration. The operations of 2020 may be performed according to the methods described herein. In some examples, aspects of the operations of 2020 may be performed by an uplink transmission manager as described with reference to FIGS. 12 through 15.

Figure 21:
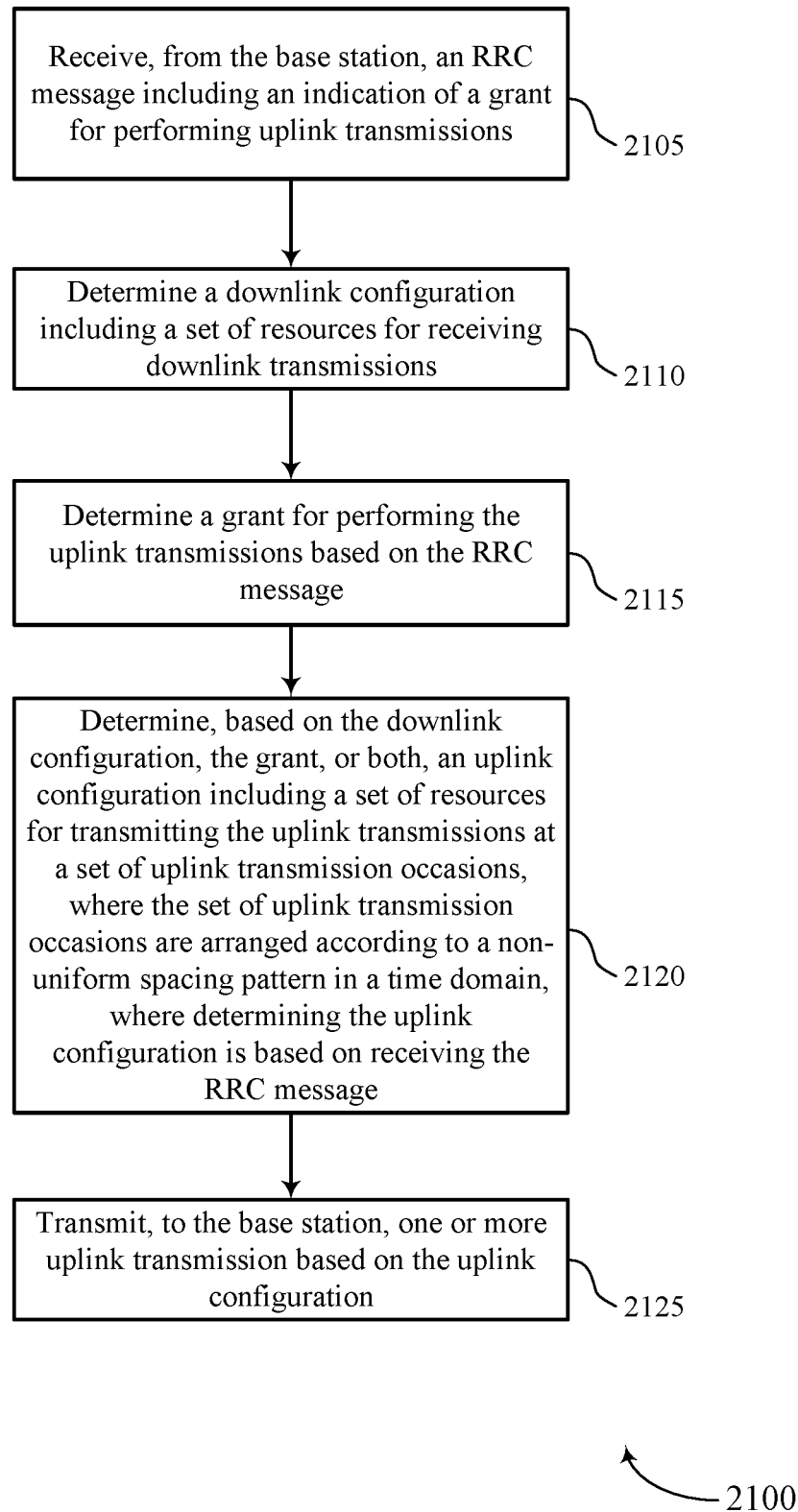

FIG. 21 shows a flowchart illustrating a method 2100 that supports techniques for enhanced configured grant configuration in accordance with aspects of the present disclosure. The operations of method 2100 may be implemented by a UE 115 or its components as described herein. For example, the operations of method 2100 may be performed by a communications manager as described with reference to FIGS. 12 through 15. In some examples, a UE may execute a set of instructions to control the functional elements of the UE to perform the functions described herein. Additionally or alternatively, a UE may perform aspects of the functions described herein using special-purpose hardware.

At 2105, the UE may receive, from the base station, an RRC message including an indication of a grant for performing uplink transmissions. The operations of 2105 may be performed according to the methods described herein. In some examples, aspects of the operations of 2105 may be performed by an RRC message receiving manager as described with reference to FIGS. 12 through 15.

At 2110, the UE may determine a downlink configuration including a set of resources for receiving downlink transmissions. The operations of 2110 may be performed according to the methods described herein. In some examples, aspects of the operations of 2110 may be performed by a downlink configuration manager as described with reference to FIGS. 12 through 15.

At 2115, the UE may determine a grant for performing uplink transmissions based on the RRC message. The operations of 2115 may be performed according to the methods described herein. In some examples, aspects of the operations of 2115 may be performed by an uplink grant manager as described with reference to FIGS. 12 through 15.

At 2120, the UE may determine, based on the downlink configuration, the grant, or both, an uplink configuration including a set of resources for transmitting the uplink transmissions at a set of uplink transmission occasions, where the set of uplink transmission occasions are arranged according to a non-uniform spacing pattern in a time domain, where determining the uplink configuration is based on receiving the RRC message. The operations of 2120 may be performed according to the methods described herein. In some examples, aspects of the operations of 2120 may be performed by an uplink configuration manager as described with reference to FIGS. 12 through 15.

At 2125, the UE may transmit, to the base station, one or more uplink transmission based on the uplink configuration. The operations of 2125 may be performed according to the methods described herein. In some examples, aspects of the operations of 2125 may be performed by an uplink transmission manager as described with reference to FIGS. 12 through 15.

Figure 22:
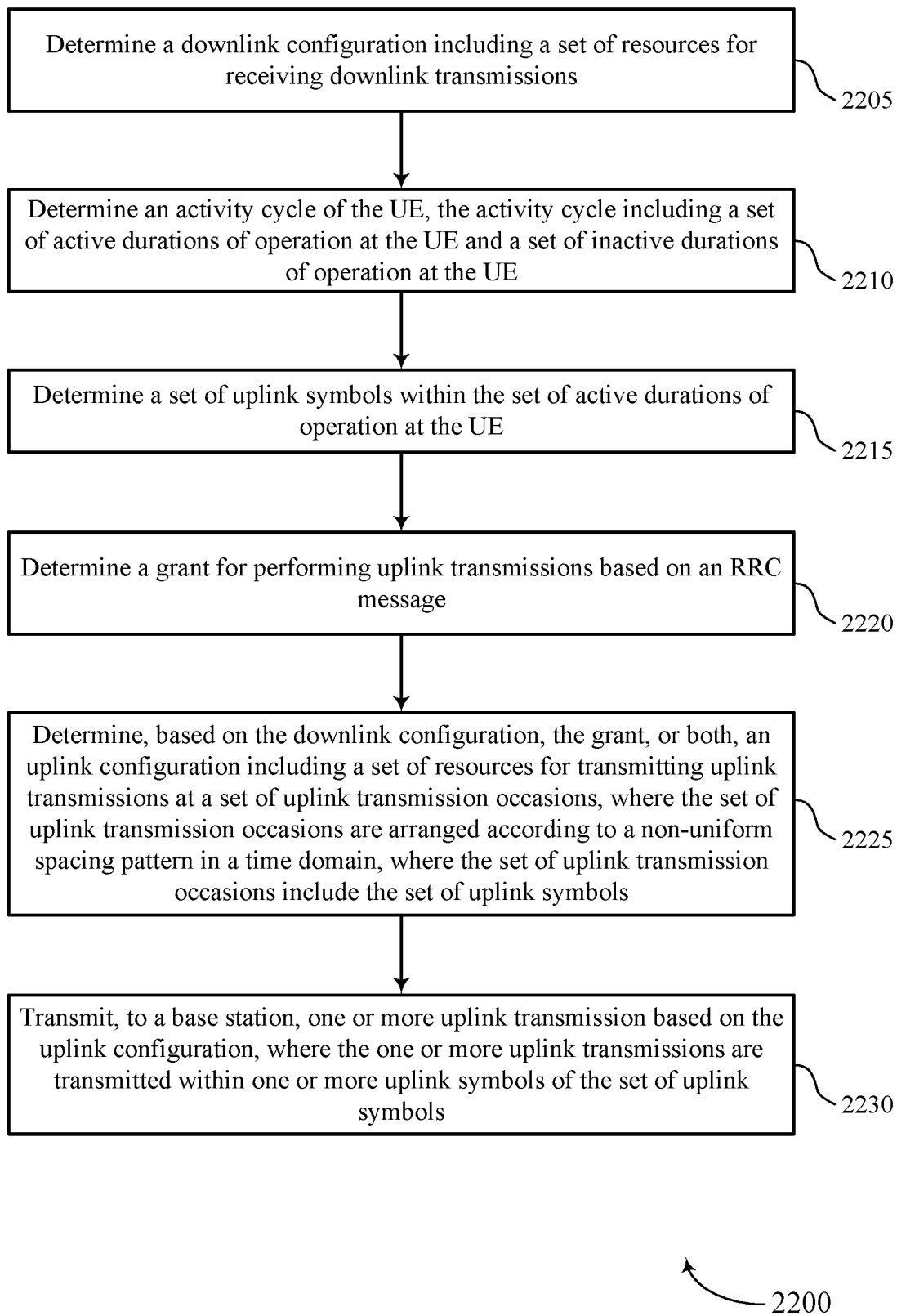

FIG. 22 shows a flowchart illustrating a method 2200 that supports techniques for enhanced configured grant configuration in accordance with aspects of the present disclosure. The operations of method 2200 may be implemented by a UE 115 or its components as described herein. For example, the operations of method 2200 may be performed by a communications manager as described with reference to FIGS. 12 through 15. In some examples, a UE may execute a set of instructions to control the functional elements of the UE to perform the functions described herein. Additionally or alternatively, a UE may perform aspects of the functions described herein using special-purpose hardware.

At 2205, the UE may determine a downlink configuration including a set of resources for receiving downlink transmissions. The operations of 2205 may be performed according to the methods described herein. In some examples, aspects of the operations of 2205 may be performed by a downlink configuration manager as described with reference to FIGS. 12 through 15.

At 2210, the UE may determine an activity cycle of the UE, the activity cycle including a set of active durations of operation at the UE and a set of inactive durations of operation at the UE. The operations of 2210 may be performed according to the methods described herein. In some examples, aspects of the operations of 2210 may be performed by an activity cycle manager as described with reference to FIGS. 12 through 15.

At 2215, the UE may determine a set of uplink symbols within the set of active durations of operation at the UE. The operations of 2215 may be performed according to the methods described herein. In some examples, aspects of the operations of 2215 may be performed by an activity cycle manager as described with reference to FIGS. 12 through 15.

At 2220, the UE may determine a grant for performing uplink transmissions based on an RRC message. The operations of 2220 may be performed according to the methods described herein. In some examples, aspects of the operations of 2220 may be performed by an uplink grant manager as described with reference to FIGS. 12 through 15.

At 2225, the UE may determine, based on the downlink configuration, the grant, or both, an uplink configuration including a set of resources for transmitting uplink transmissions at a set of uplink transmission occasions, where the set of uplink transmission occasions are arranged according to a non-uniform spacing pattern in a time domain, where the set of uplink transmission occasions include the set of uplink symbols. The operations of 2225 may be performed according to the methods described herein. In some examples, aspects of the operations of 2225 may be performed by an uplink configuration manager as described with reference to FIGS. 12 through 15.

At 2230, the UE may transmit, to a base station, one or more uplink transmission based on the uplink configuration, where the one or more uplink transmissions are transmitted within one or more uplink symbols of the set of uplink symbols. The operations of 2230 may be performed according to the methods described herein. In some examples, aspects of the operations of 2230 may be performed by an uplink transmission manager as described with reference to FIGS. 12 through 15.

Figure 23:
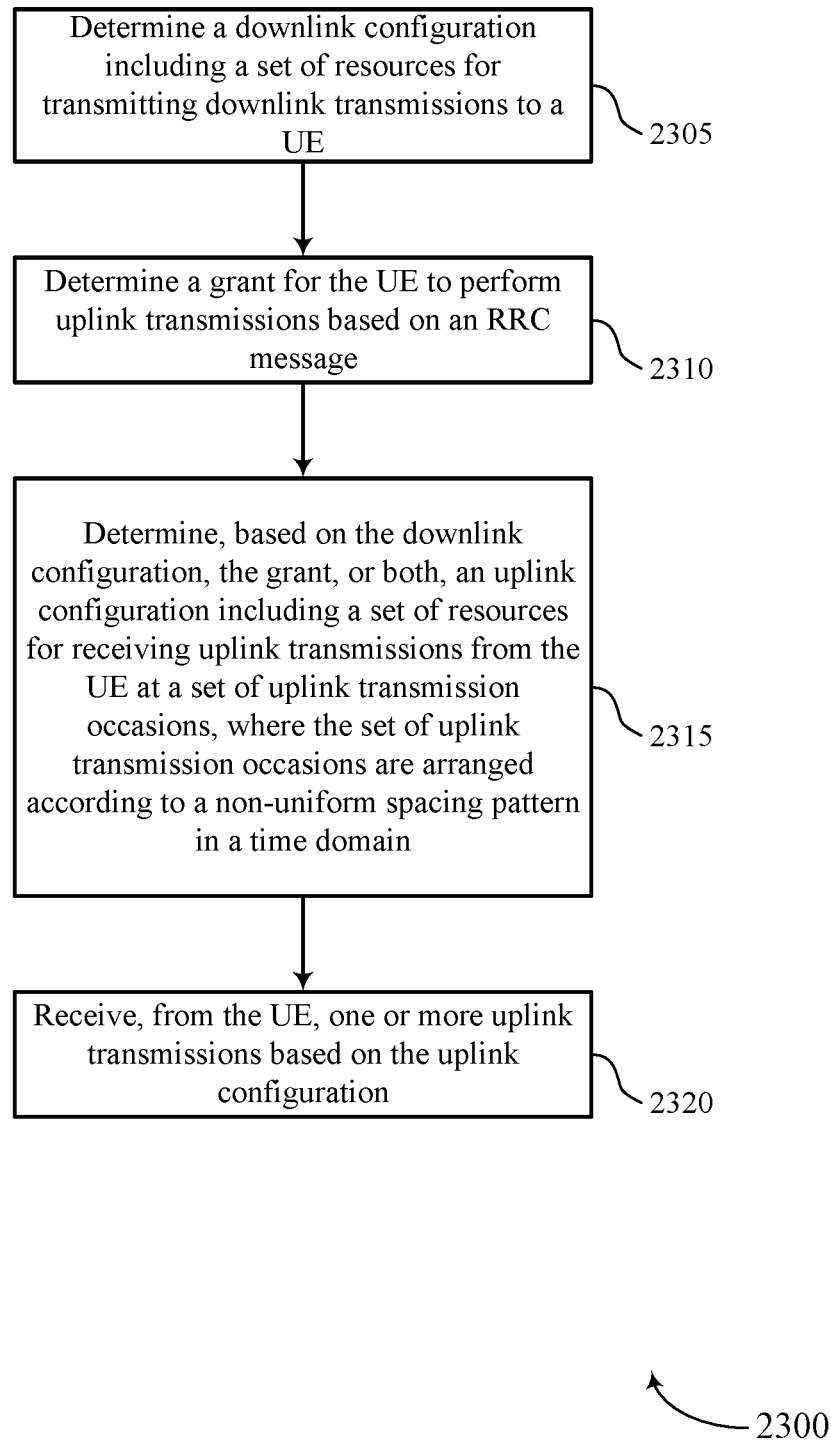

FIG. 23 shows a flowchart illustrating a method 2300 that supports techniques for enhanced configured grant configuration in accordance with aspects of the present disclosure. The operations of method 2300 may be implemented by a base station 105 or its components as described herein. For example, the operations of method 2300 may be performed by a communications manager as described with reference to FIGS. 16 through 19. In some examples, a base station may execute a set of instructions to control the functional elements of the base station to perform the functions described herein. Additionally or alternatively, a base station may perform aspects of the functions described herein using special-purpose hardware.

At 2305, the base station may determine a downlink configuration including a set of resources for transmitting downlink transmissions to a UE. The operations of 2305 may be performed according to the methods described herein. In some examples, aspects of the operations of 2305 may be performed by a downlink configuration manager as described with reference to FIGS. 16 through 19.

At 2310, the base station may determine a grant for the UE to perform uplink transmissions based on an RRC message. The operations of 2310 may be performed according to the methods described herein. In some examples, aspects of the operations of 2310 may be performed by an uplink grant manager as described with reference to FIGS. 16 through 19.

At 2315, the base station may determine, based on the downlink configuration, the grant, or both, an uplink configuration including a set of resources for receiving uplink transmissions from the UE at a set of uplink transmission occasions, where the set of uplink transmission occasions are arranged according to a non-uniform spacing pattern in the time domain. The operations of 2315 may be performed according to the methods described herein. In some examples, aspects of the operations of 2315 may be performed by an uplink configuration manager as described with reference to FIGS. 16 through 19.

At 2320, the base station may receive, from the UE, one or more uplink transmissions based on the uplink configuration. The operations of 2320 may be performed according to the methods described herein. In some examples, aspects of the operations of 2320 may be performed by an uplink reception manager as described with reference to FIGS. 16 through 19.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: determining a downlink configuration comprising a set of resources for receiving downlink transmissions; determining a grant for performing uplink transmissions based at least in part on an RRC message; determining, based at least in part on the downlink configuration, the grant, or both, an uplink configuration comprising a set of resources for transmitting the uplink transmissions at a plurality of uplink transmission occasions, wherein the plurality of uplink transmission occasions are arranged according to a non-uniform spacing pattern in a time domain; and transmitting, to a base station, one or more uplink transmission based at least in part on the uplink configuration.

Aspect 2: The method of aspect 1, further comprising: receiving, from the base station, the RRC message comprising an indication of the grant for performing the uplink transmissions, wherein determining the uplink configuration is based at least in part on receiving the RRC message.

Aspect 3: The method of any of aspects 1 through 2, wherein the non-uniform spacing pattern comprises a repeating periodicity format defining periodicities between adjacent uplink transmission occasions of the plurality of uplink transmission occasions.

Aspect 4: The method of aspect 3, wherein the repeating periodicity format comprises a first periodicity and a second periodicity different from the first periodicity, the first periodicity and the second periodicity separating adjacent uplink transmission occasions of the plurality of uplink transmission occasions in the time domain.

Aspect 5: The method of aspect 4, wherein each iteration of the repeating periodicity format defines the first periodicity between a first uplink transmission occasion and a second uplink transmission occasion, the first periodicity between the second uplink transmission occasion and a third uplink transmission occasion, and the second periodicity between the third uplink transmission occasion and a fourth uplink transmission occasion.

Aspect 6: The method of any of aspects 1 through 5, wherein the non-uniform spacing pattern comprises a repeating offset format defining time offsets between a reference time and a set of adjacent uplink transmission occasions of the plurality of uplink transmission occasions.

Aspect 7: The method of aspect 6, wherein each iteration of the repeating offset format defines a first offset between the reference time and a first uplink transmission occasion, a second offset between the reference time and a second uplink transmission occasion, and a third offset between the reference time and a third uplink transmission occasion.

Aspect 8: The method of any of aspects 6 through 7, further comprising: determining a plurality of uplink transmission durations based at least in part on the repeating offset format, each uplink transmission duration comprising one or more symbols in the time domain; and determining a plurality of uplink symbols within the plurality of uplink transmission durations, wherein the plurality of uplink transmission occasions comprise the plurality of uplink symbols, and wherein the one or more uplink transmissions are transmitted within one or more uplink symbols of the plurality of uplink symbols.

Aspect 9: The method of any of aspects 1 through 8, further comprising: determining an activity cycle of the UE, the activity cycle comprising a plurality of active durations of operation at the UE and a plurality of inactive durations of operation at the UE; and determining a plurality of uplink symbols within the plurality of active durations of operation at the UE, wherein the plurality of uplink transmission occasions comprise the plurality of uplink symbols, and wherein the one or more uplink transmissions are transmitted within one or more uplink symbols of the plurality of uplink symbols, wherein the activity cycle comprises one or both of a masking cycle of the UE or a DRX cycle of the UE.

Aspect 10: The method of any of aspects 1 through 9, further comprising: determining a DRX cycle of the UE, the DRX cycle comprising a plurality of active periods of operation at the UE and a plurality of inactive periods of operation at the UE; determining a plurality of uplink transmission windows based at least in part on the DRX cycle; and determining a plurality of uplink symbols within the plurality of uplink transmission windows, wherein the plurality of uplink transmission occasions comprise the plurality of uplink symbols, and wherein the one or more uplink transmissions are transmitted within one or more uplink symbols of the plurality of uplink symbols.

Aspect 11: The method of aspect 10, wherein an ending time of each uplink transmission window coincides with a start time of an active period of the plurality of active periods of the DRX cycle.

Aspect 12: The method of any of aspects 10 through 11, wherein determining the plurality of uplink transmission windows based at least in part on the DRX cycle comprises: determining at least one of an offset or a duration associated with each uplink transmission window of the plurality of uplink transmission windows relative to a start time of each active period of the DRX cycle.

Aspect 13: The method of any of aspects 1 through 12, wherein the set of resources for receiving the downlink transmissions comprises a plurality of downlink reception occasions arranged according to a uniform spacing pattern in the time domain.

Aspect 14: The method of any of aspects 1 through 13, further comprising: determining the plurality of uplink transmission occasions according to an equation Floor(mod(k−Offset, P))=0, with $k=n_f*N_{\{slot\}}^{\{frame,\mu\}}+n_{\{s,f\}}^{\{\mu\}}$, wherein k defines a symbol of an uplink transmission occasion of the plurality of uplink transmission occasions, P defines a periodicity between adjacent uplink transmission occasions, mod comprises a modular operation, Floor defines a flooring operation, Offset defines an offset between a reference time and the uplink transmission occasion of the plurality of uplink transmission occasions, $n_f$ defines a frame number, $N_{\{slot\}}^{\{frame,\mu\}}$ defines a quantity of slots per frame, and $n_{\{s,f\}}^{\{\mu\}}$ defines a slot number within the frame.

Aspect 15: A method for wireless communication at a base station, comprising: determining a downlink configuration comprising a set of resources for transmitting downlink transmissions to a UE; determining a grant for the UE to perform uplink transmissions based at least in part on an RRC message; determining, based at least in part on the downlink configuration, the grant, or both, an uplink configuration comprising a set of resources for receiving the uplink transmissions from the UE at a plurality of uplink transmission occasions, wherein the plurality of uplink transmission occasions are arranged according to a non-uniform spacing pattern in a time domain; and receiving, from the UE, one or more uplink transmissions based at least in part on the uplink configuration.

Aspect 16: The method of aspect 15, further comprising: transmitting, to the UE, the RRC message comprising an indication of an uplink grant for performing the uplink transmissions, wherein receiving the one or more uplink transmissions is based at least in part on transmitting the RRC message.

Aspect 17: The method of any of aspects 15 through 16, wherein the non-uniform spacing pattern comprises a repeating periodicity format defining periodicities between adjacent uplink transmission occasions of the plurality of uplink transmission occasions.

Aspect 18: The method of aspect 17, wherein the repeating periodicity format comprises a first periodicity and a second periodicity different from the first periodicity, the first periodicity and the second periodicity separating adjacent uplink transmission occasions of the plurality of uplink transmission occasions in the time domain.

Aspect 19: The method of aspect 18, wherein each iteration of the repeating periodicity format defines the first periodicity between a first uplink transmission occasion and a second uplink transmission occasion, the first periodicity between the second uplink transmission occasion and a third uplink transmission occasion, and the second periodicity between the third uplink transmission occasion and a fourth uplink transmission occasion.

Aspect 20: The method of any of aspects 15 through 19, wherein the non-uniform spacing pattern comprises a repeating offset format defining time offsets between a reference time and a set of adjacent uplink transmission occasions of the plurality of uplink transmission occasions.

Aspect 21: The method of aspect 20, wherein each iteration of the repeating offset format defines a first offset between the reference time and a first uplink transmission occasion, a second offset between the reference time and a second uplink transmission occasion, and a third offset between the reference time and a third uplink transmission occasion.

Aspect 22: The method of any of aspects 20 through 21, further comprising: determining a plurality of uplink transmission durations based at least in part on the repeating offset format, each uplink transmission duration comprising one or more symbols in the time domain; and determining a plurality of uplink symbols within the plurality of uplink transmission durations, wherein the plurality of uplink transmission occasions comprise the plurality of uplink symbols, and wherein the one or more uplink transmissions are received within one or more uplink symbols of the plurality of uplink symbols.

Aspect 23: The method of any of aspects 15 through 22, further comprising: determining an activity cycle of the UE, the activity cycle comprising a plurality of active durations of operation at the UE and a plurality of inactive durations of operation at the UE; and determining a plurality of uplink symbols within the plurality of active durations of operation at the UE, wherein the plurality of uplink transmission occasions comprise the plurality of uplink symbols, and wherein the one or more uplink transmissions are received within one or more uplink symbols of the plurality of uplink symbols, wherein the activity cycle comprises one or both of a masking cycle of the UE or a DRX cycle of the UE.

Aspect 24: The method of any of aspects 15 through 23, further comprising: determining a DRX cycle of the UE, the DRX cycle comprising a plurality of active periods of operation at the UE and a plurality of inactive periods of operation at the UE; determining a plurality of uplink transmission windows based at least in part on the DRX cycle; and determining a plurality of uplink symbols within the plurality of uplink transmission windows, wherein the plurality of uplink transmission occasions comprise the plurality of uplink symbols, and wherein the one or more uplink transmissions are received within one or more uplink symbols of the plurality of uplink symbols.

Aspect 25: The method of aspect 24, wherein an ending time of each uplink transmission window coincides with a start time of an active period of the plurality of active periods of the DRX cycle.

Aspect 26: The method of any of aspects 24 through 25, wherein determining the plurality of uplink transmission windows based at least in part on the DRX cycle comprises: determining at least one of an offset or a duration associated with each uplink transmission window of the plurality of uplink transmission windows relative to a start time of each active period of the DRX cycle.

Aspect 27: The method of any of aspects 15 through 26, wherein the set of resources for transmitting the downlink transmissions comprises a plurality of downlink transmission occasions arranged according to a uniform spacing pattern in the time domain.

Aspect 28: The method of any of aspects 15 through 27, further comprising: determining the plurality of uplink transmission occasions according to an equation Floor(mod(k−Offset, P))=0, with $k=n_f*N_{\{slot\}}^{\{frame,\mu\}}+n_{\{s,f\}}^{\{\mu\}}$, wherein k defines a symbol of an uplink transmission occasion of the plurality of uplink transmission occasions, P defines a periodicity between adjacent uplink transmission occasions, mod comprises a modular operation, Floor defines a flooring operation, Offset defines an offset between a reference time and the uplink transmission occasion of the plurality of uplink transmission occasions, $n_f$ defines a frame number, $N_{\{slot\}}^{\{frame,\mu\}}$ defines a quantity of slots per frame, and $n_{\{s,f\}}^{\{\mu\}}$ defines a slot number within the frame.

Aspect 29: An apparatus for wireless communication, comprising a processor; memory coupled with the processor; and instructions stored in the memory and executable by the processor to cause the apparatus to perform a method of any of aspects 1 through 14.

Aspect 30: An apparatus for wireless communication, comprising at least one means for performing a method of any of aspects 1 through 14.

Aspect 31: A non-transitory computer-readable medium storing code for wireless communication at a UE, the code comprising instructions executable by a processor to perform a method of any of aspects 1 through 14.

Aspect 32: An apparatus for wireless communication, comprising a processor; memory coupled with the processor; and instructions stored in the memory and executable by the processor to cause the apparatus to perform a method of any of aspects 15 through 28.

Aspect 33: An apparatus for wireless communication, comprising at least one means for performing a method of any of aspects 15 through 28.

Aspect 34: A non-transitory computer-readable medium storing code for wireless communication at a base station, the code comprising instructions executable by a processor to perform a method of any of aspects 15 through 28.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   determining a downlink configuration comprising a set of resources for receiving downlink transmissions;
   determining a grant for performing uplink transmissions based at least in part on a radio resource control message;
   determining, based at least in part on the downlink configuration, the grant, or both, an uplink configuration comprising a set of resources for transmitting the uplink transmissions at a plurality of uplink transmission occasions, wherein the plurality of uplink transmission occasions are arranged according to a non-uniform spacing pattern in a time domain; and
   transmitting, to a base station, one or more uplink transmission based at least in part on the uplink configuration.

2. The method of claim 1, further comprising:
   receiving, from the base station, the radio resource control message comprising an indication of the grant for performing the uplink transmissions, wherein determining the uplink configuration is based at least in part on receiving the radio resource control message.

3. The method of claim 1, wherein the non-uniform spacing pattern comprises a repeating periodicity format defining periodicities between adjacent uplink transmission occasions of the plurality of uplink transmission occasions.

4. The method of claim 3, wherein the repeating periodicity format comprises a first periodicity and a second periodicity different from the first periodicity, the first periodicity and the second periodicity separating adjacent uplink transmission occasions of the plurality of uplink transmission occasions in the time domain.

5. The method of claim 4, wherein each iteration of the repeating periodicity format defines the first periodicity between a first uplink transmission occasion and a second uplink transmission occasion, the first periodicity between the second uplink transmission occasion and a third uplink transmission occasion, and the second periodicity between the third uplink transmission occasion and a fourth uplink transmission occasion.

6. The method of claim 1, wherein the non-uniform spacing pattern comprises a repeating offset format defining time offsets between a reference time and a set of adjacent uplink transmission occasions of the plurality of uplink transmission occasions.

7. The method of claim 6, wherein each iteration of the repeating offset format defines a first offset between the reference time and a first uplink transmission occasion, a second offset between the reference time and a second uplink transmission occasion, and a third offset between the reference time and a third uplink transmission occasion.

8. The method of claim 6, further comprising:
   determining a plurality of uplink transmission durations based at least in part on the repeating offset format, each uplink transmission duration comprising one or more symbols in the time domain; and
   determining a plurality of uplink symbols within the plurality of uplink transmission durations, wherein the plurality of uplink transmission occasions comprise the plurality of uplink symbols, and wherein the one or more uplink transmissions are transmitted within one or more uplink symbols of the plurality of uplink symbols.

9. The method of claim 1, further comprising:
   determining an activity cycle of the UE, the activity cycle comprising a plurality of active durations of operation at the UE and a plurality of inactive durations of operation at the UE; and
   determining a plurality of uplink symbols within the plurality of active durations of operation at the UE, wherein the plurality of uplink transmission occasions comprise the plurality of uplink symbols, and wherein the one or more uplink transmissions are transmitted within one or more uplink symbols of the plurality of uplink symbols,
   wherein the activity cycle comprises one or both of a masking cycle of the UE or a discontinuous reception cycle of the UE.

10. The method of claim 1, further comprising:
    determining a discontinuous reception cycle of the UE, the discontinuous reception cycle comprising a plurality of active periods of operation at the UE and a plurality of inactive periods of operation at the UE;
    determining a plurality of uplink transmission windows based at least in part on the discontinuous reception cycle; and
    determining a plurality of uplink symbols within the plurality of uplink transmission windows, wherein the plurality of uplink transmission occasions comprise the plurality of uplink symbols, and wherein the one or more uplink transmissions are transmitted within one or more uplink symbols of the plurality of uplink symbols.

11. The method of claim 10, wherein an ending time of each uplink transmission window coincides with a start time of an active period of the plurality of active periods of the discontinuous reception cycle.

12. The method of claim 10, wherein determining the plurality of uplink transmission windows based at least in part on the discontinuous reception cycle comprises:
determining at least one of an offset or a duration associated with each uplink transmission window of the plurality of uplink transmission windows relative to a start time of each active period of the discontinuous reception cycle.

13. The method of claim 1, wherein the set of resources for receiving the downlink transmissions comprises a plurality of downlink reception occasions arranged according to a uniform spacing pattern in the time domain.

14. The method of claim 1, further comprising:
determining the plurality of uplink transmission occasions according to an equation Floor(mod(k−Offset, P))=0, with $k=n_f * N_{\{slot\}}^{\{frame,\mu\}} + n_{\{s,f\}}^{\{\mu\}}$, wherein k defines a symbol of an uplink transmission occasion of the plurality of uplink transmission occasions, P defines a periodicity between adjacent uplink transmission occasions, mod comprises a modular operation, Floor defines a flooring operation, Offset defines an offset between a reference time and the uplink transmission occasion of the plurality of uplink transmission occasions, $n_f$ defines a frame number, $N_{\{slot\}}^{\{frame,\mu\}}$ defines a quantity of slots per frame, and $n_{\{s,f\}}^{\{\mu\}}$ defines a slot number within the frame.

15. A method for wireless communication at a base station, comprising:
determining a downlink configuration comprising a set of resources for transmitting downlink transmissions to a user equipment (UE);
determining a grant for the UE to perform uplink transmissions based at least in part on a radio resource control message;
determining, based at least in part on the downlink configuration, the grant, or both, an uplink configuration comprising a set of resources for receiving the uplink transmissions from the UE at a plurality of uplink transmission occasions, wherein the plurality of uplink transmission occasions are arranged according to a non-uniform spacing pattern in a time domain; and
receiving, from the UE, one or more uplink transmissions based at least in part on the uplink configuration.

16. The method of claim 15, further comprising:
transmitting, to the UE, the radio resource control message comprising an indication of the grant for performing the uplink transmissions, wherein receiving the one or more uplink transmissions is based at least in part on transmitting the radio resource control message.

17. The method of claim 15, wherein the non-uniform spacing pattern comprises a repeating periodicity format defining periodicities between adjacent uplink transmission occasions of the plurality of uplink transmission occasions.

18. The method of claim 17, wherein the repeating periodicity format comprises a first periodicity and a second periodicity different from the first periodicity, the first periodicity and the second periodicity separating adjacent uplink transmission occasions of the plurality of uplink transmission occasions in the time domain.

19. The method of claim 18, wherein each iteration of the repeating periodicity format defines the first periodicity between a first uplink transmission occasion and a second uplink transmission occasion, the first periodicity between the second uplink transmission occasion and a third uplink transmission occasion, and the second periodicity between the third uplink transmission occasion and a fourth uplink transmission occasion.

20. The method of claim 15, wherein the non-uniform spacing pattern comprises a repeating offset format defining time offsets between a reference time and a set of adjacent uplink transmission occasions of the plurality of uplink transmission occasions.

21. The method of claim 20, wherein each iteration of the repeating offset format defines a first offset between the reference time and a first uplink transmission occasion, a second offset between the reference time and a second uplink transmission occasion, and a third offset between the reference time and a third uplink transmission occasion.

22. The method of claim 20, further comprising:
determining a plurality of uplink transmission durations based at least in part on the repeating offset format, each uplink transmission duration comprising one or more symbols in the time domain; and
determining a plurality of uplink symbols within the plurality of uplink transmission durations, wherein the plurality of uplink transmission occasions comprise the plurality of uplink symbols, and wherein the one or more uplink transmissions are received within one or more uplink symbols of the plurality of uplink symbols.

23. The method of claim 15, further comprising:
determining an activity cycle of the UE, the activity cycle comprising a plurality of active durations of operation at the UE and a plurality of inactive durations of operation at the UE; and
determining a plurality of uplink symbols within the plurality of active durations of operation at the UE, wherein the plurality of uplink transmission occasions comprise the plurality of uplink symbols, and wherein the one or more uplink transmissions are received within one or more uplink symbols of the plurality of uplink symbols,
wherein the activity cycle comprises one or both of a masking cycle of the UE or a discontinuous reception cycle of the UE.

24. The method of claim 15, further comprising:
determining a discontinuous reception cycle of the UE, the discontinuous reception cycle comprising a plurality of active periods of operation at the UE and a plurality of inactive periods of operation at the UE;
determining a plurality of uplink transmission windows based at least in part on the discontinuous reception cycle; and
determining a plurality of uplink symbols within the plurality of uplink transmission windows, wherein the plurality of uplink transmission occasions comprise the plurality of uplink symbols, and wherein the one or more uplink transmissions are received within one or more uplink symbols of the plurality of uplink symbols.

25. The method of claim 24, wherein an ending time of each uplink transmission window coincides with a start time of an active period of the plurality of active periods of the discontinuous reception cycle.

26. The method of claim 24, wherein determining the plurality of uplink transmission windows based at least in part on the discontinuous reception cycle comprises:

determining at least one of an offset or a duration associated with each uplink transmission window of the plurality of uplink transmission windows relative to a start time of each active period of the discontinuous reception cycle.

27. The method of claim 15, wherein the set of resources for transmitting the downlink transmissions comprises a plurality of downlink transmission occasions arranged according to a uniform spacing pattern in the time domain.

28. The method of claim 15, further comprising:
determining the plurality of uplink transmission occasions according to an equation Floor(mod(k−Offset, P))=0, with $k=n_f*N_{\{slot\}}^{\{frame,\mu\}}+n_{\{s,f\}}^{\{\mu\}}$, wherein k defines a symbol of an uplink transmission occasion of the plurality of uplink transmission occasions, P defines a periodicity between adjacent uplink transmission occasions, mod comprises a modular operation, Floor defines a flooring operation, Offset defines an offset between a reference time and the uplink transmission occasion of the plurality of uplink transmission occasions, $n_f$ defines a frame number, $N_{\{slot\}}^{\{frame,\mu\}}$ defines a quantity of slots per frame, and $n_{\{s,f\}}^{\{\mu\}}$ defines a slot number within the frame.

29. An apparatus for wireless communication, comprising:
a processor,
memory coupled with the processor; and
instructions stored in the memory and executable by the processor to cause the apparatus to:
determine a downlink configuration comprising a set of resources for receiving downlink transmissions;
determine a grant for performing uplink transmissions based at least in part on a radio resource control message;
determine, based at least in part on the downlink configuration, the grant, or both, an uplink configuration comprising a set of resources for transmitting the uplink transmissions at a plurality of uplink transmission occasions, wherein the plurality of uplink transmission occasions are arranged according to a non-uniform spacing pattern in a time domain; and
transmit, to a base station, one or more uplink transmission based at least in part on the uplink configuration.

30. An apparatus for wireless communication, comprising:
a processor,
memory coupled with the processor; and
instructions stored in the memory and executable by the processor to cause the apparatus to:
determine a downlink configuration comprising a set of resources for transmitting downlink transmissions to a user equipment (UE);
determine a grant for the UE to perform uplink transmissions based at least in part on a radio resource control message;
determine, based at least in part on the downlink configuration, the grant, or both, an uplink configuration comprising a set of resources for receiving the uplink transmissions from the UE at a plurality of uplink transmission occasions, wherein the plurality of uplink transmission occasions are arranged according to a non-uniform spacing pattern in a time domain; and
receive, from the UE, one or more uplink transmissions based at least in part on the uplink configuration.

* * * * *